(12) United States Patent
Buttz

(10) Patent No.: US 8,651,133 B1
(45) Date of Patent: Feb. 18, 2014

(54) TAP SAFETY DEVICE

(76) Inventor: Douglas G. Buttz, Noblesville, IN (US)

(*) Notice: Subject to any disclaimer, the term of this patent is extended or adjusted under 35 U.S.C. 154(b) by 144 days.

(21) Appl. No.: 13/267,710

(22) Filed: Oct. 6, 2011

Related U.S. Application Data

(60) Provisional application No. 61/390,600, filed on Oct. 6, 2010, provisional application No. 61/444,954, filed on Feb. 21, 2011.

(51) Int. Cl.
*F17D 1/00* (2006.01)
*F16P 1/00* (2006.01)

(52) U.S. Cl.
USPC .......................................... 137/317; 137/377

(58) Field of Classification Search
USPC ................... 137/317, 318, 15.12–15.14, 377; 285/197
See application file for complete search history.

(56) References Cited

U.S. PATENT DOCUMENTS

| | | | |
|---|---|---|---|
| 1,590,186 A * | 6/1926 | Fanselow | 137/318 |
| 2,647,419 A | 8/1953 | Dickason | |
| 3,822,718 A * | 7/1974 | Peterson | 137/317 |
| 3,850,451 A | 11/1974 | Matthiessen | |
| 3,976,091 A | 8/1976 | Hutton | |
| 4,029,118 A * | 6/1977 | Merideth | 137/15.13 |
| 4,106,428 A | 8/1978 | Matthiesssen | |
| 4,141,378 A | 2/1979 | Wegner et al. | |
| 4,607,866 A | 8/1986 | Erlichman | |
| 4,890,638 A | 1/1990 | Davenport | |
| 5,660,199 A | 8/1997 | Maichel | |
| 5,723,770 A | 3/1998 | Ertola | |
| 5,842,496 A | 12/1998 | Delanty et al. | |
| 5,853,811 A | 12/1998 | Poague | |
| 6,012,401 A | 1/2000 | Orita et al. | |
| 6,311,720 B1 | 11/2001 | Griffin et al. | |
| 6,884,373 B1 | 4/2005 | Johnson et al. | |
| 7,980,166 B1 * | 7/2011 | Fuqua et al. | 89/36.07 |
| 8,333,211 B2 * | 12/2012 | McGraw et al. | 137/15.12 |

OTHER PUBLICATIONS

Paul, Michael D., Tapping Safety Blanket Takes Third Place; American Water Works Association, Sep. 2006, 1 page.
Mueller Co., Mueller B-101™ and A-3™ Drilling and Tapping Machines, Mueller Co., 1999, 16 pages.
Transmate, Model "B-1" operating instructions, Rev Jul. 5, 2010, 18 pages.
Ford Meter Box Co., Ford Ballcorps and Corporation Stops, Jun. 2005, 24 pages.
Ford Meter Box Co., The Meter Setter, The Ford Drilling Machine, Oct. 1998, 2 pages.
Transmate, B-1™ Drilling and Tapping Machine, Jul. 5, 2010, 5 pages.
IPEX Tapping Guide, How to Tap Blue Brute® Pipe, 2009, 12 pages.
The Black Swan Shoppe, Pipe Covers/Lids, www.thebackyshop.co.uk, Jun. 15, 2009, 3 pages.

* cited by examiner

*Primary Examiner* — Kevin Lee
(74) *Attorney, Agent, or Firm* — Faegre Baker Daniels LLP

(57) ABSTRACT

Tap safety devices are disclosed. The tap safety devices may include a shield which is positioned between the fluid supply line and an operator space such that in an occurrence of an unintended break in the fluid supply line in which a first portion of fluid exits the fluid supply line and travels towards the operator space the shield substantially redirects the first portion of fluid away from the operator space.

18 Claims, 51 Drawing Sheets

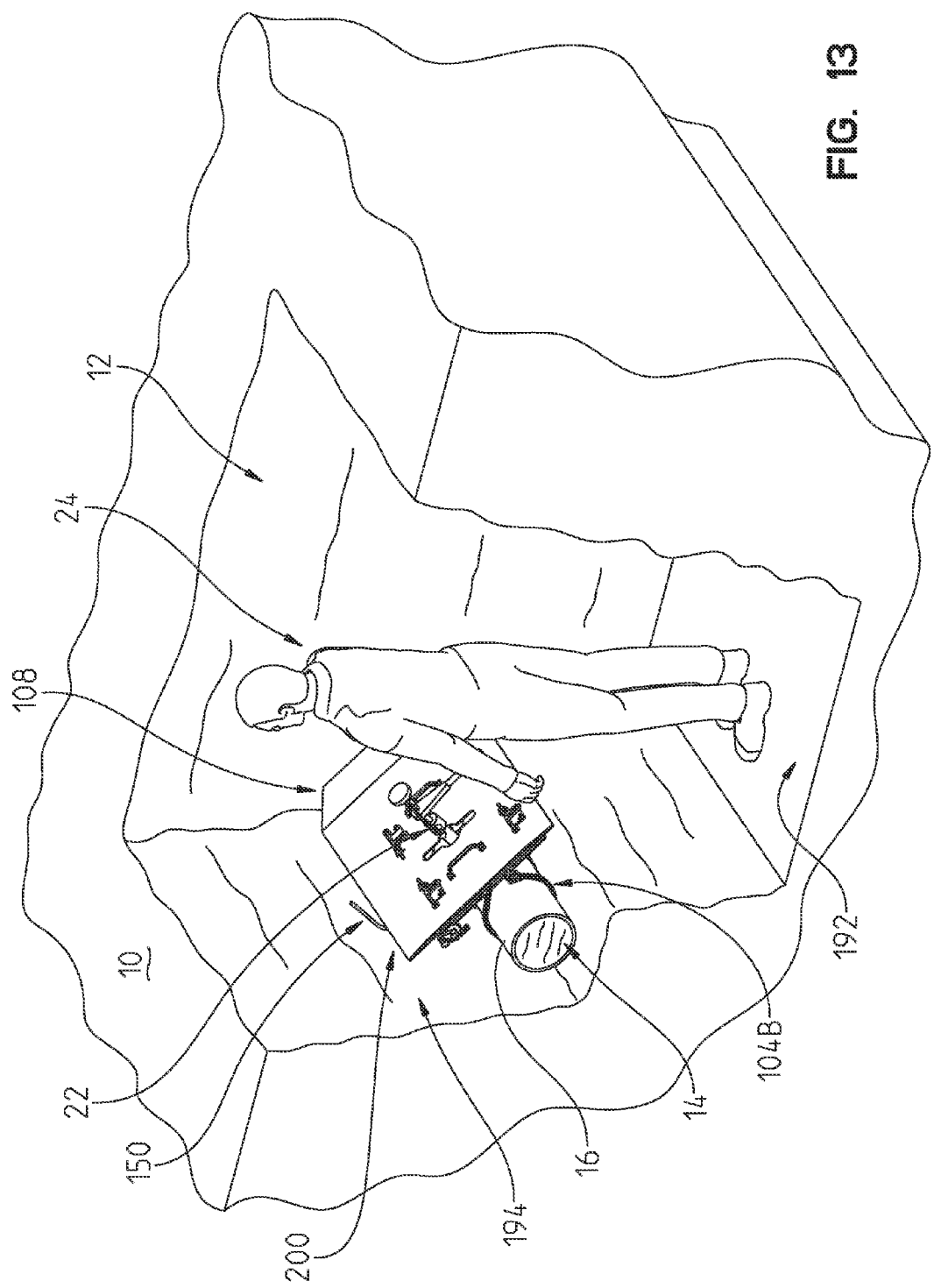

TAP SAFETY DEVICE

RELATED APPLICATIONS

The present application claims the benefit of U.S. Provisional Application Ser. No. 61/390,600, filed Oct. 6, 2010, titled SAFETY DEVICE and U.S. Provisional Application Ser. No. 61/444,954, filed Feb. 21, 2011, titled SAFETY DEVICE, the disclosures of which are expressly incorporated by reference herein.

FIELD

The present invention is directed to safety devices and in particular to safety devices related to the tapping of fluid lines.

BACKGROUND

At various times, such as during construction, a water line must be connected to an existing water line if the building or other point of use is going to have water supplied from the existing water line. Traditionally, an operator would unearth the existing water line (create a pit) and use a saddle tap (shown in the attached figures) or a direct tap to create a hole in the wall of the existing water line and to leave a connection having a valve (often referred to as a corporation stop available from Ford Meter Box Company) behind after the tapping operation. The water line may then be connected to the connection and the valve opened to supply water to the water line from the existing water line.

During the tapping operation, it is possible that the existing water line may rupture. In such a situation, the operator tapping the existing water line may be hit with high pressure water escaping from the ruptured existing water line. This may knock the operator off balance and may pin him against the side of the pit he is in during the tapping operation. The pit quickly fills with water from the ruptured existing water line. The high pressure water and fragments of the existing water line, if any, may cause bodily injury to the operator.

SUMMARY

In an exemplary embodiment of the present disclosure, a safety device is provided. The safety device including a shield which is positioned between a fluid supply line and an operator space such that in an occurrence of an unintended break in the fluid supply line in which a first portion of fluid exits the fluid supply line and travels towards the operator space the shield substantially redirects the first portion of fluid away from the operator space. In one example the shield is a rigid shield.

In another exemplary embodiment of the present disclosure, a method is provided including the steps of providing a safety device including a shield which is positioned between a fluid supply line and an operator space such that in an occurrence of an unintended break in the fluid supply line in which a first portion of fluid exits the fluid supply line and travels towards the operator space the shield substantially redirects the first portion of fluid away from the operator space. In one example the shield is a rigid shield.

In a further exemplary embodiment of the present disclosure, a safety device for use with a tapping apparatus to tap a fluid supply line from an operator space proximate the fluid supply line is provided. The safety device comprising a shield; and at least one coupling device which surrounds the fluid supply line and secures the shield relative to the fluid supply line, wherein in the occurrence of a unintended break in the fluid supply line in which a first portion of fluid exits the fluid supply line and travels towards the operator space the shield substantially redirects the first portion of fluid away from the operator space.

In yet a further exemplary embodiment of the present disclosure, a method of tapping a fluid supply line carrying a fluid under pressure is provided. The method comprising the steps of placing a shield between an operator space adjacent the fluid supply line and the fluid supply line; coupling the shield to the fluid supply line at a location spaced apart from a plane passing through a center of an intended tapping location and generally normal to a longitudinal axis of the fluid supply line; and tapping the supply line to provide a coupling location for a second fluid supply line, wherein in the occurrence of an unintended break in the fluid supply line in which a first portion of fluid exits the fluid supply line and travels towards the operator space, the shield substantially redirects the first portion of fluid away from the operator space.

In still another exemplary embodiment of the present disclosure, a safety device for use with a tap machine to tap a fluid supply line from an operator space proximate the fluid supply line is provided. The safety device comprising a shield having a top portion and a bottom portion spaced apart from the fluid supply line; and at least one coupling device to secure the shield to one of the fluid supply line and the tap machine, wherein in the occurrence of a unintended break in the fluid supply line in which a first portion of fluid exits the fluid supply line and travels towards the operator space the shield substantially redirects the first portion of fluid away from the operator space.

In still yet another exemplary embodiment of the present disclosure, a safety device for use with a tap machine to tap a fluid supply line from an operator space proximate the fluid supply line. The safety device comprising at least one coupling device; a frame coupled to the fluid supply line with the at least one coupling device, the frame receiving the tap machine; and a shield supported by the frame, wherein in the occurrence of a unintended break in the fluid supply line in which a first portion of fluid exits the fluid supply line and travels towards the operator space the shield substantially redirects the first portion of fluid away from the operator space.

In yet still a further exemplary embodiment of the present disclosure, a safety device for use with a tapping apparatus to tap a fluid supply line from an operator space proximate the fluid supply line is provided. The safety device comprising a frame having a flat lower portion which rests against the fluid supply line and a plurality of upstanding wall portions extending from the lower portion; a shield supported by the frame, the shield including a plurality of apertures to receive at least a portion of each of the upstanding wall portions and a tap machine aperture; a plurality of locking members supported by the shield, the locking members engaging the portions of the upstanding wall portions to lock the shield onto the frame, wherein in the occurrence of a unintended break in the fluid supply line in which a first portion of fluid exits the fluid supply line and travels towards the operator space the shield substantially redirects the first portion of fluid away from the operator space.

The above and other features of the present disclosure, which alone or in any combination may comprise patentable subject matter, will become apparent from the following description and the attached drawings.

BRIEF DESCRIPTION OF THE DRAWINGS

The above-mentioned and other features and advantages of this disclosure, and the manner of attaining them, will become more apparent and the invention itself will be better understood by reference to the following description of embodiments of the invention taken in conjunction with the accompanying drawings, wherein:

FIG. 13 illustrates the excavated portion of a fluid supply line of FIG. 1 having a tap machine attached thereto and an exemplary shield member of an exemplary safety device positioned between the fluid supply line and the operator operating the tap machine;

Corresponding reference characters indicate corresponding parts throughout the several views. The exemplifications set out herein illustrate exemplary embodiments of the disclosure and such exemplifications are not to be construed as limiting the scope of the disclosure in any manner.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings.

Figure 1:
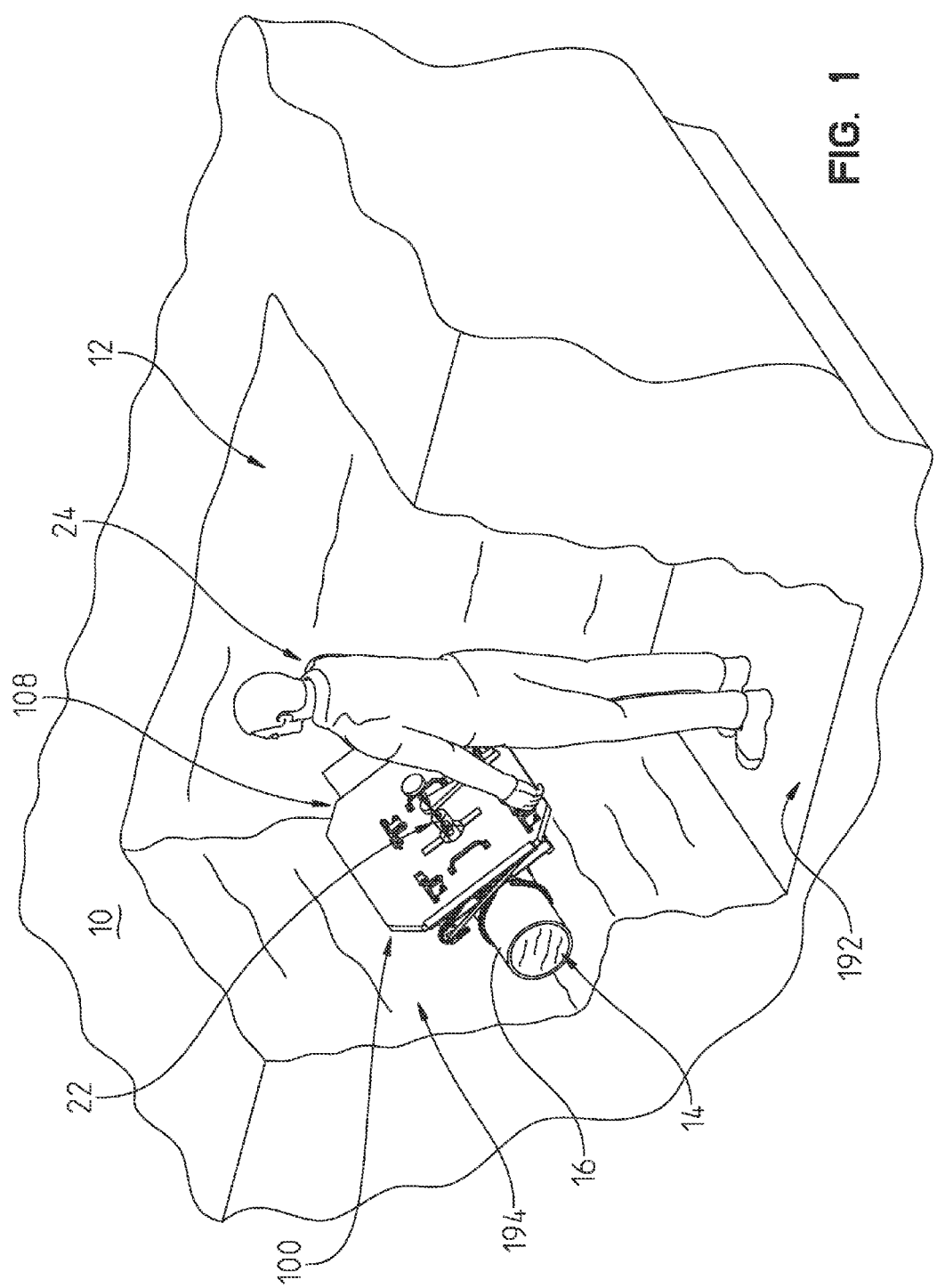
FIG. 1 illustrates an excavated portion of a fluid supply line having a tap machine attached thereto and an exemplary shield member of an exemplary safety device positioned between the fluid supply line and the operator operating the tap machine.

Referring to FIG. 1, an exemplary pit 12 is excavated in ground 10. As shown, in pit 12 a portion of a fluid carrying line 14 has been unearthed. In one embodiment, fluid carrying line 14 carries a fluid under pressure. An exemplary fluid carrying line 14 is a water line. Exemplary water lines are made from a polymeric material. An exemplary polymeric material is PVC. The fluid being carried by line 14 is under pressure.

Figure 24:
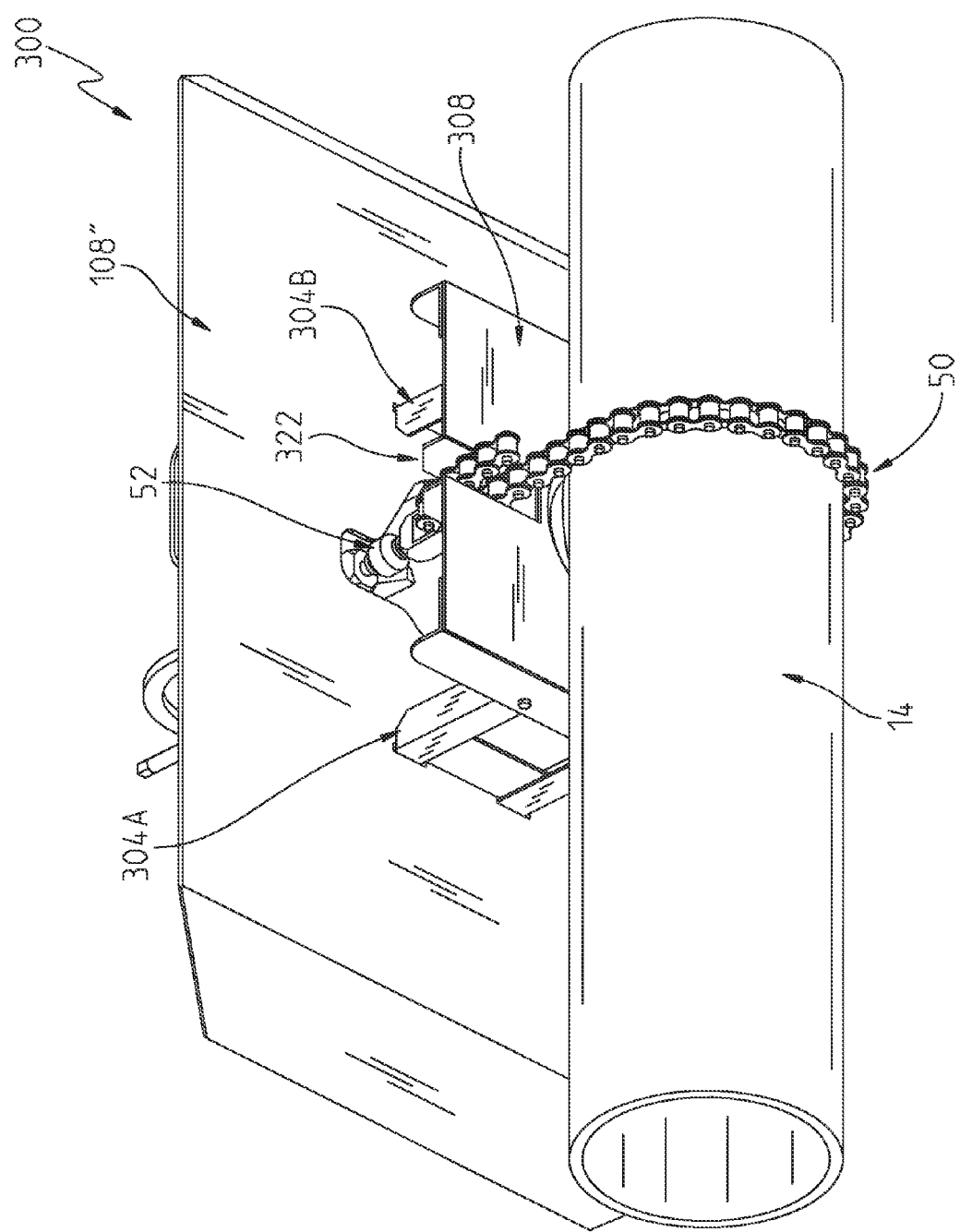
FIG. 24 illustrates a rear, perspective view of the arrangement of FIG. 23.

When a second fluid line is to be connected with fluid carrying line 14 an opening is created in the wall 16 of fluid carrying line 14 to bring an interior of the second fluid line in fluid communication with the interior of fluid carrying line 14. In one embodiment, a corporation stop 18 (see FIG. 7) is coupled to fluid carrying line 14 to make the connection with the second fluid carrying line. In one embodiment, corporation stop 18 is supported by a saddle 20 (see FIG. 7) which is secured to wall 16. Corporation stop 18 may include a threaded end by which corporation stop 18 is threaded into saddle 20. As is known, corporation stop 18 includes a valve which may be positioned in an open state allowing fluid to pass therethrough and a closed state preventing fluid from passing therethrough. As is known, a tap machine 22 may be coupled to corporation stop 18 and operated to tap an opening through wall 16 of fluid carrying line 14. In one embodiment, corporation stop 18 is directly threaded into wall 16 of fluid carrying line 14 when a direct tap machine 21 (see FIG. 24) is used to tap an opening through wall 16. An exemplary direct tap machine is disclosed in U.S. Pat. No. 2,647,419, titled MACHINE FOR DRILLING, TAPPING, AND INSERTING STOPS IN A PIPE, the disclosure of which is incorporated by reference herein.

During tapping, a generally circular opening is being created in wall 16 of fluid carrying line 14. It is possible that wall 16 of fluid carrying line 14 will fracture at locations other than the intended generally circular opening being created by tap machine 22 or tap machine 21. For example, a crack may develop radiating out from the opening being formed by tap machine 22. These additional fractures may permit the fluid under pressure within fluid carrying line 14 to exit the fluid carrying line 14 and begin to fill pit 12 and potentially to alter or constrain the pose of an operator 24 in pit 12. Further, portions of wall 16 may become projectiles which may injure operator 24.

Figure 2:
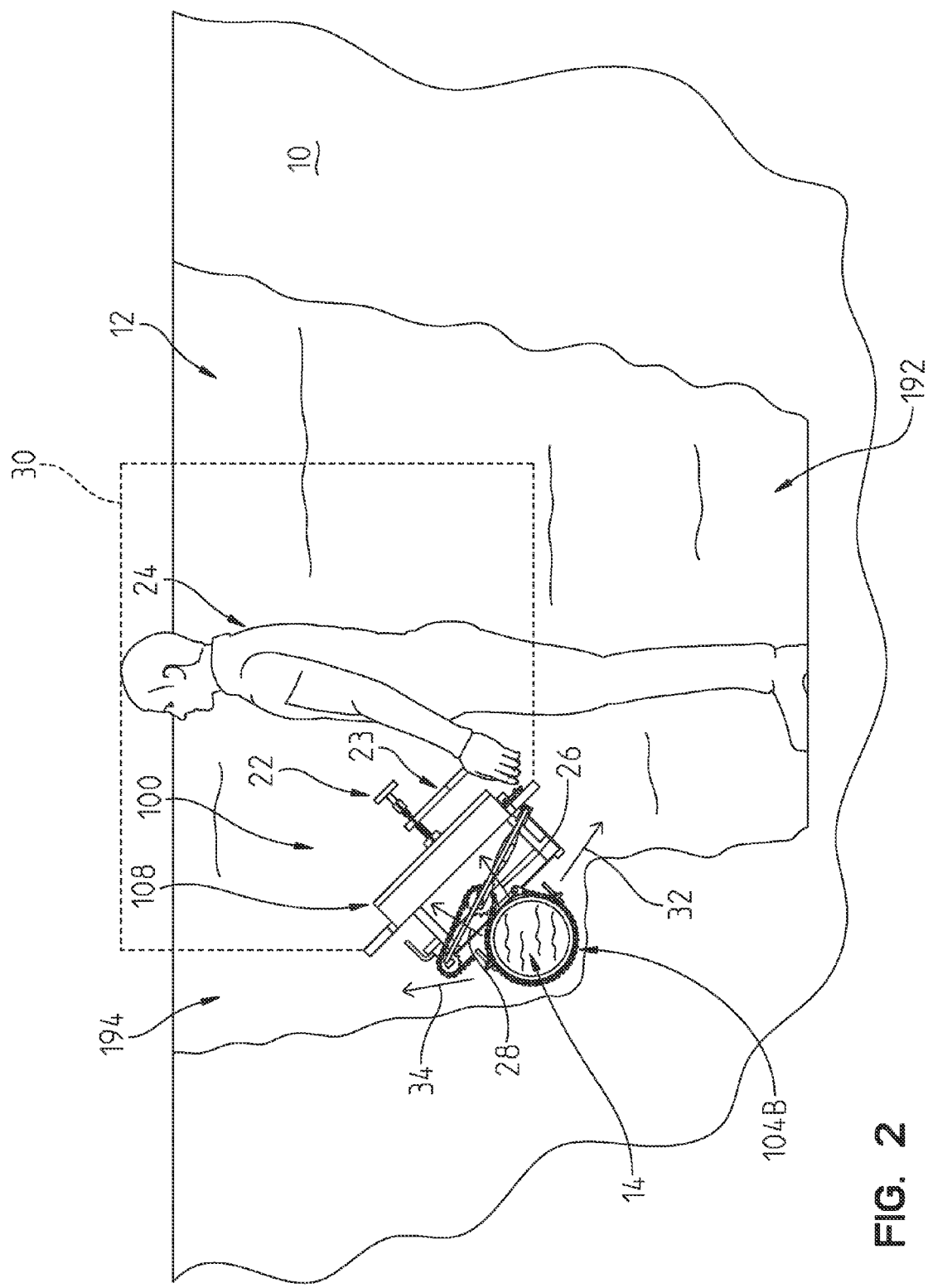
FIG. 2 illustrates a side view of FIG. 1 oriented along a longitudinal axis of the fluid supply line.

An exemplary safety device 100 is shown in FIG. 1. Referring to FIG. 2, safety device 100 is positioned between fluid carrying line 14 and operator 24. Safety device 100 operates so that any fluid from an unintended rupture that is traveling towards an operator space 30 wherein the operator is engaging tap machine 22 will be redirected by safety device 100 away from operator space 30. As such, fluid traveling in directions 26 and 28 would be redirected in directions 32 and 34, respectively, and/or along the longitudinal axis of fluid carrying line 14 (directions 140 and 142 in FIG. 4).

Figure 6:
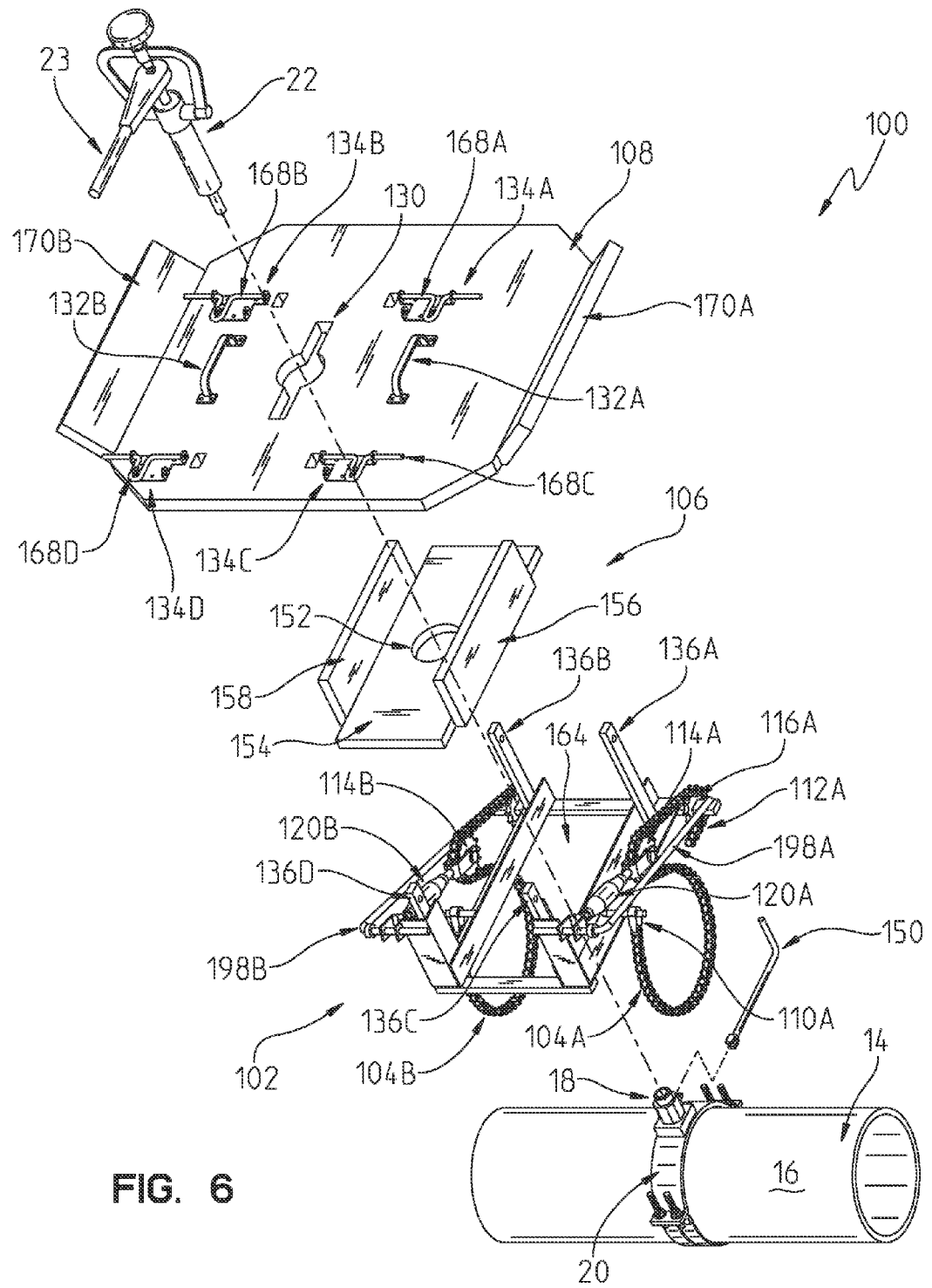
FIG. 6 illustrates an exploded view of the arrangement of FIG. 4.

Referring to FIG. 6, safety device 100 is shown exploded from fluid carrying line 14. Safety device 100 includes a frame 102 which is placed on fluid carrying line 14. Safety device 100 also includes couplers 104 which secure frame 102 to fluid carrying line 14. In the illustrated embodiment, couplers 104 are flexible couplers, illustratively chains, which surround fluid carrying line 14 and are tightened to hold frame 102 relative to fluid carrying line 14. Although a flexible coupler 104 is illustrated, a rigid coupler may be used.

Figure 11:
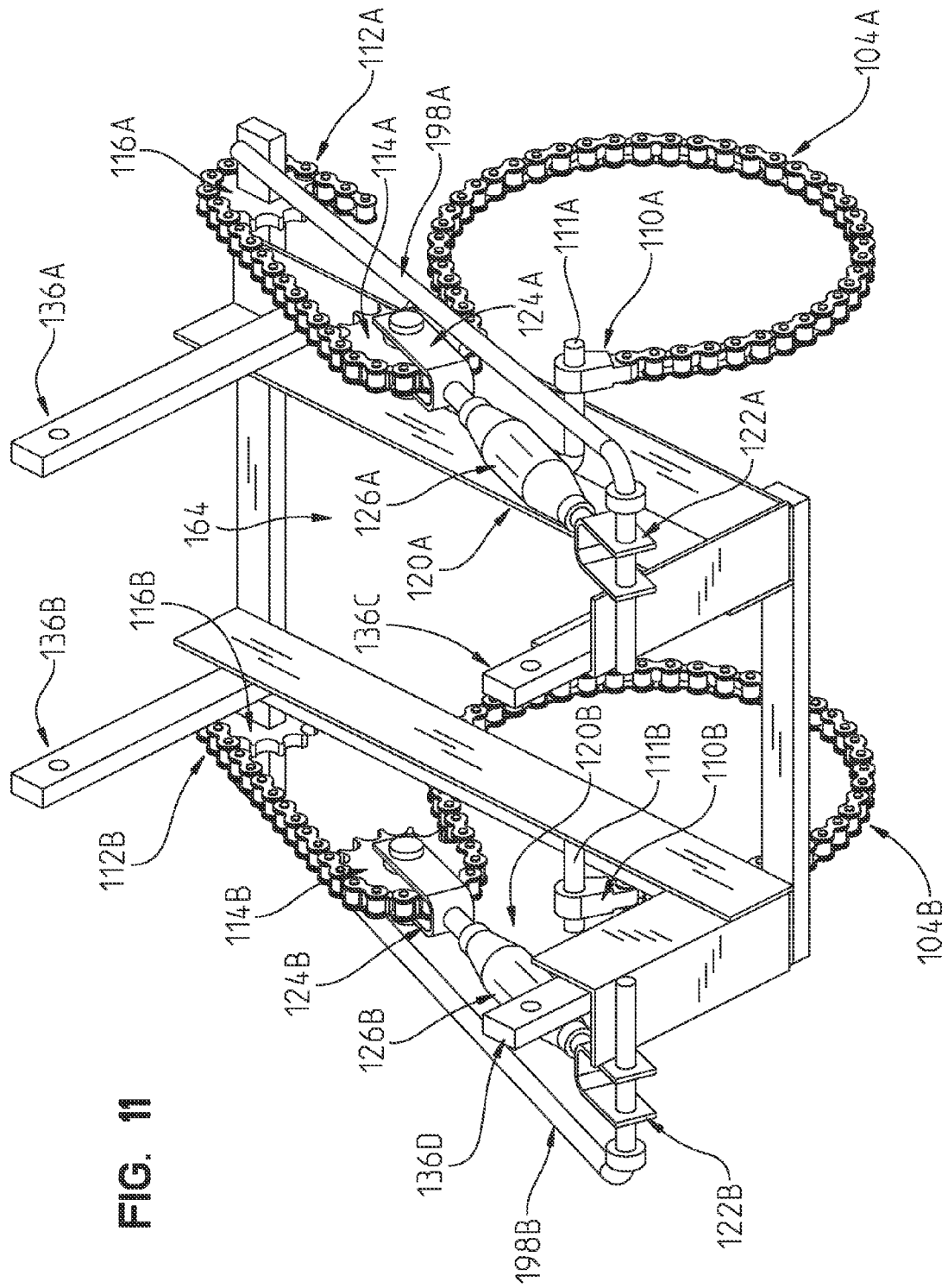
FIG. 11 illustrates a front, perspective view of a portion of the safety device of FIG. 4.

As is shown in FIG. 11, a first end 110 of the respective couplers 104 are secured to frame 102. In one embodiment, first end 110 of couplers 104 may be secured to frame 102 by engaging first end 110 with a protruding member 111 of frame 102. A second end 112 of couplers 104 are passed around fluid carrying line 14, over first sprockets 114 and over second sprockets 116. First sprockets 114 are carried by tensioning members 120 and are rotatable relative to tensioning members 120. Second sprockets 116 are not rotatable relative to frame 102 and thereby hold the relative position of the second end 112 of the respective couplers 104. In one embodiment, devices such as locking pins which are supported by frame 102 may be used to hold the position of second end 112. For example, see pins 220 of safety device 200 illustrated in FIG. 19.

Figure 8:
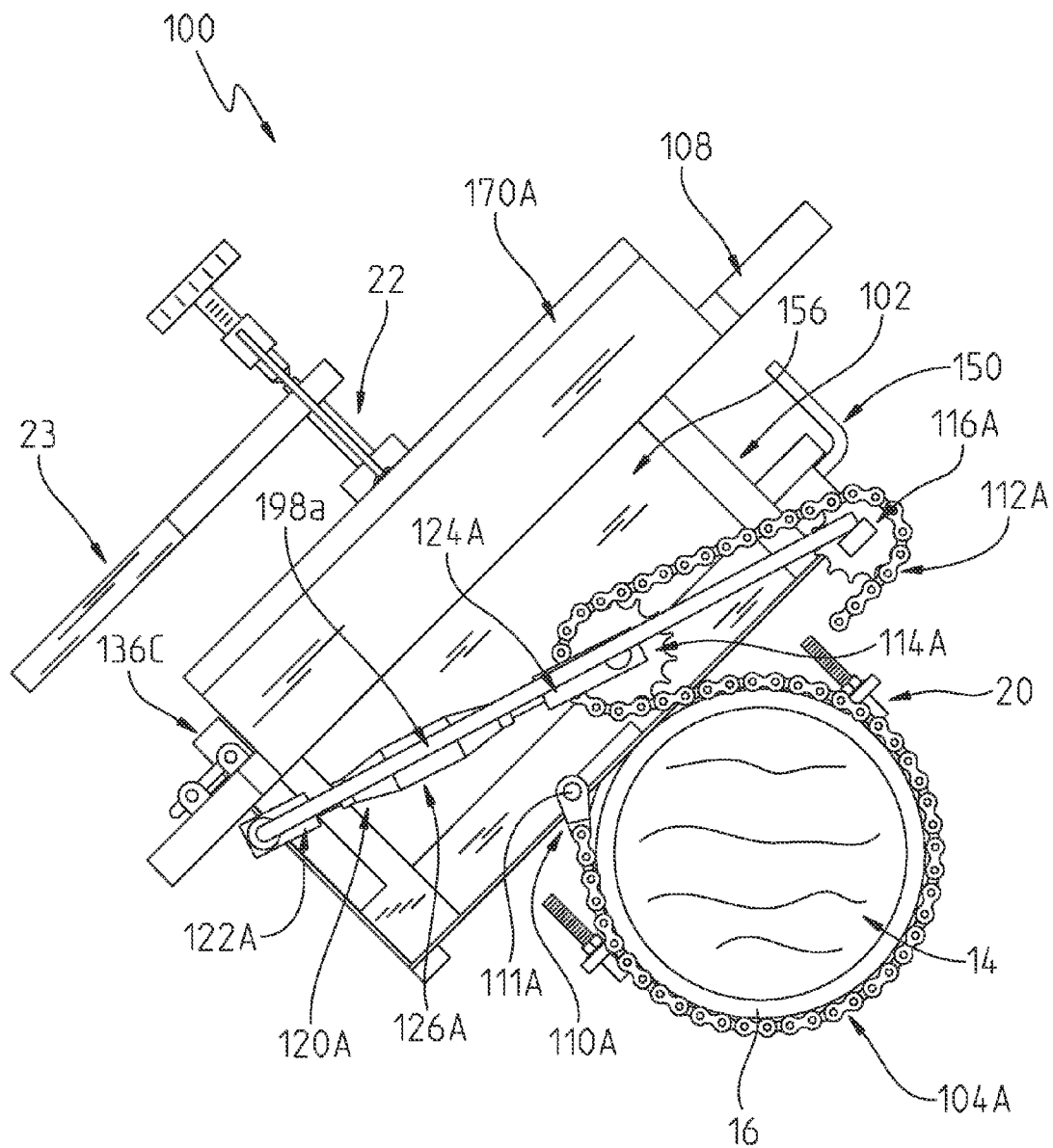
FIG. 8 illustrates a side view of FIG. 4 oriented along a longitudinal axis of the fluid supply line.
Figure 9:
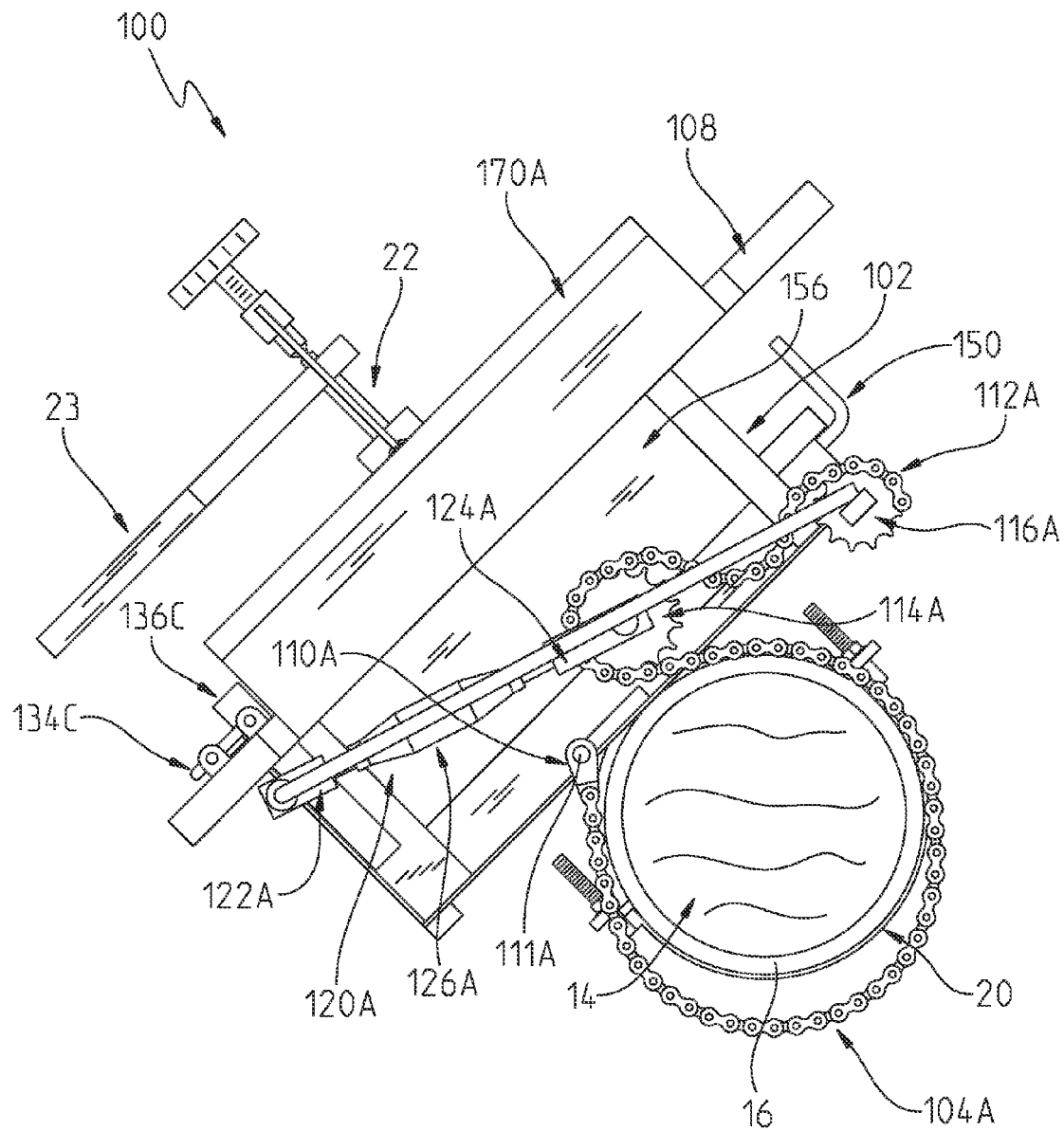
FIG. 9 illustrates a side view of FIG. 8 with coupling members of the safety device surrounding the fluid supply line while permitting the movement of the safety device relative to the fluid supply line.
Figure 10:
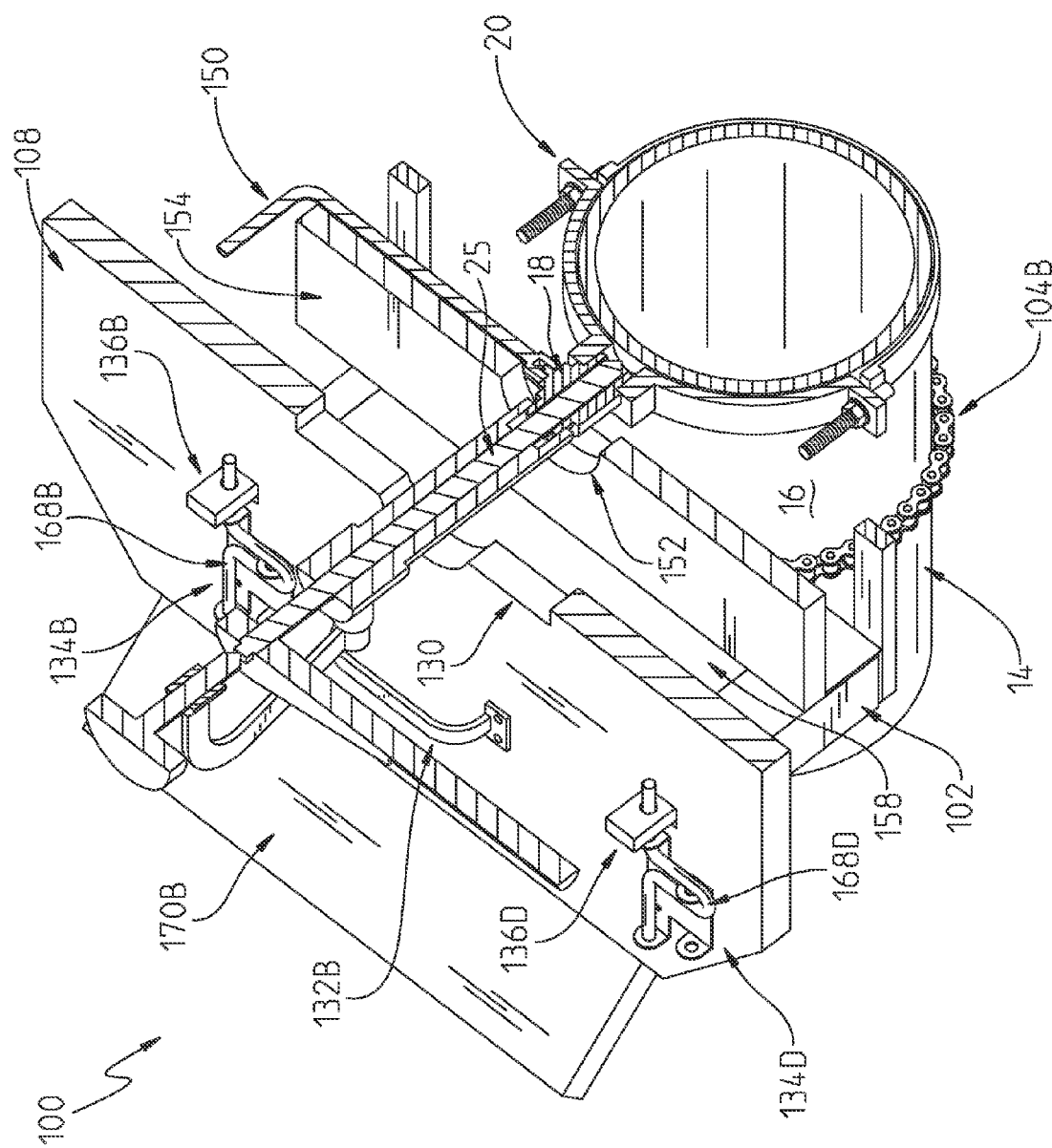
FIG. 10 illustrates a sectional view of along line 10-10 in FIG. 4 through a tapping location of the fluid supply line.

Referring to FIGS. 8 and 9, tensioning members 120 are used to tighten couplers 104 around fluid carrying line 14 and to more tightly hold frame 102 relative to fluid carrying line 14. In the illustrated embodiment of FIGS. 8 and 9, a length of tensioning members 120 may be adjusted to alter the tightness of first end 110 around fluid carrying line 14. In one embodiment, tensioning members 120 include a first portion 122 which is rotatably coupled to frame 102 and a second portion 124 which carries and is rotatably coupled to the first sprocket 114. The first portion 122 and the second portion 124 each have threaded ends which are received in a coupler portion 126. By rotating the coupler portion 126, the two threaded ends of the first portion 122 and the second portion 124 are either further advanced in the coupler portion 126 (shortening the tensioning member 120) or further retracted from the coupler portion 126 (lengthening the tensioning member). Frame 102 is supported by couplers 104 and fluid carrying line 14 while operator 24 positions safety device 100 along fluid carrying line 14 in preparation for a tapping operation. When operator 24 rotates safety device 100 to a preferred position, the threaded rods are used to fit couplers 104 snugly and securely against fluid carrying line 14.

By permitting second end 112 of coupler 104 to be held by second sprockets 116 at any position along coupler 104, the same coupler 104 may be used for multiple diameters of fluid carrying line 14.

In the illustrated embodiment, frame 102 does not follow the transverse contour of fluid carrying line 14. In one embodiment, frame 102 is configured to follow the transverse contour of fluid carrying line 14. Frame 102 further includes handles 198 which are welded to the remainder of frame 102.

Figure 7:
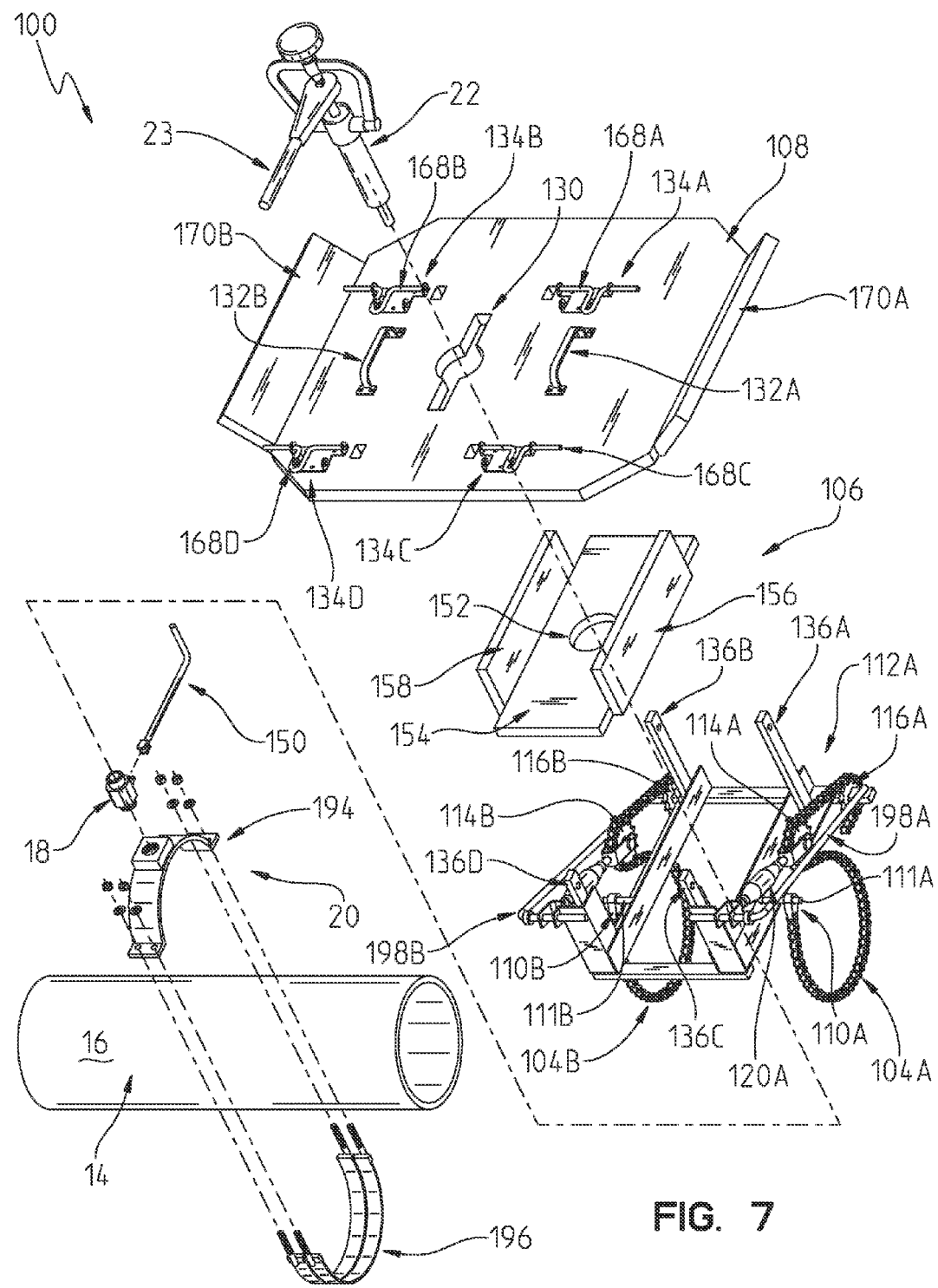
FIG. 7 illustrates an exploded view of the arrangement of FIG. 4 illustrating a saddle in an exploded state.

Referring to FIG. 7, safety device 100 further includes a first shield 106 which is supported by frame 102. First shield 106 includes an opening 152 through which tap machine 22 may engage corporation stop 18 or through which corporation stop 18 extends. First shield 106 includes a base portion 154, a first wall 156, and a second wall 158. First wall 156 of first shield 106 is positioned generally between and held in place by a first upstanding portion 160A of frame 102 and a second upstanding portion 162A of frame 102. Likewise second wall 158 is positioned generally between and held in place by a first upstanding portion 160B of frame 102 and a second upstanding portion 162B of frame 102.

Base portion 154 is positioned over an opening 164 in frame 102 in which corporation stop 18 and saddle 20 are positioned. Base portion 154 generally blocks fluid exiting a rupture of fluid carrying line 14 from traveling up towards operator space 30.

A second shield 108 of safety device 100 is also supported by frame 102. In the illustrated embodiment, first shield 106 and second shield 108 are spaced apart from fluid carrying line 14. Furthermore, second shield 108 is illustrated as being positioned above first shield 106. In one embodiment, an upper portion and a lower portion of shield 108 are spaced apart from line 14 and saddle 20.

Second shield 108 includes an opening 130 through which tap machine 22 may pass. Second shield 108 further includes handles 132 for lifting second shield 108 relative to frame 102. Handles 132 are fastened to shield 108.

Figure 4:
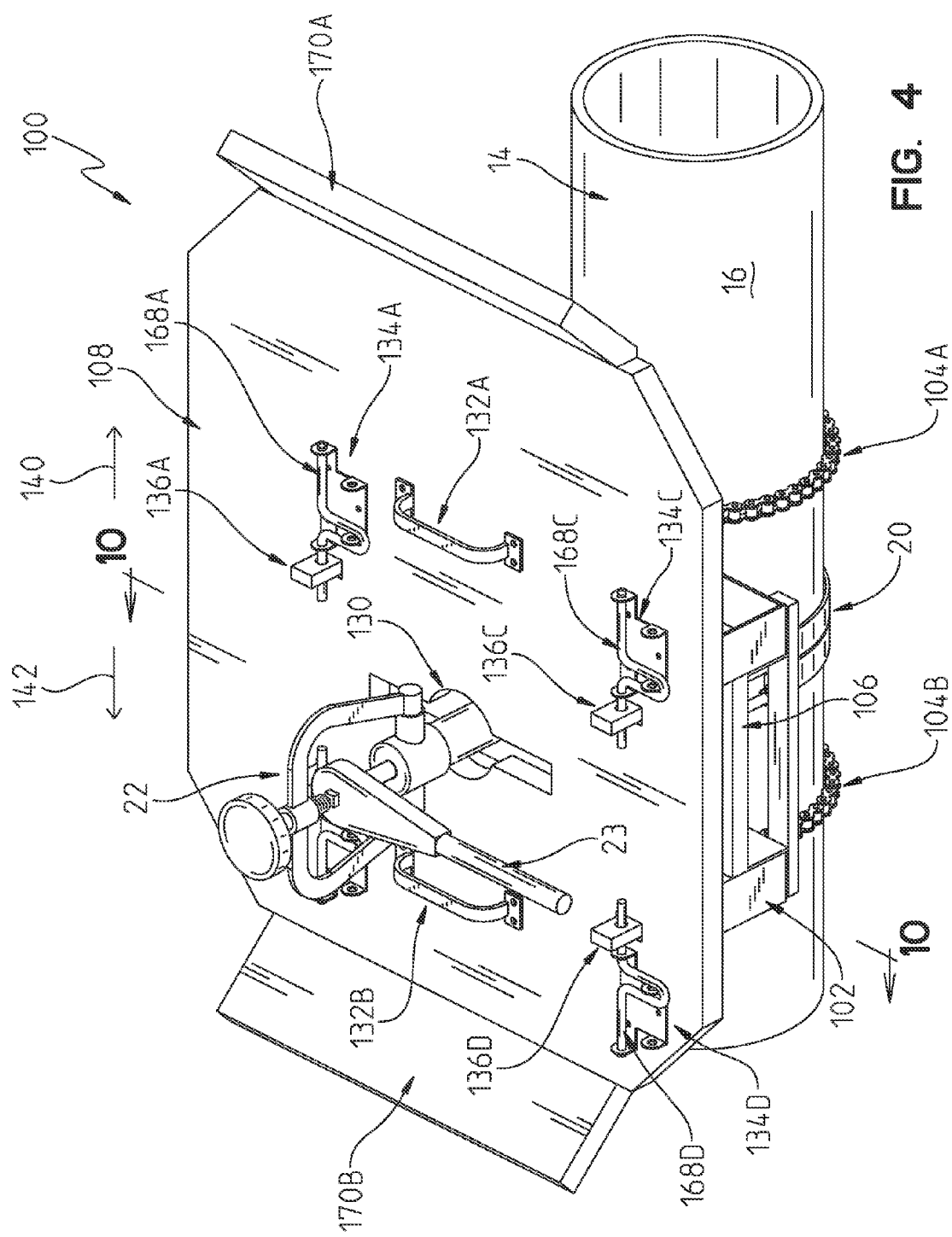
FIG. 4 illustrates a front, perspective view of the safety device of FIG. 1 coupled to the fluid supply line of FIG. 1.
Figure 5:
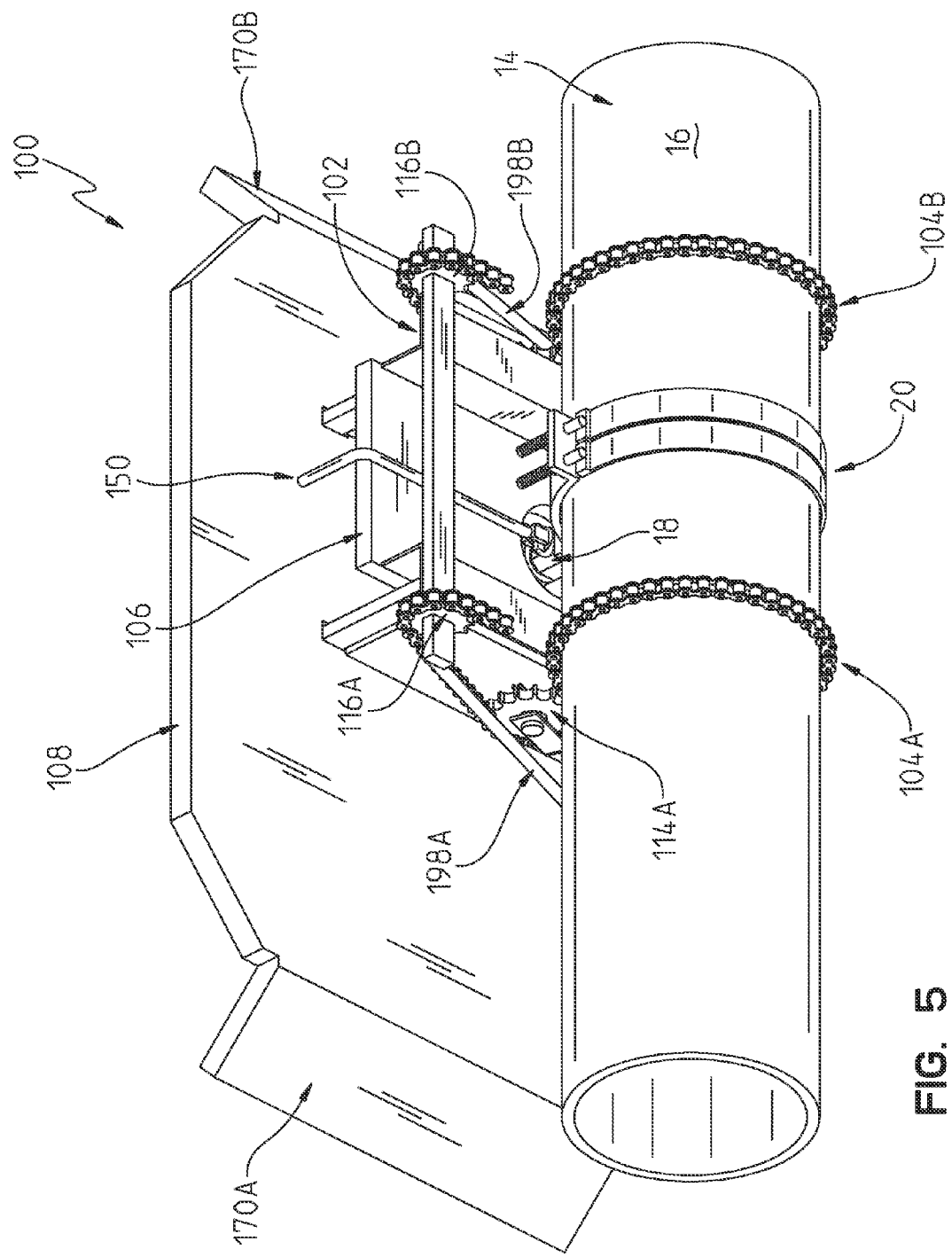
FIG. 5 illustrates a rear, perspective view of the arrangement of FIG. 4.

In the illustrated embodiment, second shield 108 is coupled to frame 102 with locking members 134 (see FIG. 4). Portions 136 of frame 102 extend through respective openings in second shield 108 and a locking pin 168 of locking members 134 is passed through an opening in the respective portions 136. Locking members 134 are fastened to second shield 108 with fasteners or otherwise coupled to second shield 108.

Referring to FIG. 4, locking pins 168 of locking members 134 have generally axially aligned ends and a U-shaped middle portion. The U-shaped middle portion may capture an upstanding tab of locking members 134 to restrict the movement of locking pin 168 relative to locking members 134 and frame portions 136 of frame 102. In the illustrated embodiment, in order for locking pin 168 to disengage from frame portions 136, the U-shaped middle portion of locking pin 168 has to disengage from a first tab of locking members 134, move outward relative to the first tab of locking members 134, and overcome a second tab of locking members 134.

As shown in FIG. 4, in the illustrated embodiment, second shield 108 is longer in a first direction 140 from tap machine 22 than in a second, opposite direction 142 from tap machine 22. In one embodiment, second shield 108 is symmetrical about tap machine 22. In another embodiment, outer portions 170 of shield 108 may be angled in at least a partially vertical direction. In one embodiment, second shield 108 is about 36 inches in length and about 25 inches in height. In one example, about 22 inches of the 36 inches of length is to the right (direction 140) of a tapping location of tap machine 22 and the balance being to the left (direction 142) of the tapping location of tap machine 22.

Figure 12:
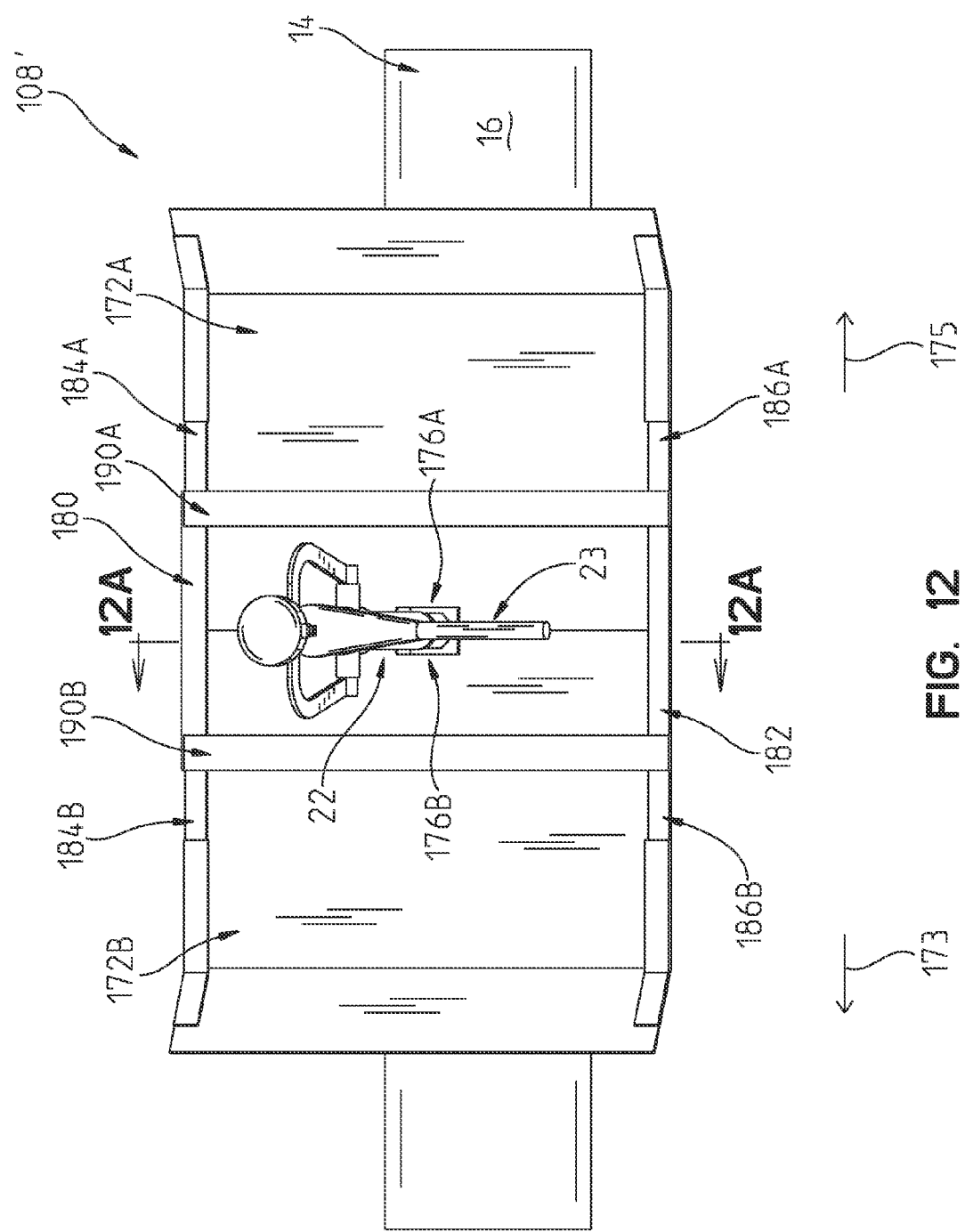
FIG. 12 illustrates a front view of another safety device including a shield with an expandable width.

Referring to FIG. 12, a second shield 108' is shown having an adjustable longitudinal length. Illustratively, the length of second shield 108' may be adjusted by moving portions 172 of second shield 108' along a sliding track or other sliding means. A length of shield 108' may be lengthened by moving sliding portion 172B in direction 173 and/or by moving sliding portion 172A in direction 175. In one embodiment, the sliding portions 172 of second shield 108' may be removable. In such an embodiment, the sliding portions 172 of second shield 108' are operably coupled to safety device 100. The sliding portions 172 of second shield 108' may be secured to safety device 100 using known coupling means.

Figure 12A:
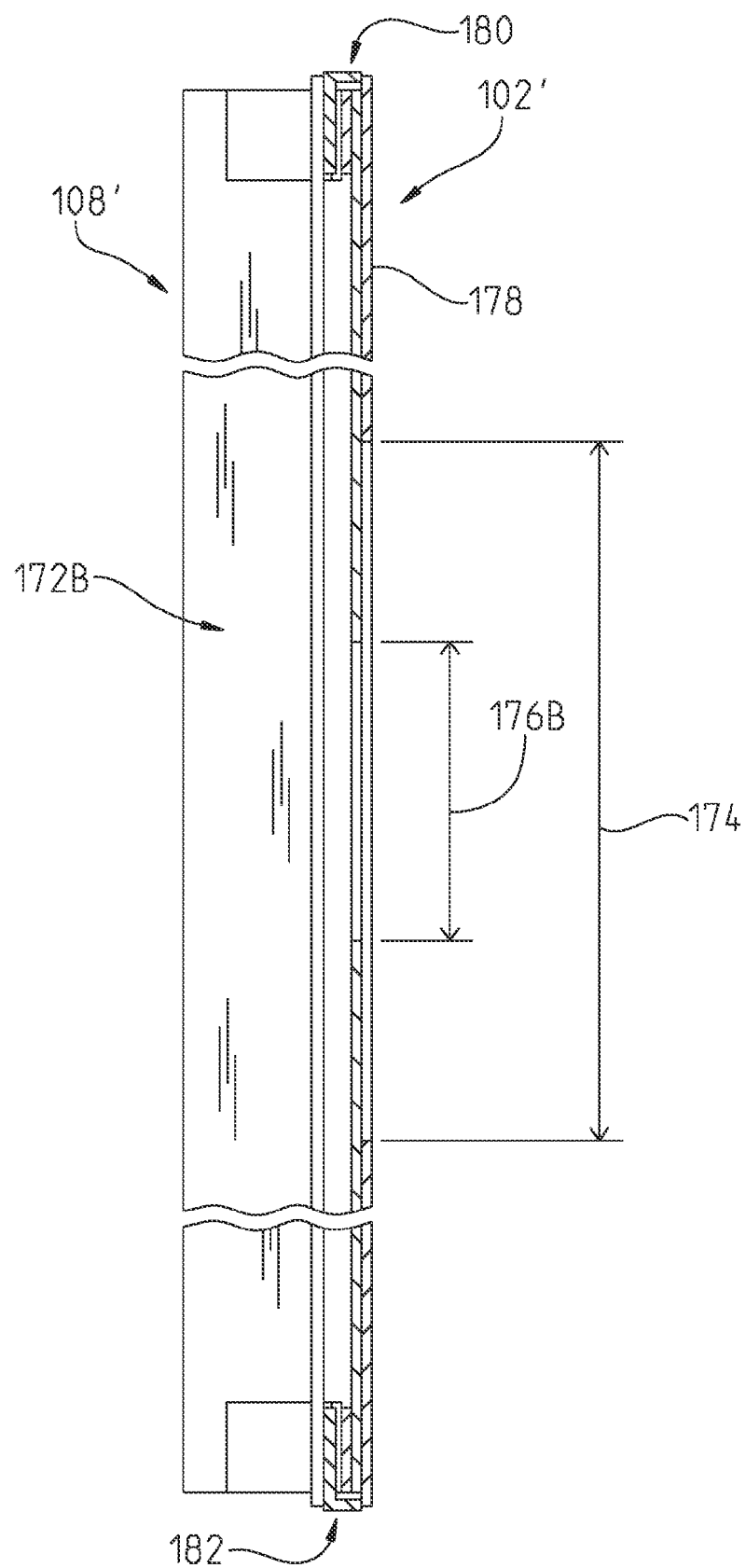
FIG. 12A illustrates a sectional view along line 12A-12A in FIG. 12.
Figure 14:
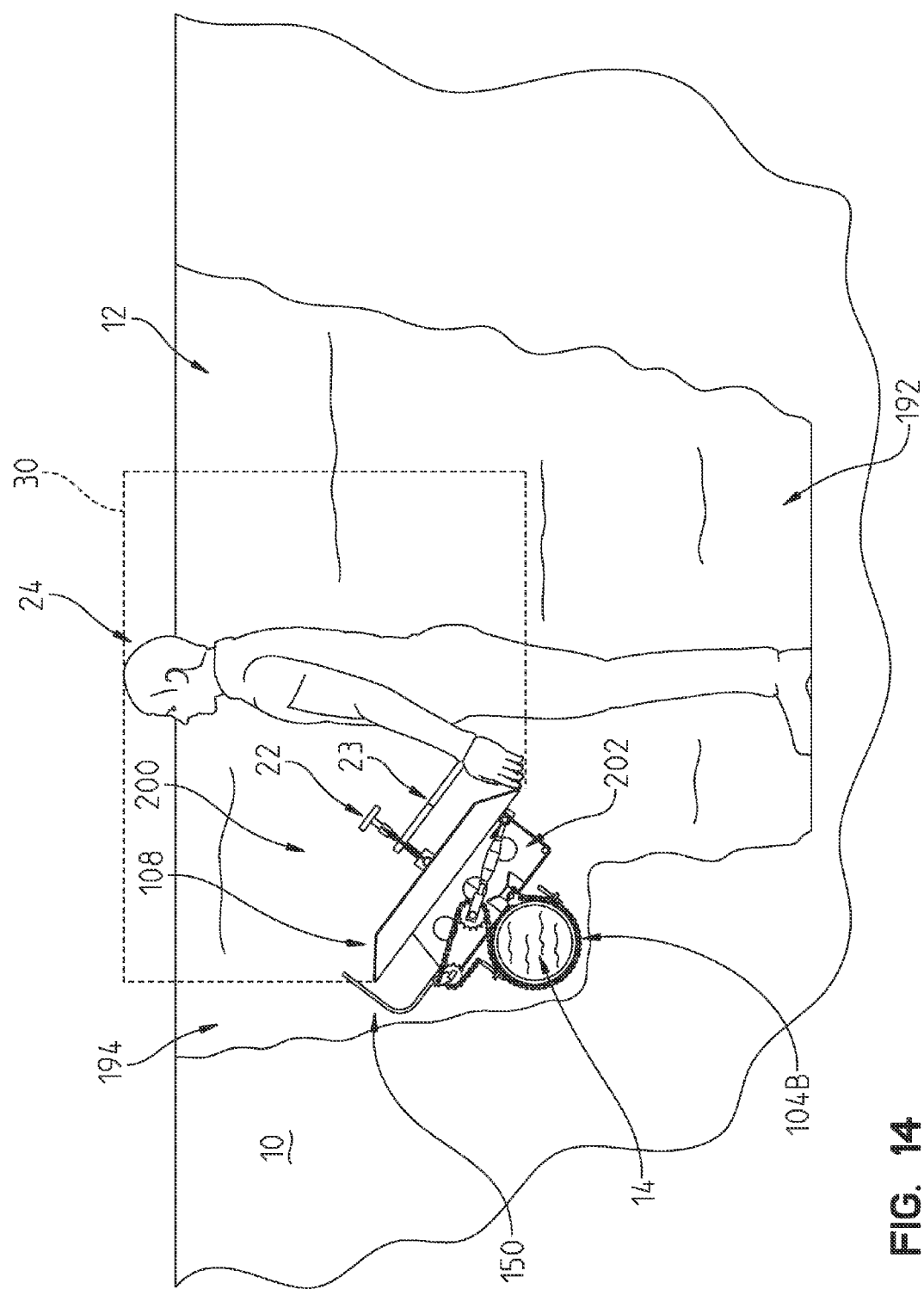
FIG. 14 illustrates a side view of FIG. 13 oriented along a longitudinal axis of the fluid supply line.
Figure 15:
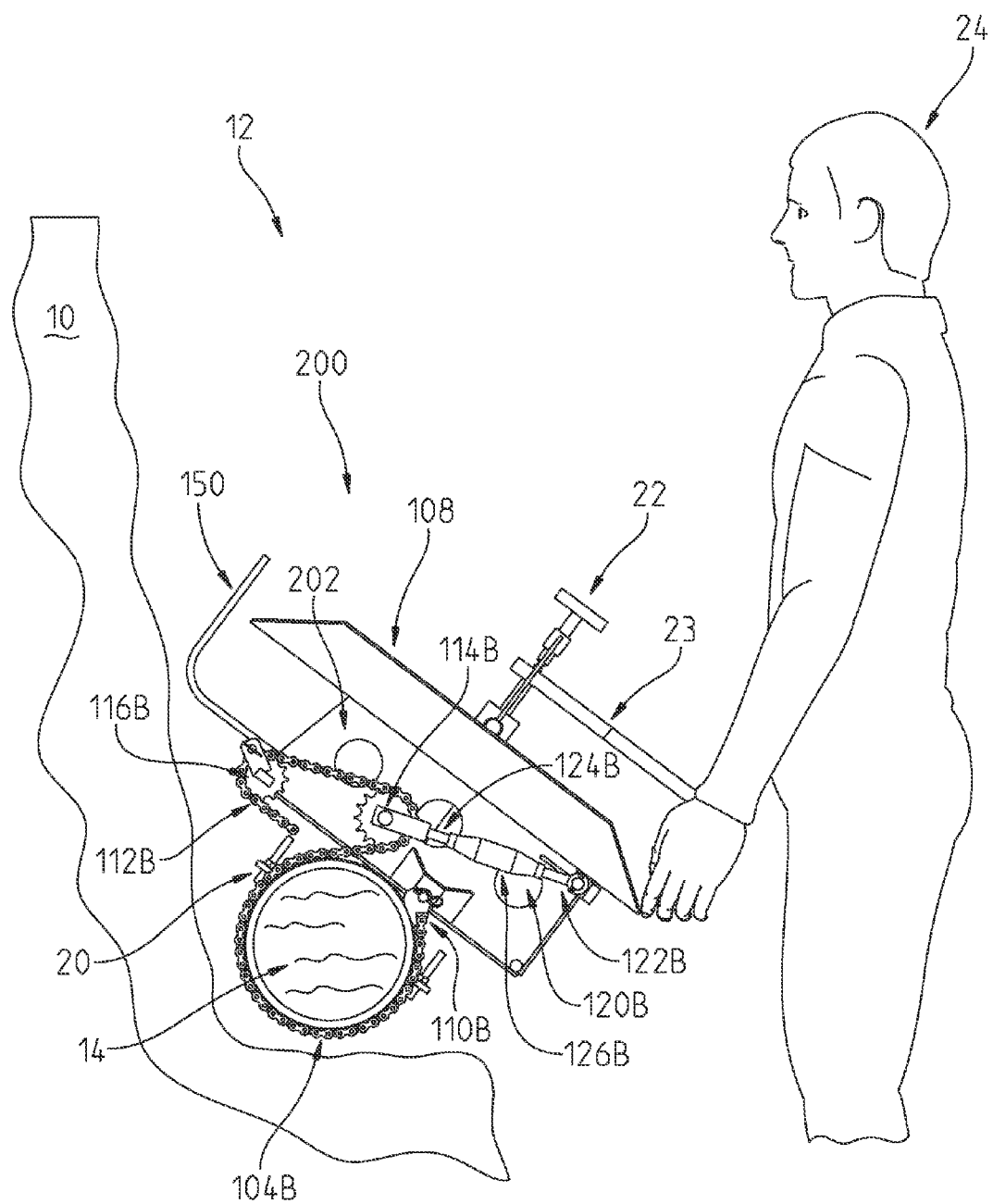
FIG. 15 illustrates an enlarged view of a portion of FIG. 14.
Figure 16:
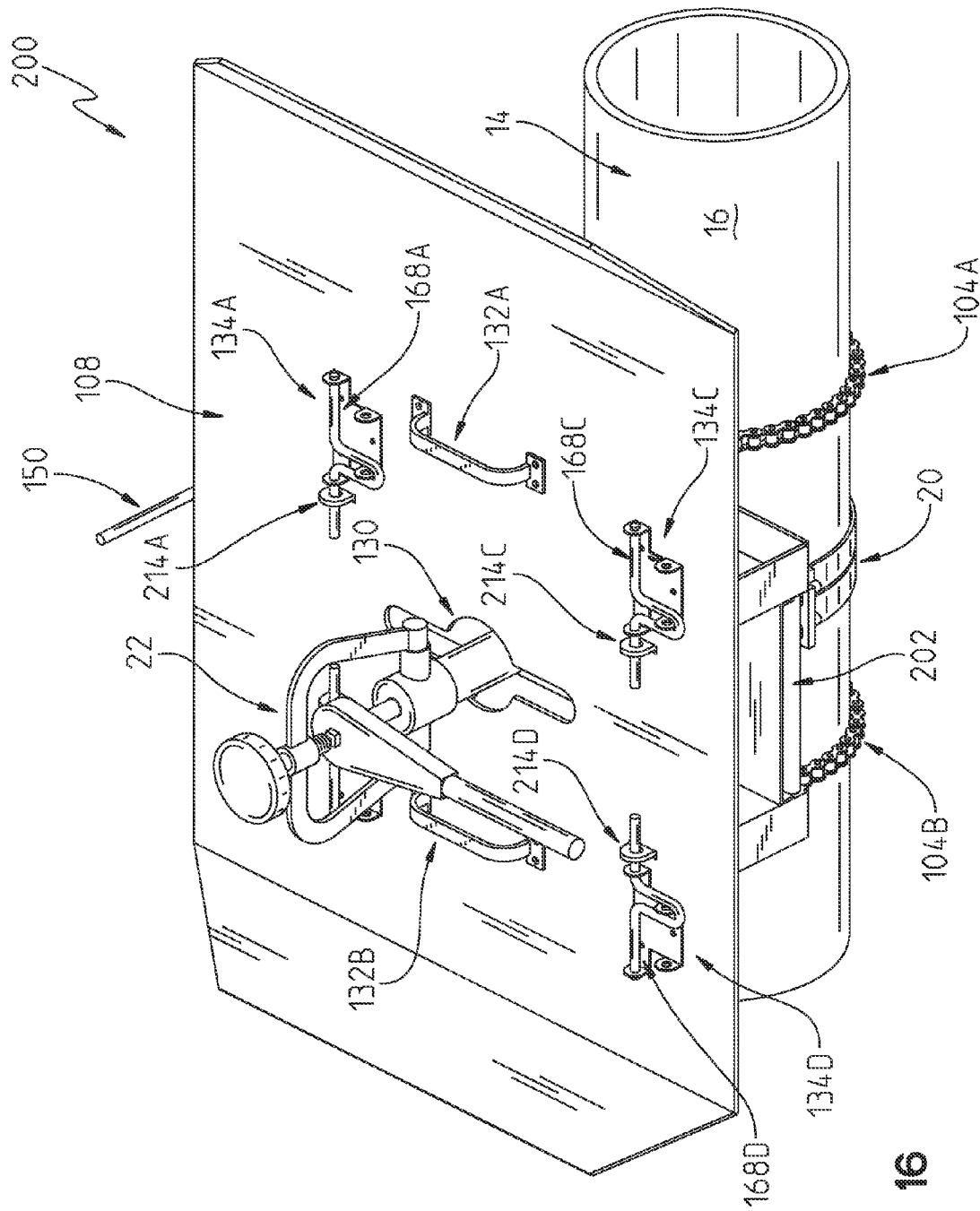
FIG. 16 illustrates a front, perspective view of the safety device of FIG. 13 coupled to the fluid supply line of FIG. 13.
Figure 17:
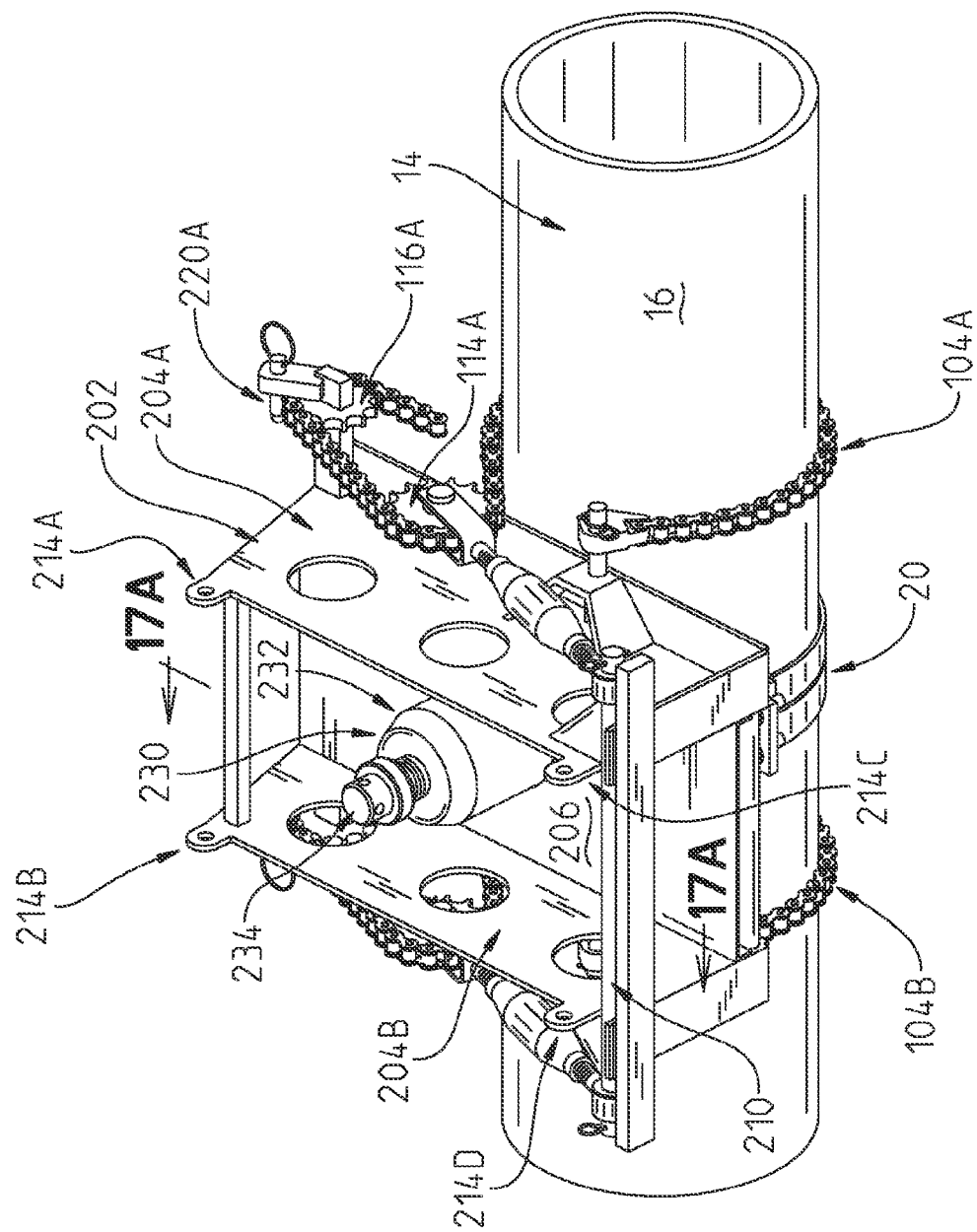
FIG. 17 illustrates a frame of the safety device and an alignment member to locate the frame of the safety device.
Figure 17A:
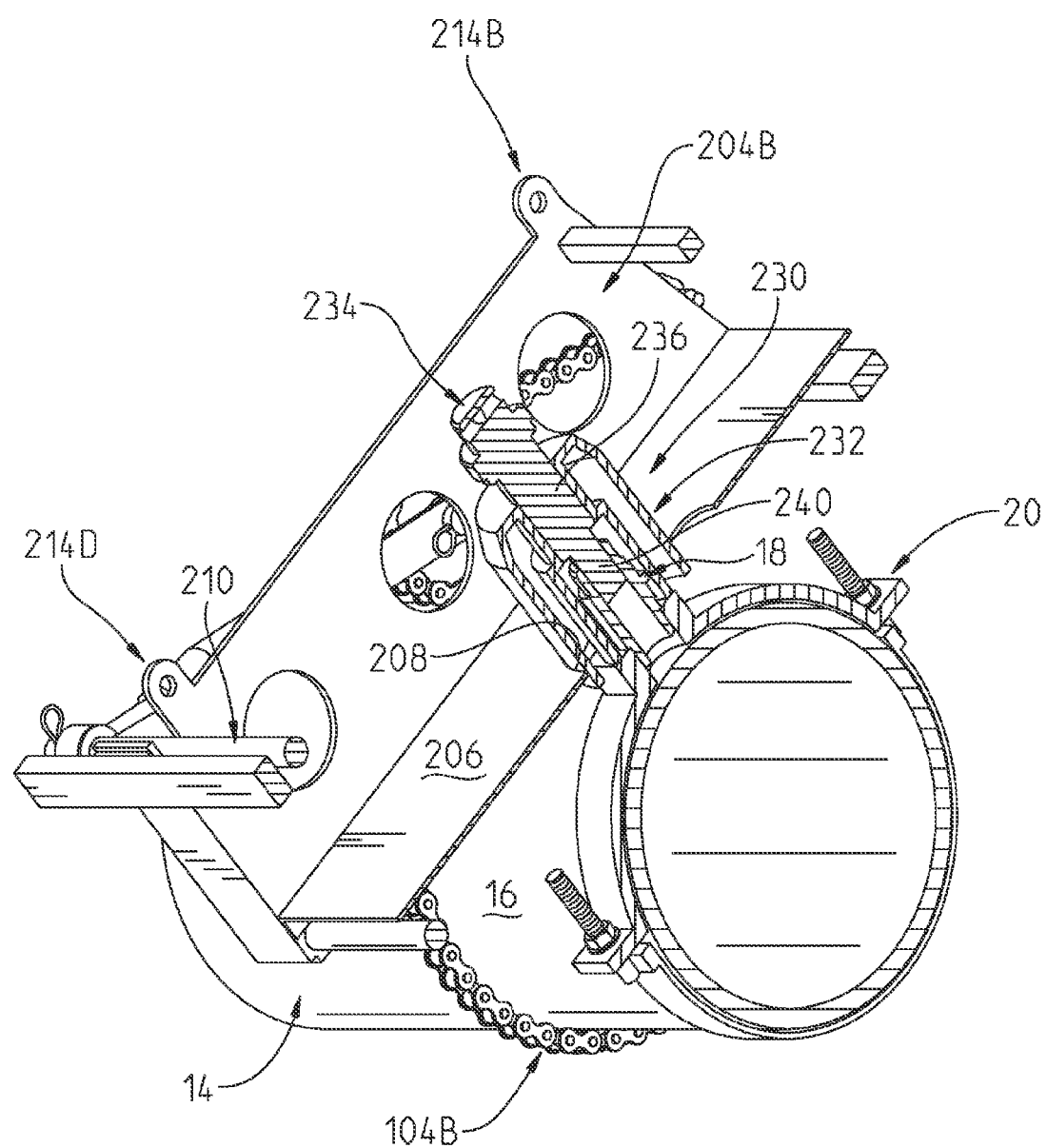
FIG. 17A is a sectional view along lines 17A-17A in FIG. 17.
Figure 18:
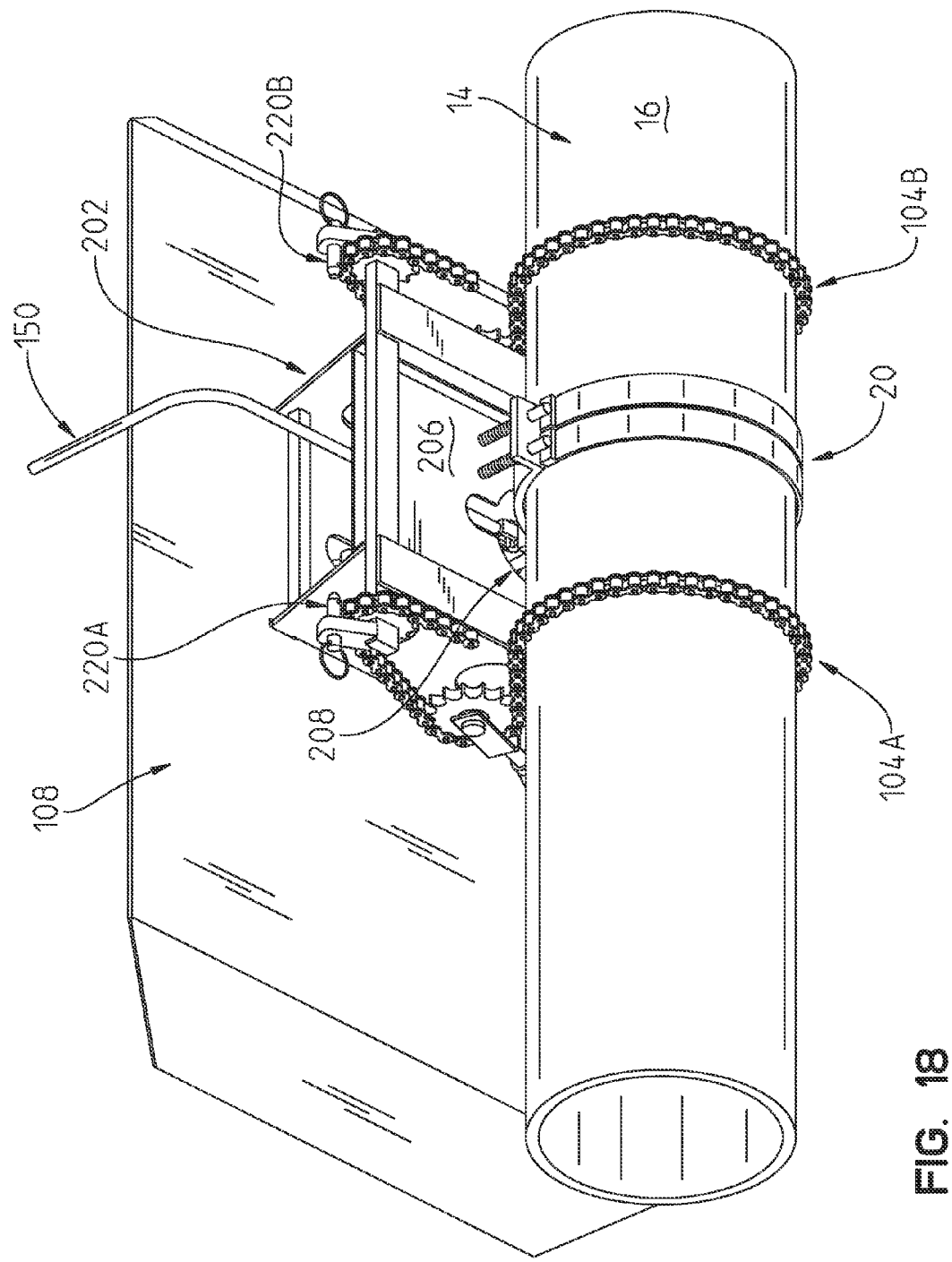
FIG. 18 illustrates a rear, perspective view of the arrangement of FIG. 16.

Referring to FIG. 12A, shield 108' is shown coupled to a frame 102'. Frame 102' may be coupled to fluid carrying line 14 is a similar manner as frame 102. Frame 102' supports a first shield portion 178 which is coupled to frame 102'. First shield portion 178 includes an opening 174 through which corporation stop 18 and saddle 20 may extend. In one embodiment, the opening 174 is hexagonal in shape.

Frame 102' includes an upper channel member 180 and a lower channel member 182. Channel members 180 and 182, along with first shield portion 178, define channels for receiving moving portions 172 of shield 108'. Channel members 180 and 182 are each coupled to first shield portion 178 and an upper frame member 190. Moving portions 172 include upper stiffening portions 184 and lower stiffening portions 186 which are received in the channels. Moving portions 172 include an opening 176 having a height which is smaller than the height of opening 174.

An exemplary method of operation of safety device 100 is described with reference to FIGS. 1-11. Referring to FIG. 1, pit 12 is dug in ground 10 to expose a portion of fluid carrying line 14. The flow of fluid through fluid carrying line 14 does not need to be interrupted to use safety device 100. Pit 12 includes a first portion 192 dug to the side of fluid carrying line 14 for the operator to stand or kneel depending on the depth of the first portion 192 and a second portion containing the fluid carrying line 14.

Referring to FIG. 7, saddle 20 is coupled to fluid carrying line 14. Saddle 20 includes a first portion 194 having a threaded opening to couple corporation stop 18 and a second portion 196. First portion 194 and second portion 196 are coupled together as is known and conform to the wall 16 of fluid carrying line 14. Corporation stop 18 is then coupled to saddle 20, if not already coupled thereto.

At this point one of tap machine 22 and frame 102 is placed over saddle 20 and rested on fluid carrying line 14. For the sake of illustration, frame 102 is placed over saddle 20. An operator 24 may maneuver frame 102 by holding on to handles 198 (see FIG. 6) of frame 102.

Couplers 104 of safety device 100 are wrapped around fluid carrying line 14. First end 110 of couplers 104 are coupled to protruding member 111 and second end 112 are coupled to second sprockets 116. At this point, couplers 104 are loosely fit around fluid carrying line 14, such as shown in FIG. 9. By rotating coupler portion 126 of tensioning members 120, couplers 104 may be loosely snugged up around fluid carrying line 14. In one embodiment, couplers 104 are snugged to a point that frame 102 does not freely rotate relative to fluid carrying line 14, but frame 102 is still moveable relative to fluid carrying line 14 by the operator.

Frame 102 is then rotated to the desired placement relative to saddle 20. In one embodiment, this is generally the placement illustrated in FIG. 2. In one embodiment, frame 102 may be placed generally on top of fluid carrying line 14 while the free end or ends of couplers 104 are coupled to frame 102, snugged with tensioning members 120, and then moved to the position generally shown in FIG. 2.

First shield 106 is placed on frame 102. As mentioned herein, first wall 156 and second wall 158 are held between upstanding frame members 160 and upstanding frame members 162 of frame 102. In one embodiment, the position of frame 102 generally results in opening 152 of first shield 106 being centered around corporation stop 18. Tap machine 22 is coupled to corporation stop 18 without torque member 23. As is known, the torque member 23 couples to the tapping pin 25 of tap machine 22 and is actuated by the operator 24 to either advance the tapping pin 25 towards fluid carrying line wall 16 or retract tapping pin 25 away from fluid carrying line wall 16 (see FIG. 10).

Second shield 108 is coupled to frame 102 with tap machine 22 extending therefrom. Tap machine 22 passes through opening 130 in second shield 108. The operator 24 holds second shield 108 with handles 132 and may need to rotate second shield 108 to pass the upper portion of tap machine 22 through opening 130. The operator 24 positions second shield 108 so that frame portions 136 extend through the openings in second shield 108. Locking pin 168 of locking members 134 are passed through the openings in frame portions 136 to couple second shield 108 to frame 102. Torque member 23 is coupled to tap machine 22 and tap machine 22 is operated to tap fluid carrying line 14.

Once tapping is successfully completed, the tapping pin 25 of tap machine 22 is retracted out of fluid carrying line wall 16 and corporation stop 18 through the actuation of torque member 23 by the operator 24. Torque member 23 may be removed from tap machine 22.

Second shield 108 may be removed (after the removal of torque member 23). Prior to tap machine 22 being removed, a tool 150 (see FIG. 6) is used to move the valve of corporation stop 18 to the closed state. In the illustrated embodiment, tool 150 is placed between first shield 106 and frame 102 in order to rotate the valve of corporation stop 18 (see FIG. 10). Tool 150 has a valve engagement portion which is shaped to engage and turn the valve control knob of corporation stop 18 when tool 150 is turned. Tap machine 22 may now be removed. First shield 106 is removed. Couplers 104 are loosened with tensioning members 120, one end of couplers 104 is uncoupled from frame 102, and frame 102 is removed.

Figure 2A:
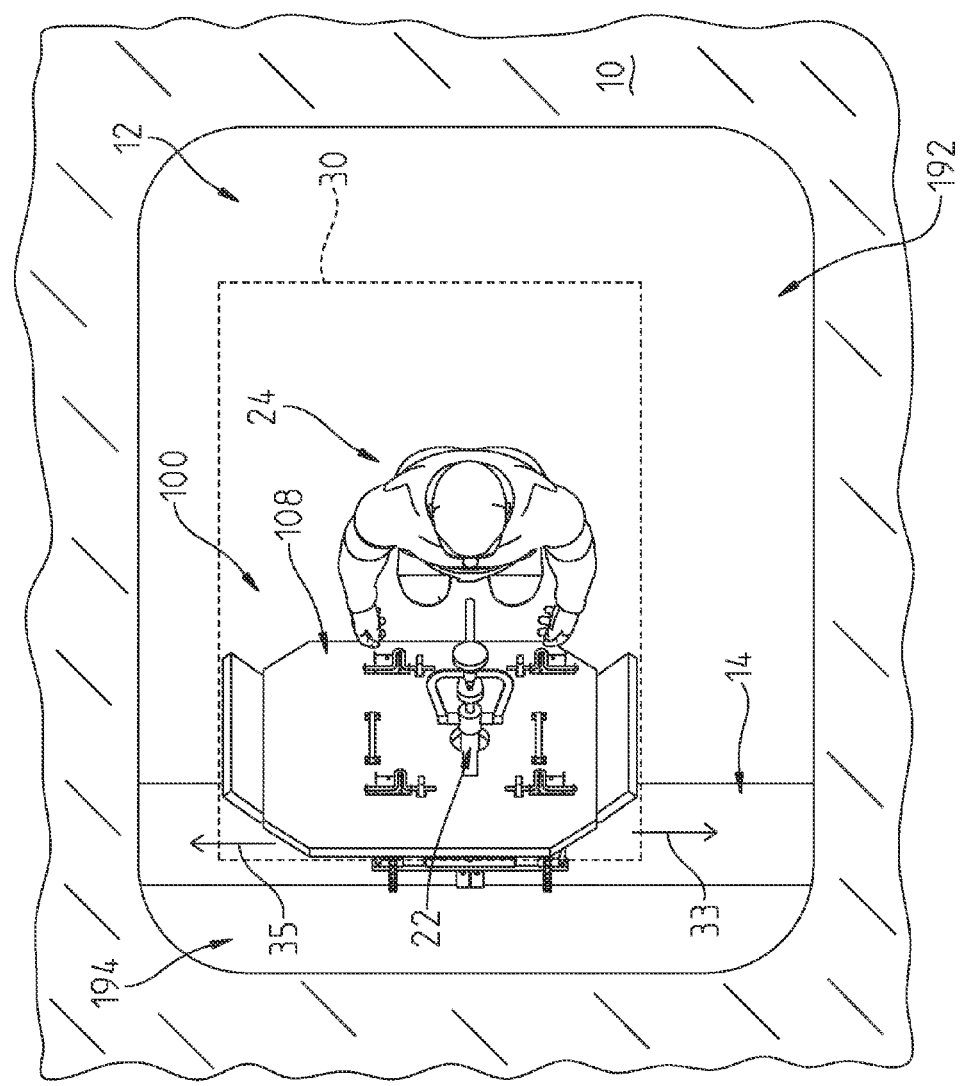
FIG. 2A illustrates a top view of FIG. 1.
Figure 3:
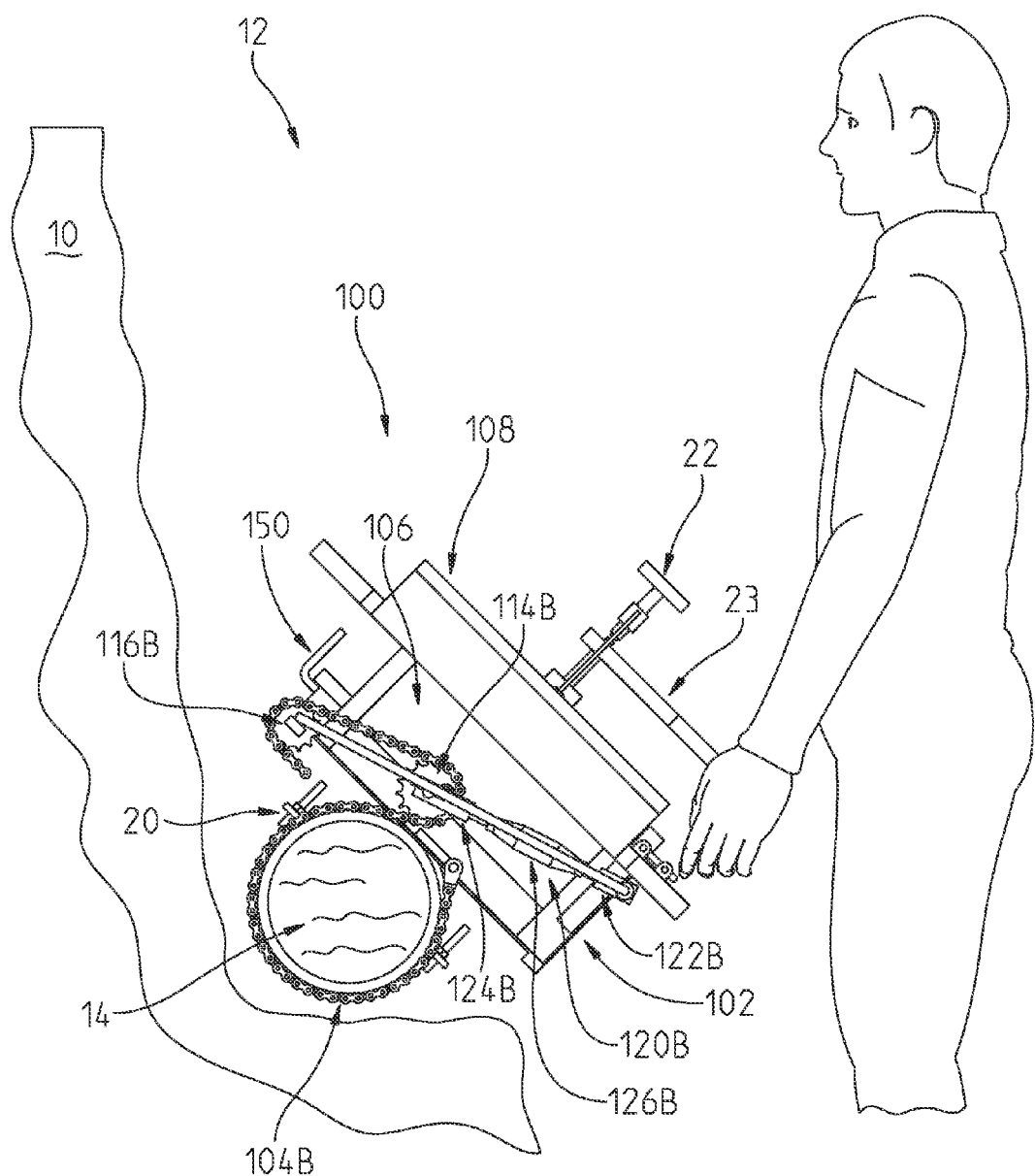
FIG. 3 illustrates an enlarged view of a portion of FIG. 2.

If a rupture occurs during the tapping operation, safety device 100 operates to deflect fluid and wall fragments from striking the operator 24. Referring to FIG. 2, fluid traveling in directions 26 and 28 toward operator space 30 is deflected by safety device 100 generally in directions 32 and 34 (see FIG. 2) and directions 33 and 35 (see FIG. 2A).

Figure 19:
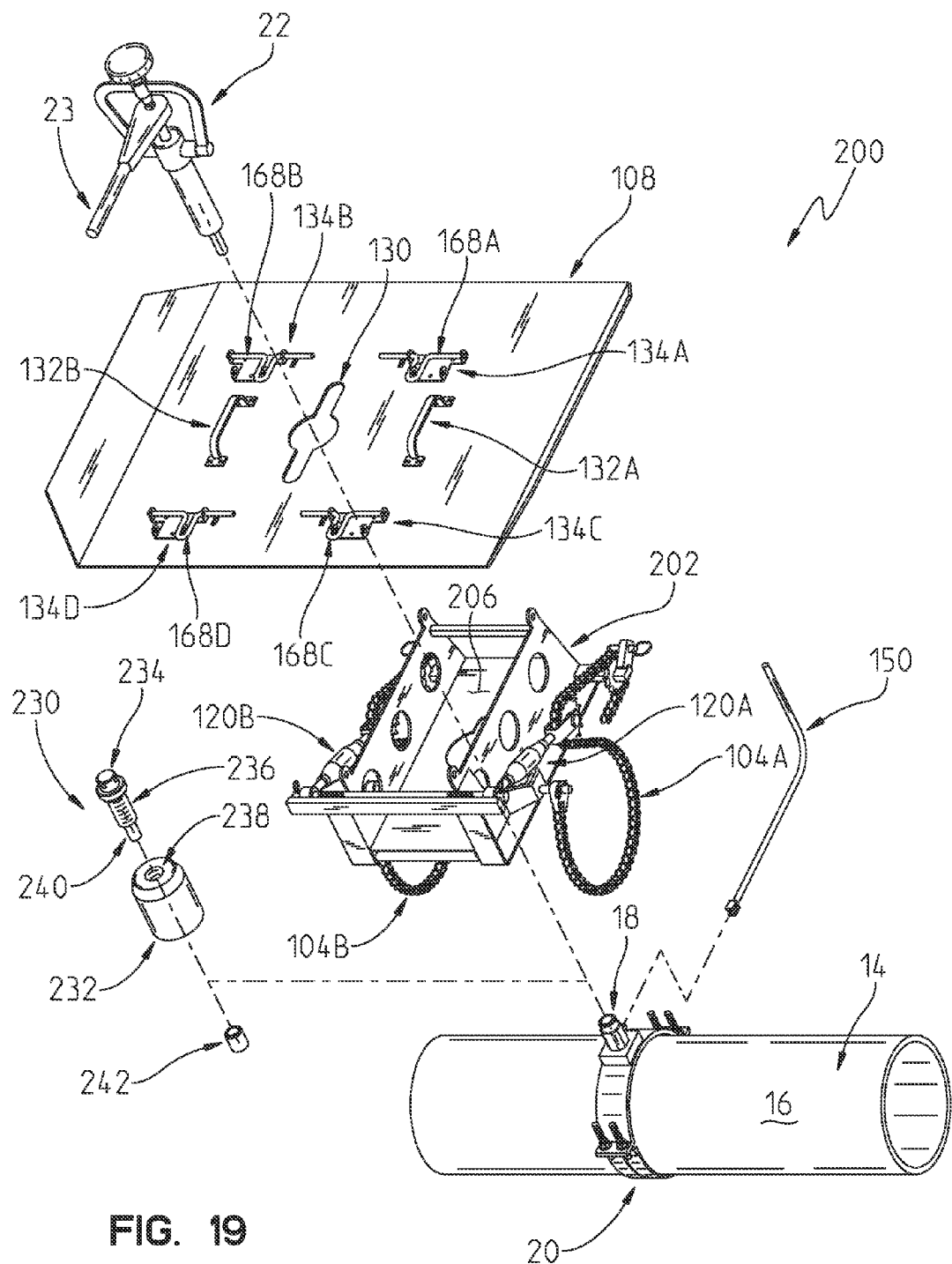
FIG. 19 illustrates an exploded view of the arrangement of FIG. 16 and the alignment member of FIG. 17.
Figure 20:
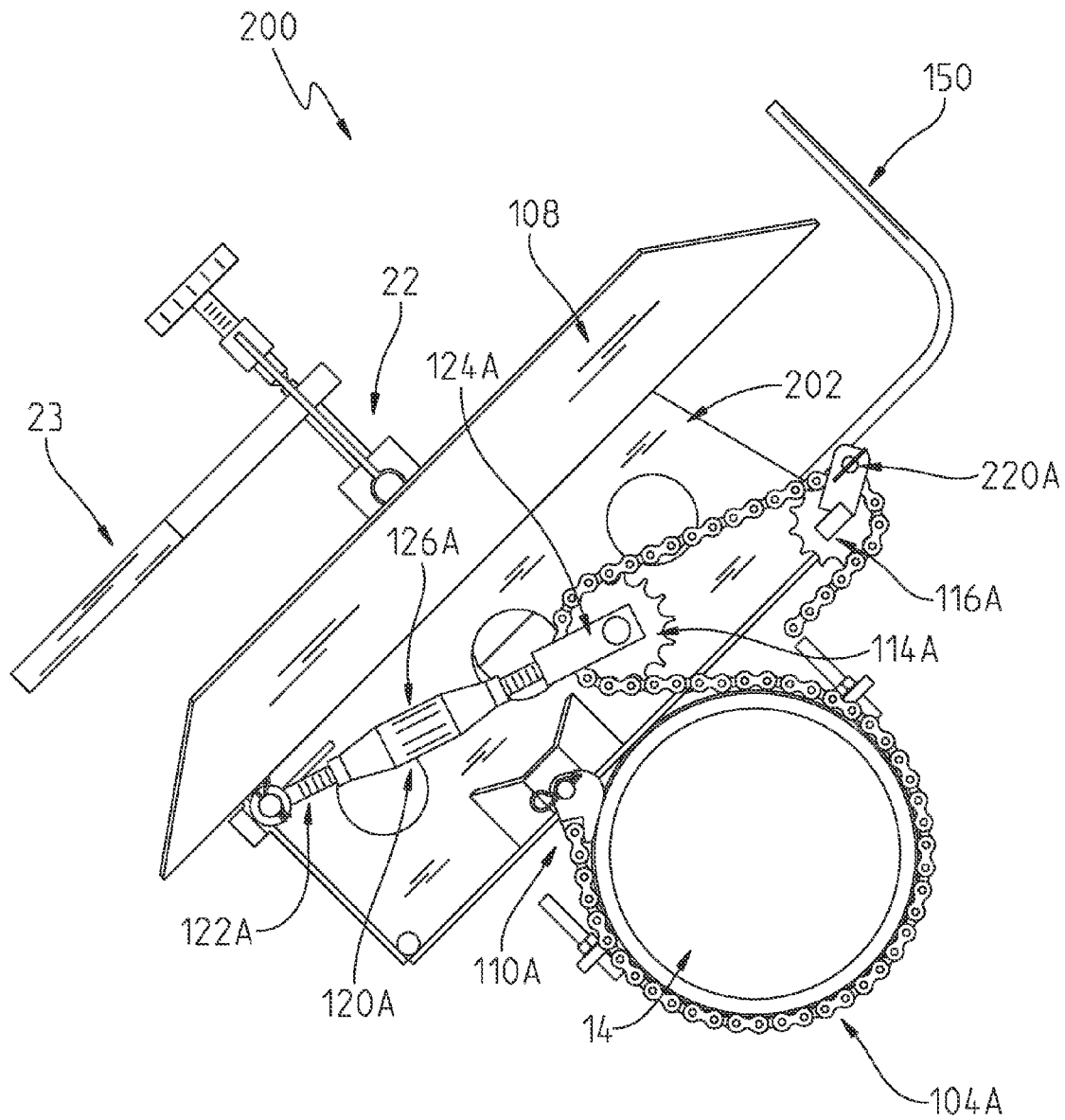
FIG. 20 illustrates a side view of FIG. 16 oriented along a longitudinal axis of the fluid supply line.
Figure 21:
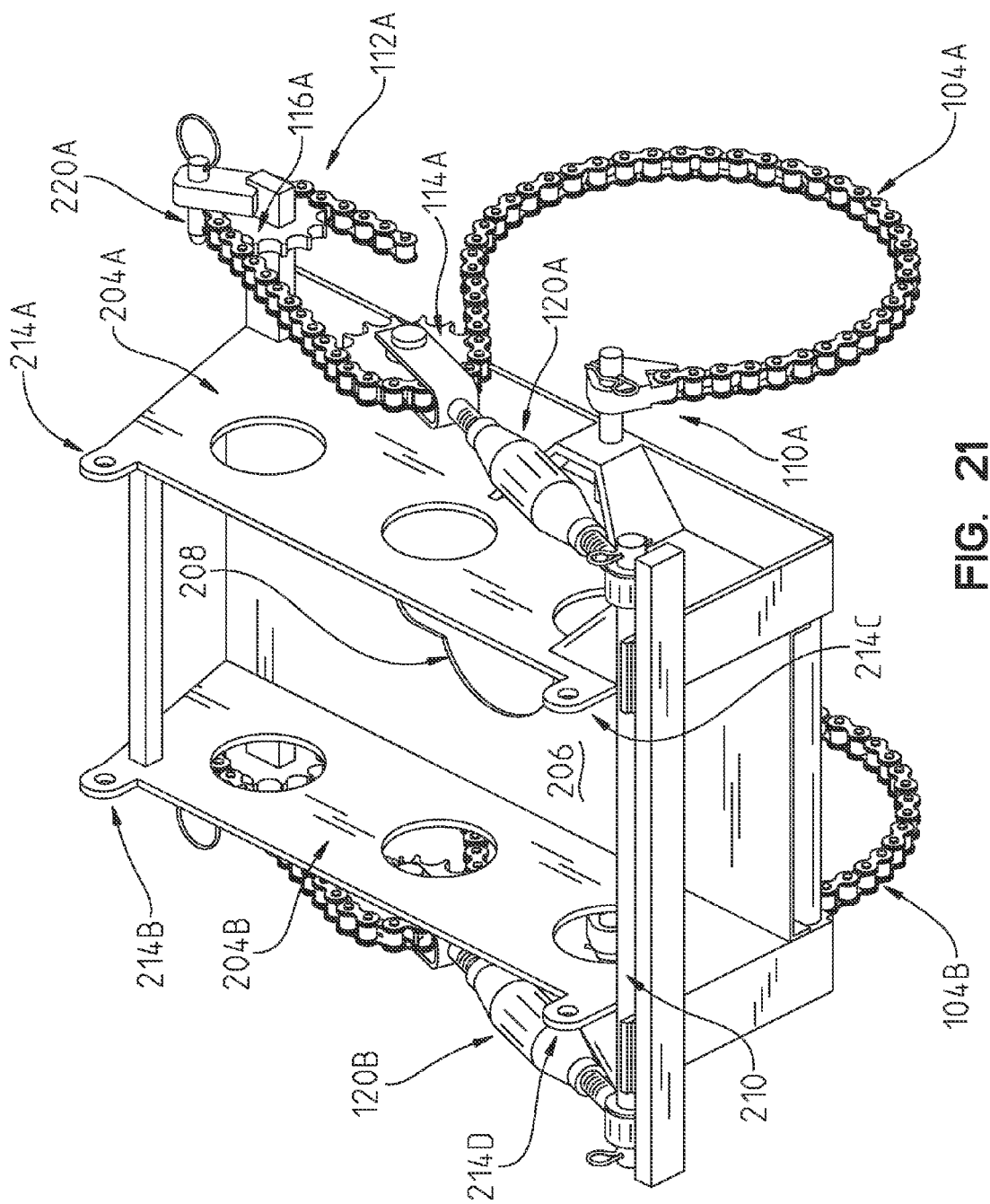
FIG. 21 illustrates a front, perspective view of the frame of the safety device of FIG. 16.

Referring to FIGS. 13-21, another exemplary safety device 200 is shown. Referring to FIG. 19, safety device 200 includes a frame 202. Referring to FIG. 21, frame includes upstanding walls 204 and a shield member 206 extending between walls 204A and 204B. Upstanding walls 204 include portions 214 which extend through second shield 108 and interact with locking pins 168 of locking members 134 to hold second shield 108 relative to upstanding walls 204.

Shield member 206 includes an opening 208 sized to receive a portion of saddle 20 and corporation stop 18. The components of frame 202 are welded or otherwise coupled together.

Frame 202 includes a mounting bar 210. First portions 122 of tensioning members 120 are rotatably coupled to mounting bar 210. Frame 202, like frame 102, includes protruding portions 211 which rotatably couple first end 110 of couplers 104. Second sprockets 116 are welded or otherwise coupled to frame 102. As shown in FIG. 21, locking pins 220 are used to hold second ends 112 of couplers 104 relative to second sprockets 116.

Safety device 200 includes an alignment member 230 for orienting frame 202 relative to corporation stop 18. Referring to FIG. 19, alignment member 230 includes a housing 232 and a threaded alignment coupler 234. The exterior of housing 232 is sized to generally match the size of opening 208 in shield member 206.

Alignment coupler 234 includes a threaded portion 236 which threadably engages threads provided on an opening 238 of housing 232 and a reduced diameter portion 240. Portion 240 is sized to be received in the opening of corporation stop 18 and generally match the size of the opening of corporation stop 18. In one embodiment, portion 240 is sized for a ¾ inch corporation stop. In the case of a larger corporation stop being used, an adapter 242 may be used. Adapter 242 has an interior sized to receive and generally match portion 240 and an exterior sized to be received by and generally match the opening of a larger corporation stop, such as a 1 inch corporation stop.

Since alignment coupler 234 is threadably engaged with housing 232, the position of portion 240 relative to corporation stop 18 may be adjusted. Portion 240 may be raised or lowered relative to housing 232.

An exemplary method of operation of safety device 200 is described with reference to FIGS. 13-21. Referring to FIG. 13, pit 12 is dug in ground 10 to expose a portion of fluid carrying line 14. The flow of fluid through fluid carrying line 14 does not need to be interrupted to use safety device 200. Pit 12 includes a first portion 192 dug to the side of fluid carrying line 14 for the operator to stand or kneel depending on the depth of the first portion 192 and a second portion containing the fluid carrying line 14.

Referring to FIG. 19, saddle 20 is coupled to fluid carrying line 14. Saddle 20 includes a first portion 194 having a threaded opening to couple corporation stop 18 and a second portion 196. First portion 194 and second portion 196 are coupled together as is known and conform to the wall 16 of fluid carrying line 14. Corporation stop 18 is then coupled to saddle 20, if not already coupled thereto.

Alignment member 230 is assembled to corporation stop 18. To assemble alignment member 230 to corporation stop 18, portion 240 is positioned relative to housing 232 so that portion 240 is received in the interior of corporation stop 18.

Frame 202 is placed over alignment member 230, such that alignment member 230 is received in opening 208 of shield member 206. Tensioning members 120 are used as handles to move frame 202. Couplers 104 are positioned around fluid carrying line 14 and both ends are secured to protruding portions 211 and second sprockets 116, respectively, if not already secured. Tensioning members 120 are actuated to tighten couplers 104 about fluid carrying line 14.

Alignment member 230 is removed from corporation stop 18. Tap machine 22 is coupled to corporation stop 18 without torque member 23. As is known, the torque member 23 couples to the tapping pin 25 of tap machine 22 and is actuated by the operator 24 to either advance the tapping pin 25 towards fluid carrying line wall 16 or retract tapping pin 25 away from fluid carrying line wall 16.

Second shield 108 is coupled to frame 202 with tap machine 22 extending therefrom. Tap machine 22 passes through opening 130 in second shield 108. The operator 24 holds second shield 108 with handles 132 and may need to rotate second shield 108 to pass the upper portion of tap machine 22 through opening 130. The operator 24 positions second shield 108 so that frame portions 214 extend through the openings in second shield 108. Locking pins 168 of locking members 134 are passed through the openings in frame portions 214 to couple second shield 108 to frame 102. Torque member 23 is coupled to tap machine 22 and tap machine 22 is operated to tap fluid carrying line 14.

Once tapping is successfully completed, the tapping pin 25 of tap machine 22 is retracted out of fluid carrying line wall 16 and corporation stop 18 through the actuation of torque member 23 by the operator 24. Torque member 23 may be removed from tap machine 22.

Second shield 108 may be removed (after the removal of torque member 23). Prior to tap machine 22 being removed, a tool 150 (see FIG. 19) is used to move the valve of corporation stop 18 to the closed state. In the illustrated embodiment, tool 150 is placed under frame 202 in order to rotate the valve of corporation stop 18 (see FIG. 18). Opening 208 has an enlarged portion to provide clearance of the movement of tool 150. Tool 150 has a valve engagement portion which is shaped to engage and turn the valve control knob of corporation stop 18 when tool 150 is turned. Tap machine 22 may now be removed. In one embodiment, alignment member 230 is again assembled to corporation stop 18. In one embodiment, alignment member 230 is not assembled again to corporation stop 18. Couplers 104 are loosened with tensioning members 120, one end of couplers 104 is uncoupled from frame 202, and frame 202 is removed.

If a rupture occurs during the tapping operation, safety device 200 operates to deflect fluid and wall fragments from striking the operator 24. Safety device 200 deflects the fluid and fragments in generally the same directions as safety device 100.

Figure 22:
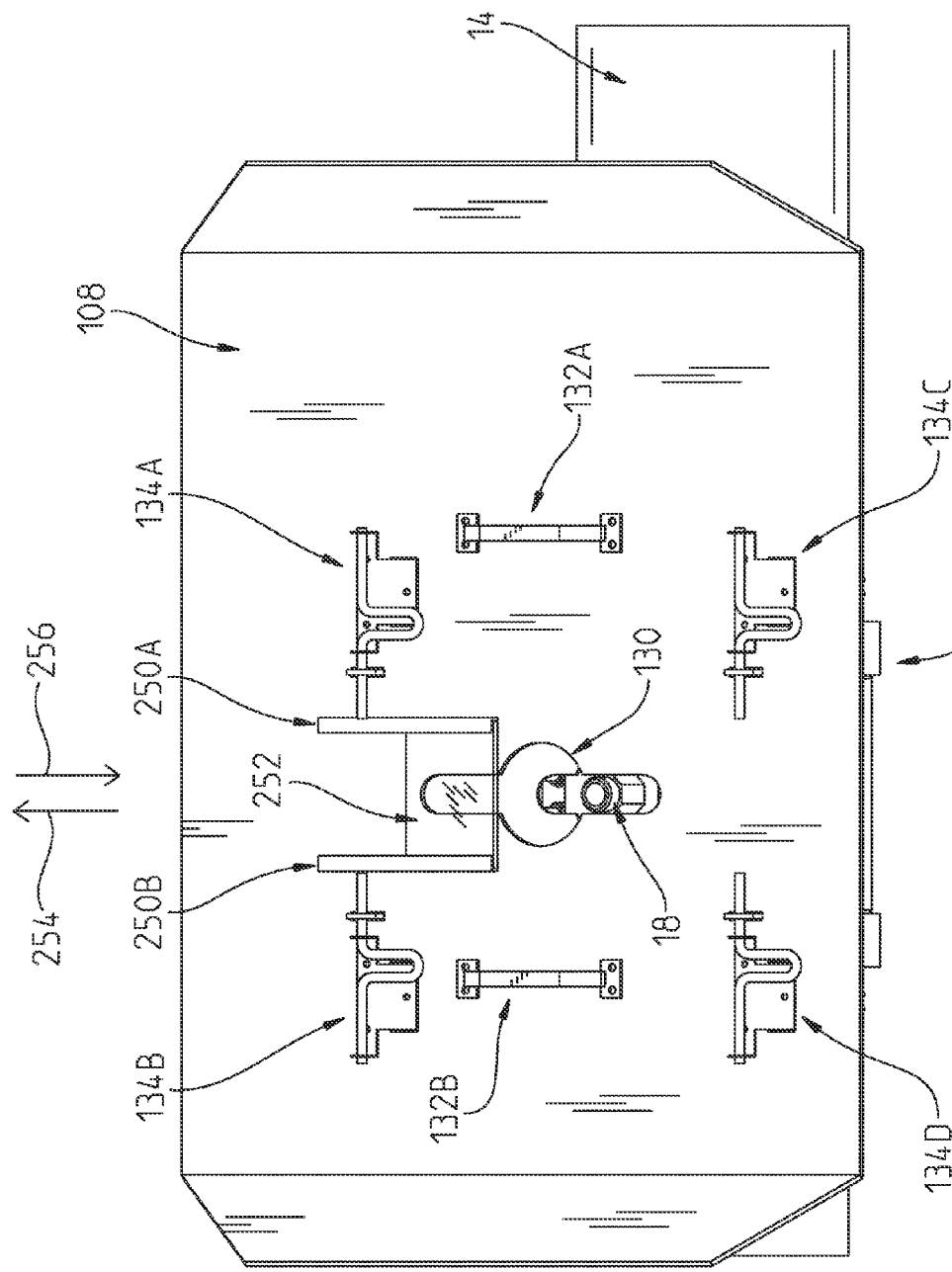
FIG. 22 illustrates a window coupled to the shield member of FIG. 16
Figure 23:
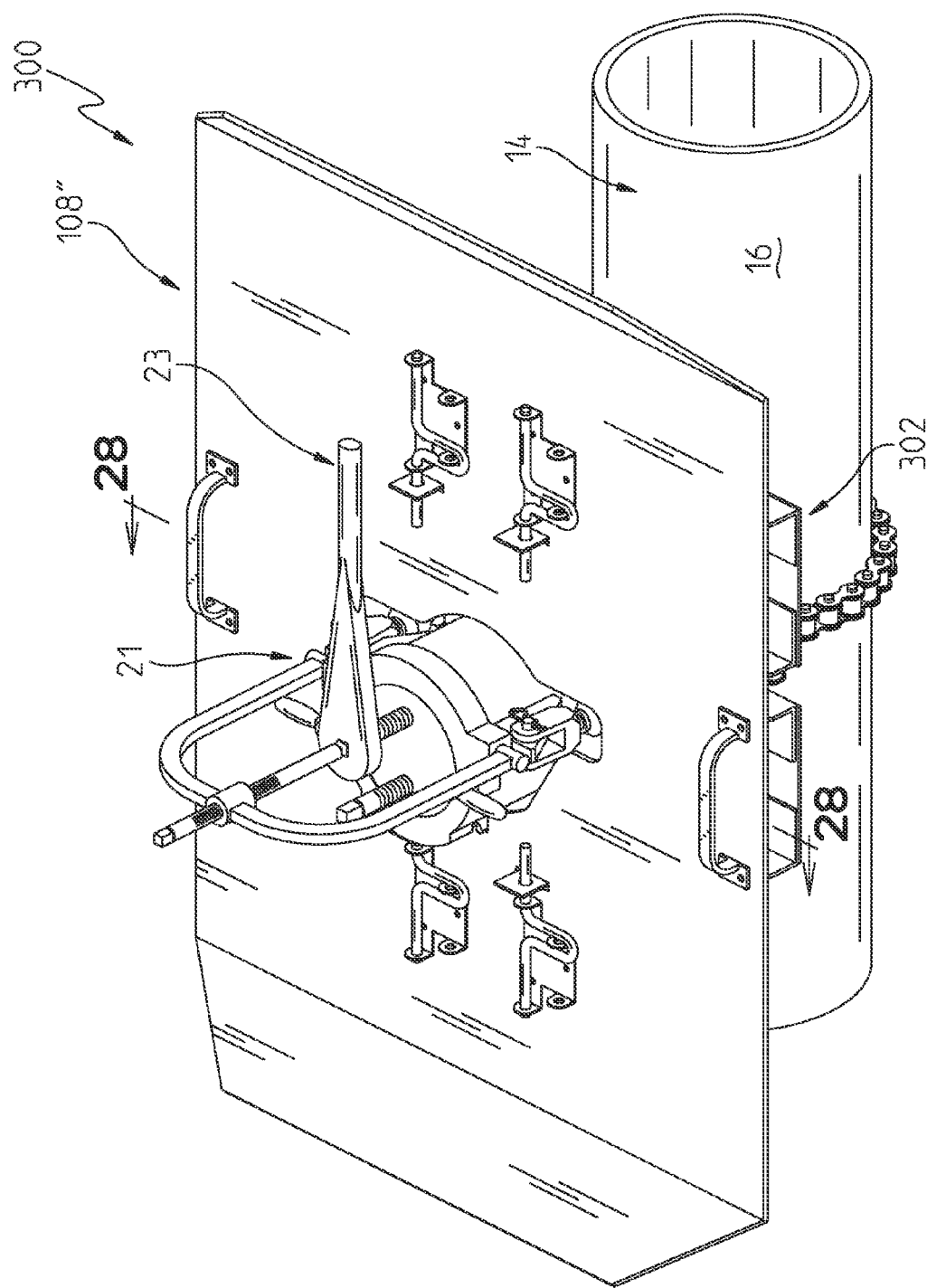
FIG. 23 illustrates a front, perspective view of an exemplary safety device and a direct tap machine.

Referring to FIG. 22, in one embodiment, second shield 108 includes channel members 250 welded or otherwise secured to second shield 108. The channel members 250 provide channels that receive a window 252 which further blocks opening 130. Window 252 is moveable in direction 254 and direction 256. In one embodiment, window 252 is made of Plexiglas.

In one embodiment, second shield 108 is made of ¼ inch aluminum. In one embodiment, second shield 108 is made of 7 gauge aluminum. In one embodiment, second shield 108 is made of a metallic material and is up to about 0.25 inches thick. In one embodiment, second shield 108 is made of a metallic material and is up to about 0.14 inches thick.

Figure 25:
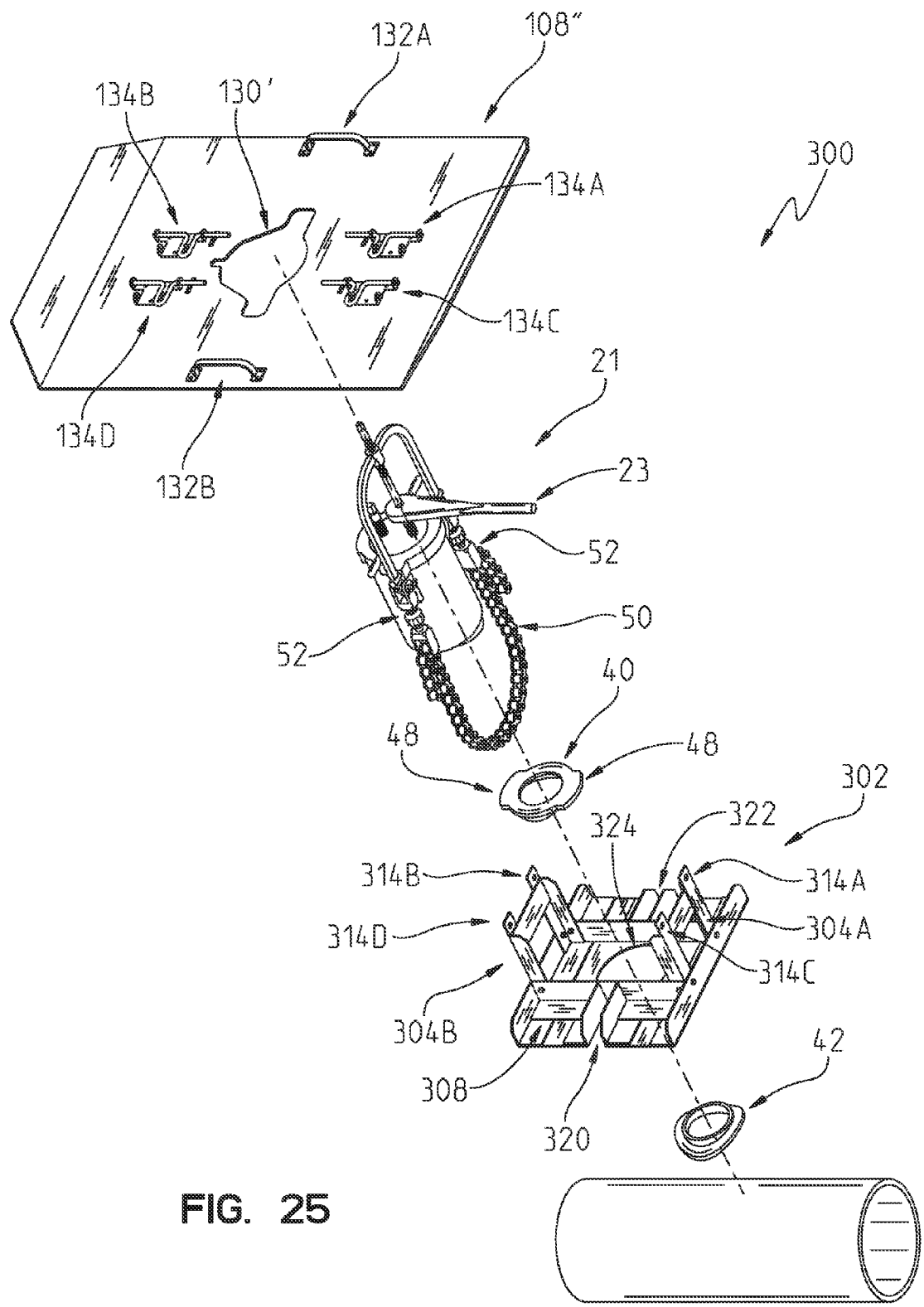
FIG. 25 illustrates an exploded view of the arrangement of FIG. 23.
Figure 26:
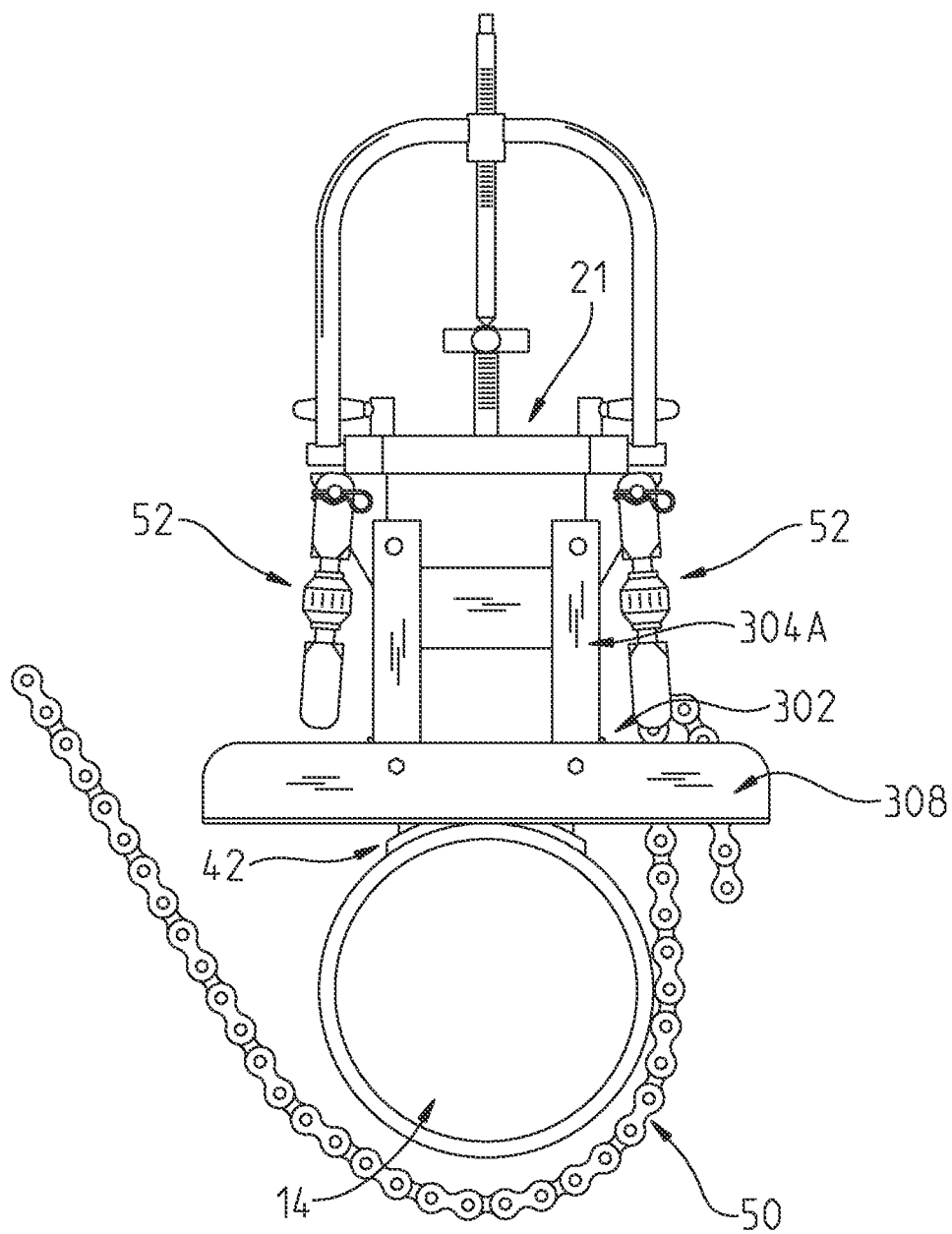
FIG. 26 illustrates the side view of FIG. 23 oriented along a longitudinal axis of the fluid supply line with a chain of the direct tap machine positioned around the fluid supply line and decoupled from the direct tap machine on one end portion.
Figure 27:
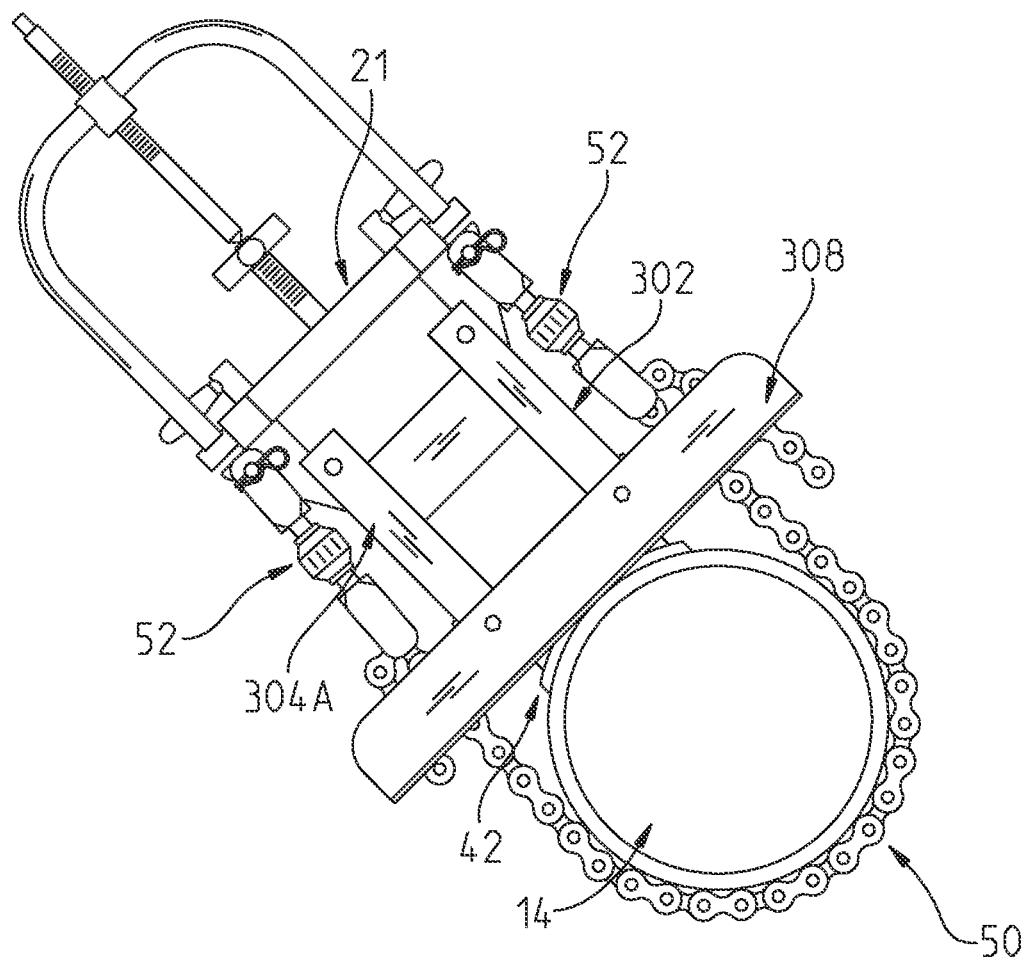
FIG. 27 illustrates the side view of FIG. 26 with the direct tap machine secured relative to the fluid supply line.

Referring to FIGS. 23-30, another exemplary safety device 300 is shown. Referring to FIG. 25, safety device 300 includes a frame 302. Referring to FIG. 21, frame 302 includes upstanding walls 304 and a shield member 306. Upstanding walls 304 are removably coupled to a base member 308 which includes shield member 306. Upstanding walls 304 include portions 314 which extend through second shield 108" and interact with locking pin 168 of locking members 134 to hold second shield 108" relative to upstanding walls 204. Second shield 108" is generally the same as second shield 108 except that the size of opening 130' has been altered to receive direct tap machine 21 and the location of handles 132 has been changed.

Referring to FIG. 25, direct tap machine 21 is coupled to fluid carrying line 14 through a saddle 40 and a seal 42. Saddle 40 is selected to generally match the curvature of wall 16 of fluid carrying line 14. To couple direct tap machine 21 to fluid carrying line 14, seal 42 is positioned at the desired location on wall 16. Saddle 40 is placed over seal 42. Direct tap machine 21 is placed over saddle 40. A chain 50 is placed around fluid carrying line 14 and both ends are secured to direct tap machine 21. Tensioning members 52 are used to tighten chain 50 and secure direct tap machine 21 relative to fluid carrying line 14.

As shown in FIG. 25, frame 302 includes a lower recess 320 and an upper recess 322 for receiving chain 50 in a base member 308. Frame 302 also includes an opening 324 sized to receive seal 42 and saddle 40. The size of opening 324 is selected to be smaller than one of a diameter of a lower portion of direct tap machine 21 or a diameter of a flange 48 of saddle 40. In this manner frame 302 is held relative to fluid carrying line 14 by one of saddle 40 and tap machine 21. The components of frame 302 are welded or otherwise coupled together.

An exemplary method of operation of safety device 300 is described with reference to FIGS. 23-30. A pit 12 is dug in ground 10 to expose a portion of fluid carrying line 14. The flow of fluid through fluid carrying line 14 does not need to be interrupted to use safety device 300. Pit 12 includes a first portion 192 dug to the side of fluid carrying line 14 for the operator to stand or kneel depending on the depth of the first portion 192 and a second portion containing the fluid carrying line 14.

Figure 28:
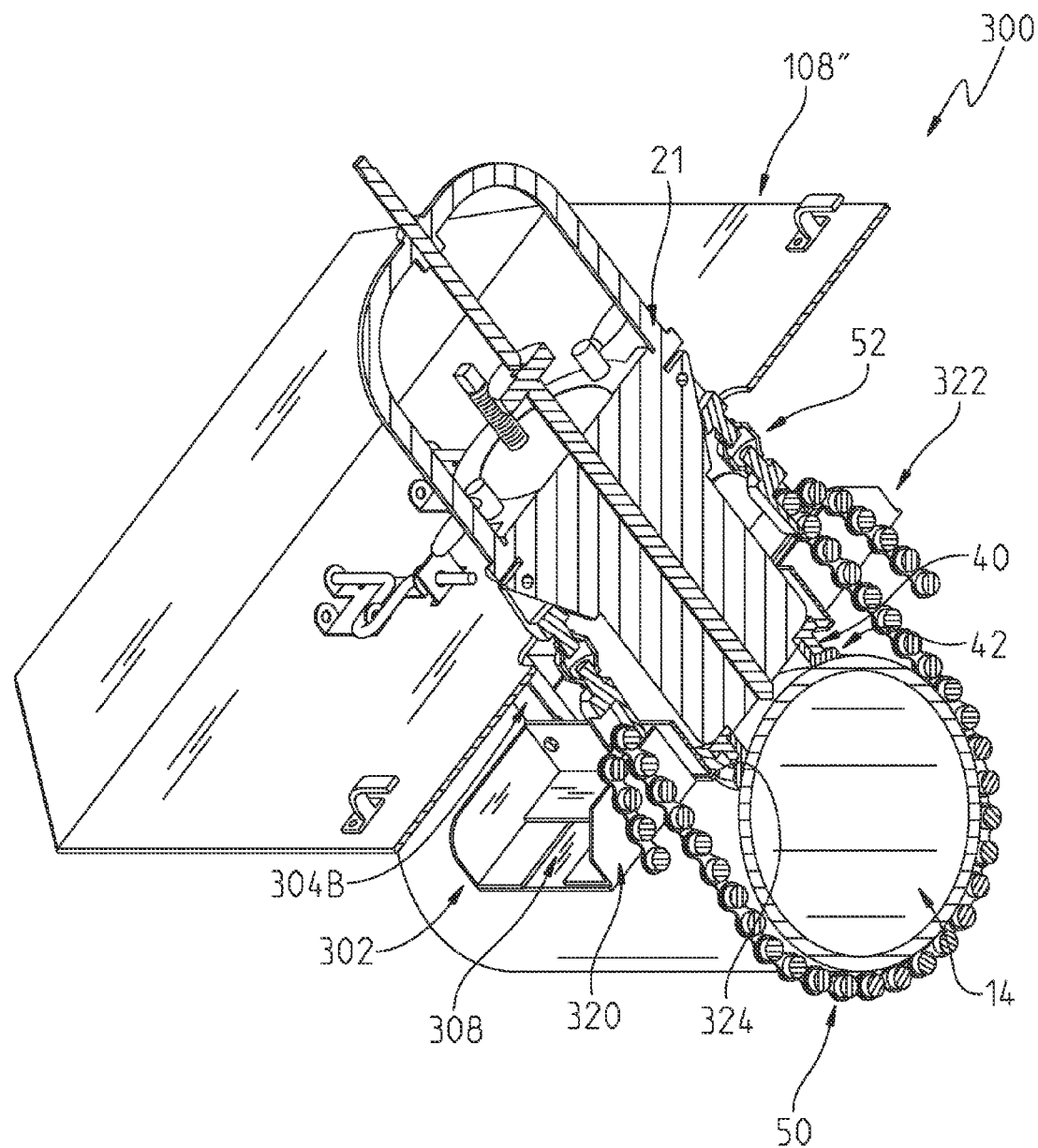
FIG. 28 illustrates a sectional view of along line 28-28 in FIG. 23 through a tapping location of the fluid supply line.
Figure 29:
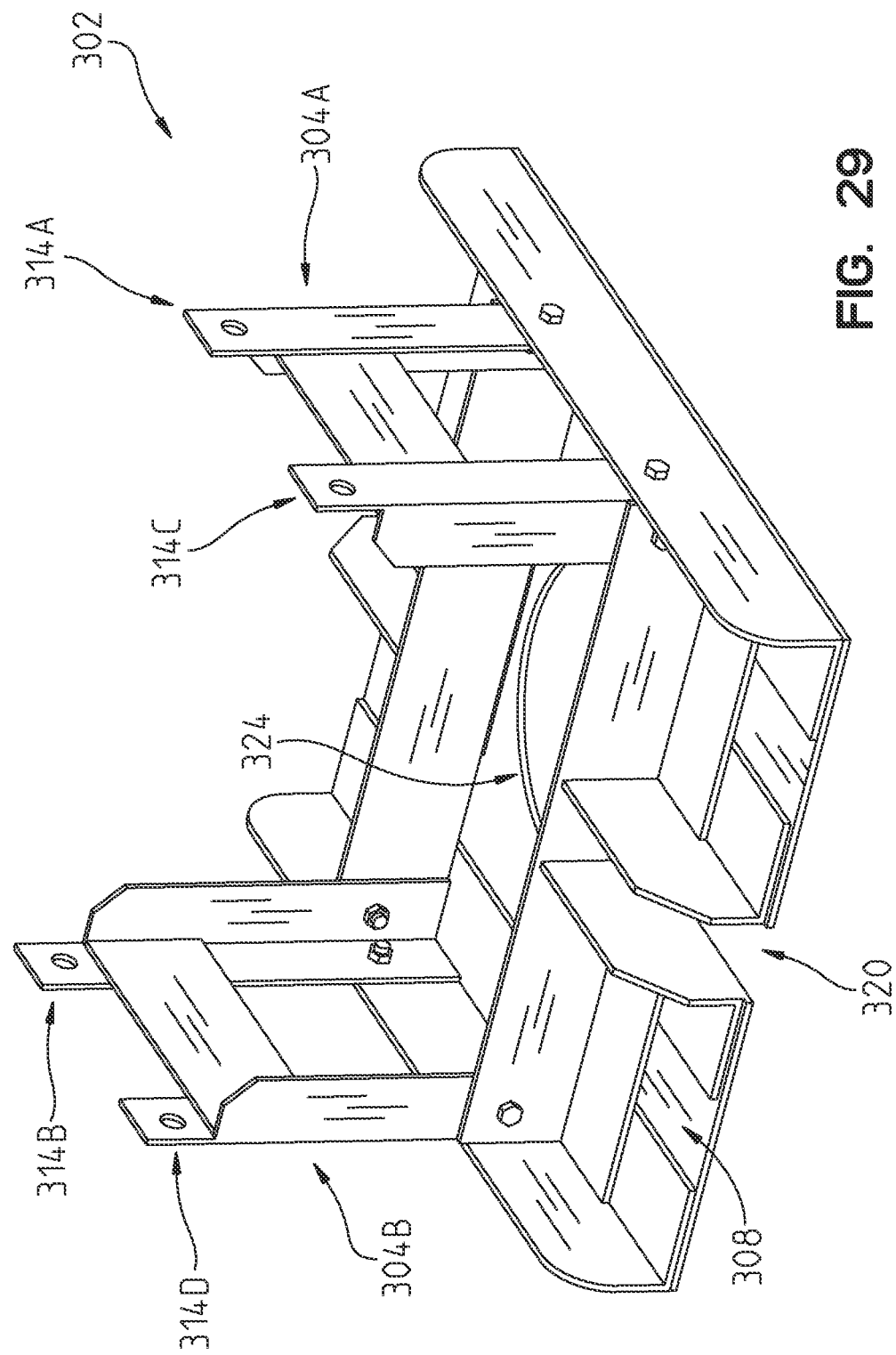
FIG. 29 illustrates a frame of the safety device of FIG. 23.
Figure 30:
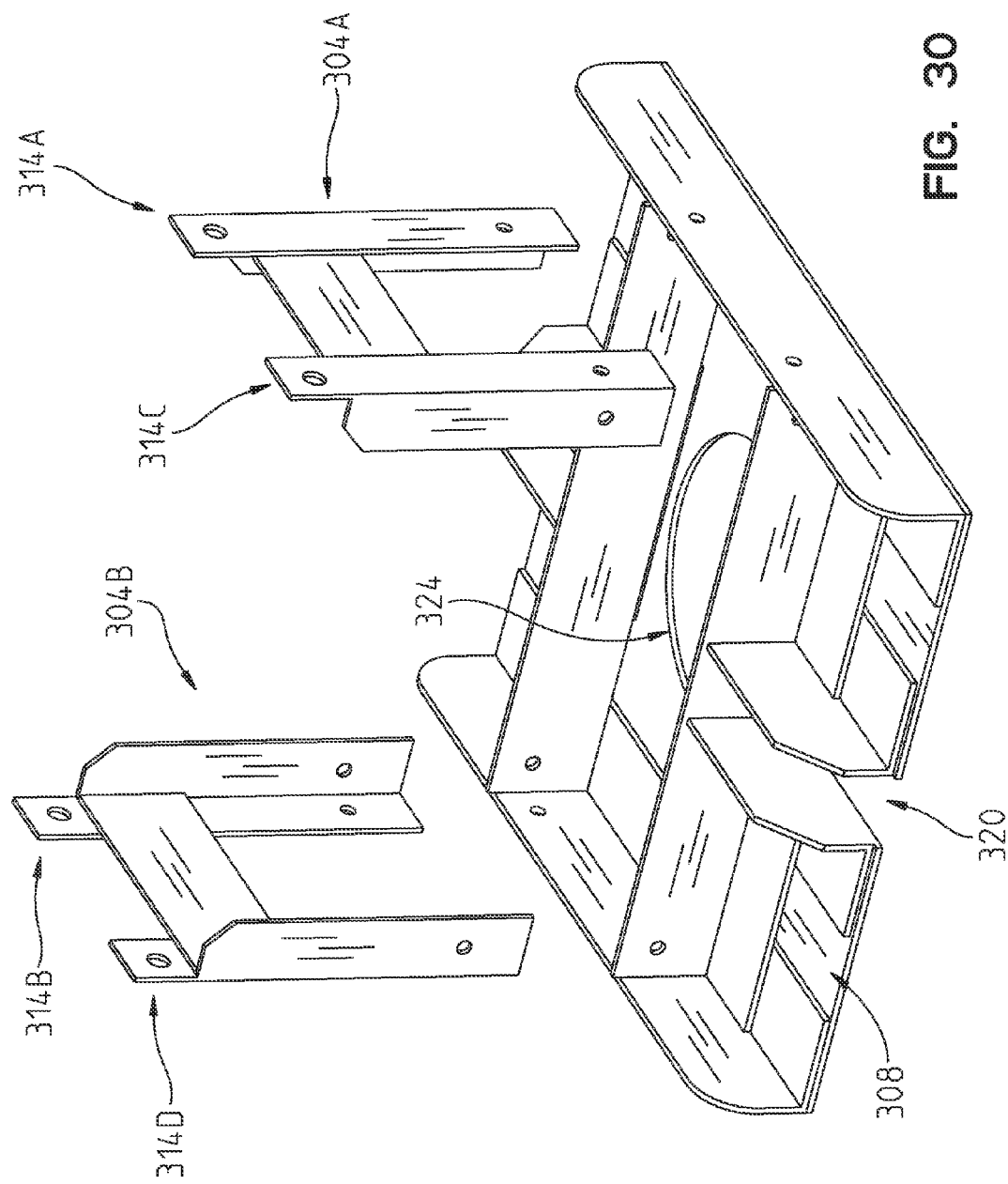
FIG. 30 illustrates an exploded view of the frame of FIG. 29.

Referring to FIG. 25, seal 42 is placed on fluid carrying line 14. Frame 302 is placed on fluid carrying line 14 such that seal 42 is positioned in opening 324. Saddle 40 is positioned over seal 42 and on top of base member 308. The size of opening 324 is configured to be smaller than a flange 48 of saddle 40 or a lower portion of direct tap machine 21. Direct tap machine 21 is placed on top of saddle 40. One end of chain 50 is coupled to direct tap machine 21. The chain 50 is passed around fluid carrying line 14 and the other end of chain 50 is coupled to direct tap machine 21. As shown in FIG. 28, chain 50 is received in lower recess 320 and upper recess 322 of frame 302. Direct tap machine 21 and frame 302 may be moved relative to fluid carrying line 14 before chain 50 is further tightened about fluid carrying line 14 with tensioning members 52.

Once chain 50 is tightened, frame 302 is held in place by saddle 40 and second shield 108" is coupled to frame 302. Locking pins 168 of locking members 134 are received by portions 314 of frame 302 to secure second shield 108" to frame 302.

If a rupture occurs during the tapping operation, safety device 300 operates to deflect fluid and wall fragments away from striking the operator 24 in the operator space 30. Safety device 300 deflects the fluid and fragments in generally the same directions as safety device 100. Frame 302 of safety device 300 is held relative to fluid carrying line 14 by saddle 40.

Figure 31:
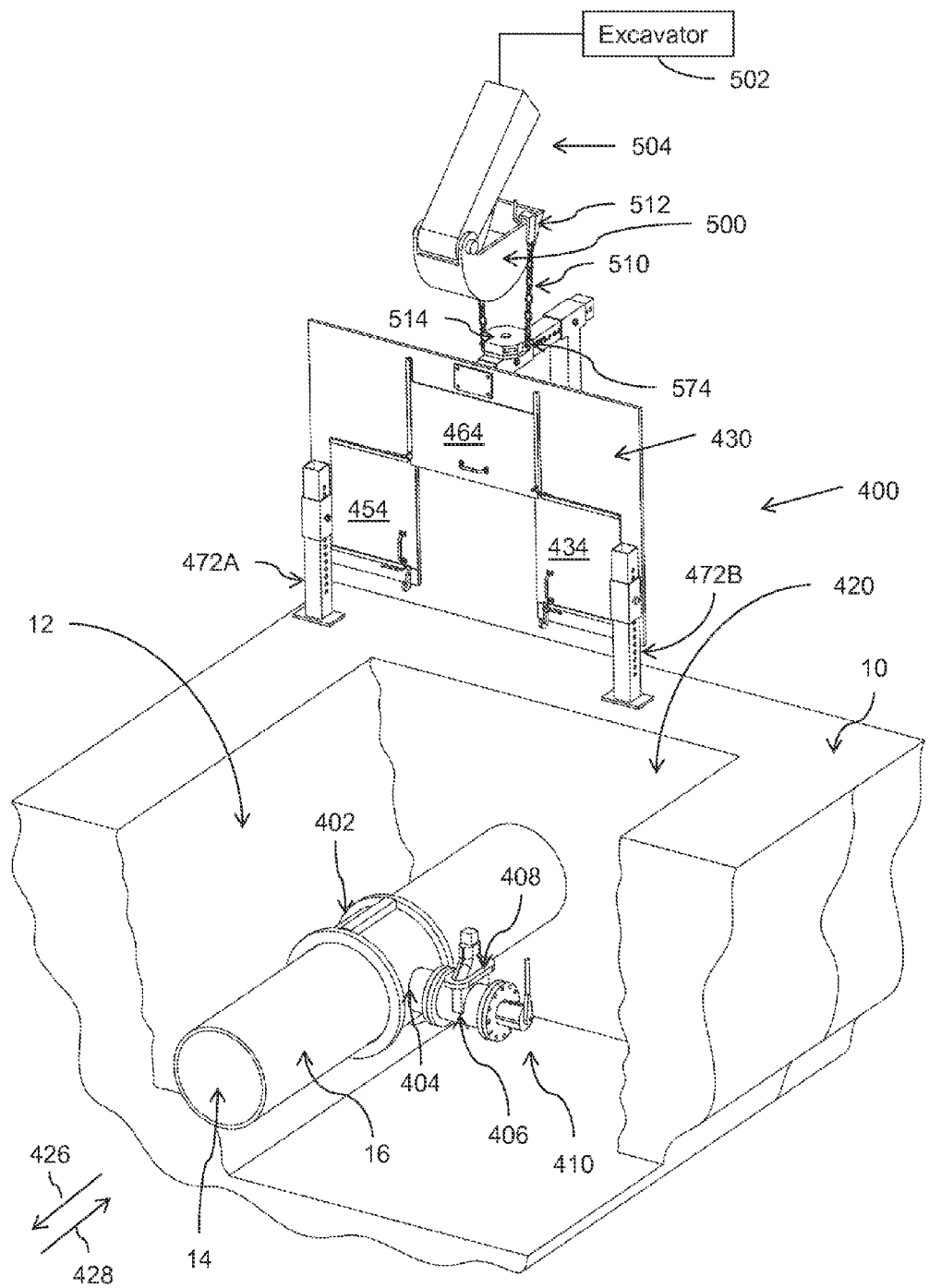
FIG. 31 illustrates the excavated portion of a fluid supply line having a tap machine attached thereto and an exemplary shield member of an exemplary safety device positioned between the fluid supply line and the operator operating the tap machine.

Referring to FIG. 31, another exemplary safety device 400 is shown. Referring to FIG. 31, an exemplary pit 12 is excavated in ground 10. As shown, in pit 12 a portion of a fluid carrying line 14 has been unearthed. In one embodiment, fluid carrying line 14 carries a fluid under pressure. An exemplary fluid carrying line 14 is a water line. Exemplary water lines are made from a polymeric material. An exemplary polymeric material is PVC. The fluid being carried by line 14 is under pressure. In the illustrated embodiment of FIG. 31, fluid carrying line 14 is a water line having a diameter in the range of about 6 inches to about 48 inches.

When a second fluid line is to be connected with fluid carrying line 14 an opening is created in the wall 16 of fluid carrying line 14 to bring an interior of the second fluid line in fluid communication with the interior of fluid carrying line 14. In one embodiment, a saddle 402 is tightened around fluid carrying line 14. Saddle 402 includes a mating conduit 404 for the second fluid line. Mating conduit 404 is shown coupled to a pipe section 406 supporting a valve 408. A tapping machine 410 is shown coupled to one end of pipe section 406.

In operation, fluid carrying line 14 is unearthed. An operator positions saddle 402 about fluid carrying line 14 and tightens saddle 402 relative thereto. Pipe section 406 is coupled to saddle 402. Tapping machine 410 is coupled to pipe section 406. Valve 408 of pipe section 406 is opened and a tapping member of tapping machine 410 is advanced through pipe section 406 into mating conduit 404 until it engages wall 16 of fluid carrying line 14. The tapping member is then used to remove a portion of wall 16 of fluid carrying line 14 to bring an interior of pipe section 406 into fluid communication with an interior of pipe section 406. The tapping member is retracted past valve 408 and valve 408 is closed. Tapping machine 410 is uncoupled from pipe section 406 and the remainder of the second fluid line is coupled to pipe section 406. When the second fluid line is coupled to pipe section 406, valve 408 may be opened to provide fluid to the second fluid line.

It is possible that wall 16 of fluid carrying line 14 will fracture at locations other than the intended generally circular opening being created by tap machine 410. For example, a crack may develop radiating out from the opening being formed by tap machine 410. These additional fractures may permit the fluid under pressure within fluid carrying line 14 to exit the fluid carrying line 14 and begin to fill pit 12 and potentially to alter or constrain the pose of an operator 24 in pit 12. Further, portions of wall 16 may become projectiles which may injure operator 24.

Figure 35:
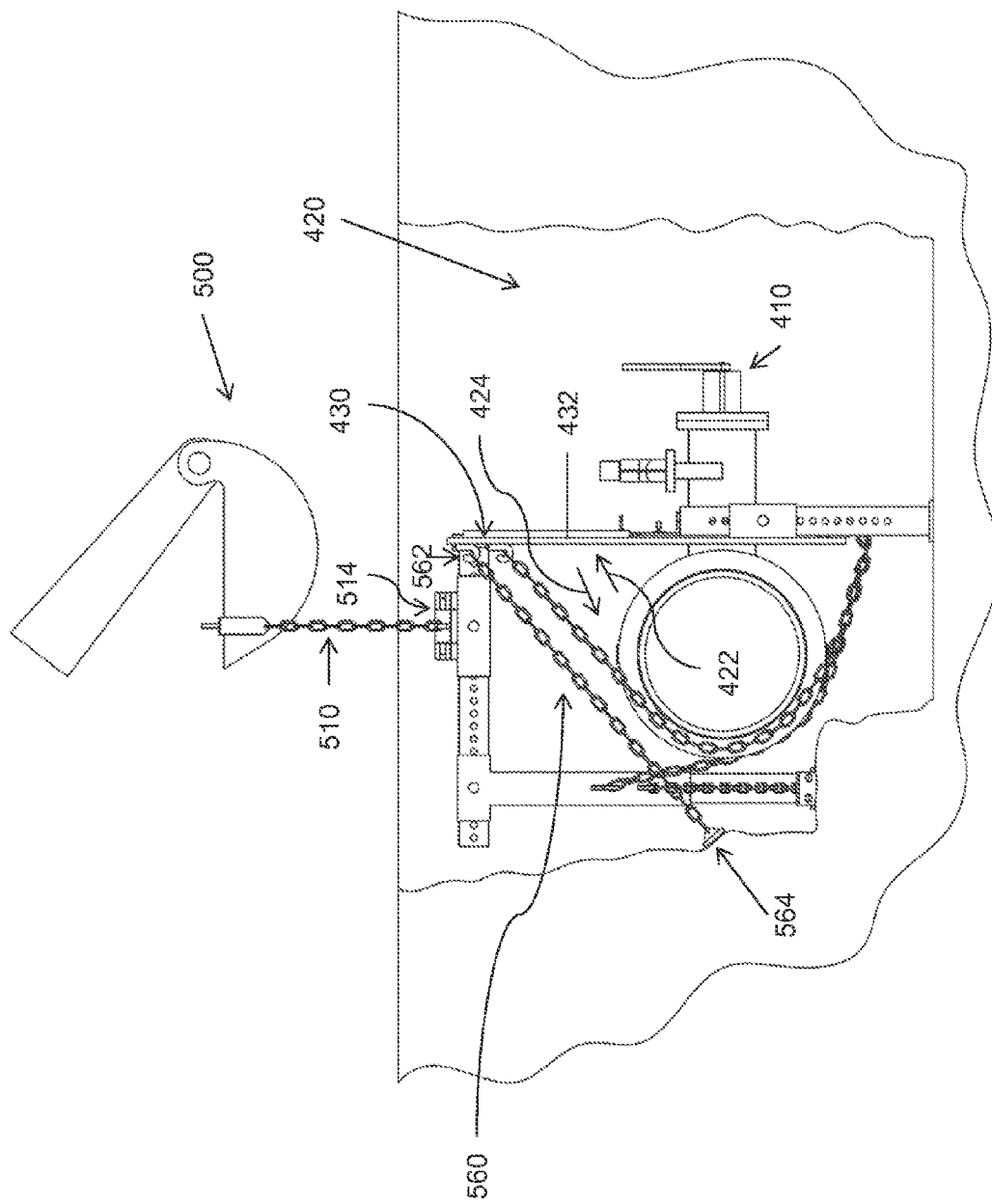
FIG. 35 illustrates a side view of the arrangement of FIG. 33.

Referring to FIG. 35, a shield 430 of safety device 400 is positioned between fluid carrying line 14 and an operator when the operator is positioned in an operator space 420 to actuate tapping machine 410. Safety device 400 operates so that any fluid from an unintended rupture that is traveling towards operator space 420 wherein the operator is engaging tapping machine 410 will be redirected by safety device 400 away from operator space 420. As such, fluid traveling in direction 422 (see FIG. 35) would be redirected away from operator space 420, such as in direction 424 and/or along the longitudinal axis of fluid carrying line 14 (directions 426 and 428 in FIG. 31).

In one embodiment, shield 430 is made of about 0.5 inch steel. In one embodiment, shield 430 is made of about 0.75 inch steel. In one embodiment, s shield 430 is made of a metallic material.

Figure 39:
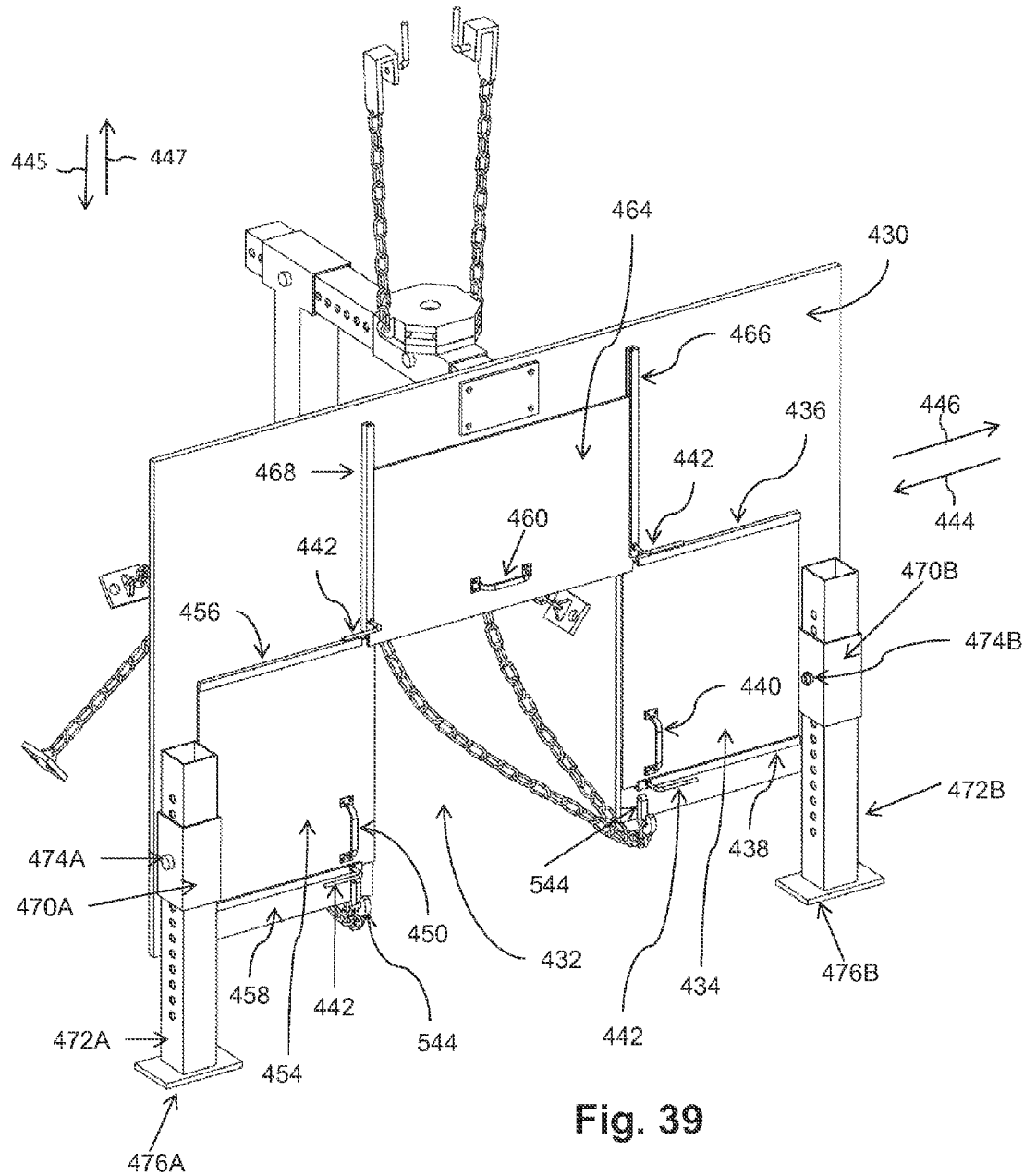
FIG. 39 illustrates a perspective view of the safety device of FIG. 31 with the moveable members of the safety device positioned to provide a large aperture around the second fluid supply line.

Referring to FIG. 39, safety device 400 includes a shield member 430. As shown in FIG. 35, shield member 430 is positioned generally between fluid carrying line 14 and operator space 420. Returning to FIG. 39, shield member 430 includes an opening 432 which receives mating conduit 404 and/or pipe section 406. Shield member 430 is shown as a flat plate. Shield member 430 may be any suitable shape to provide a barrier between operator space 420 and water escaping from a break in fluid carrying line 14.

Figure 41:
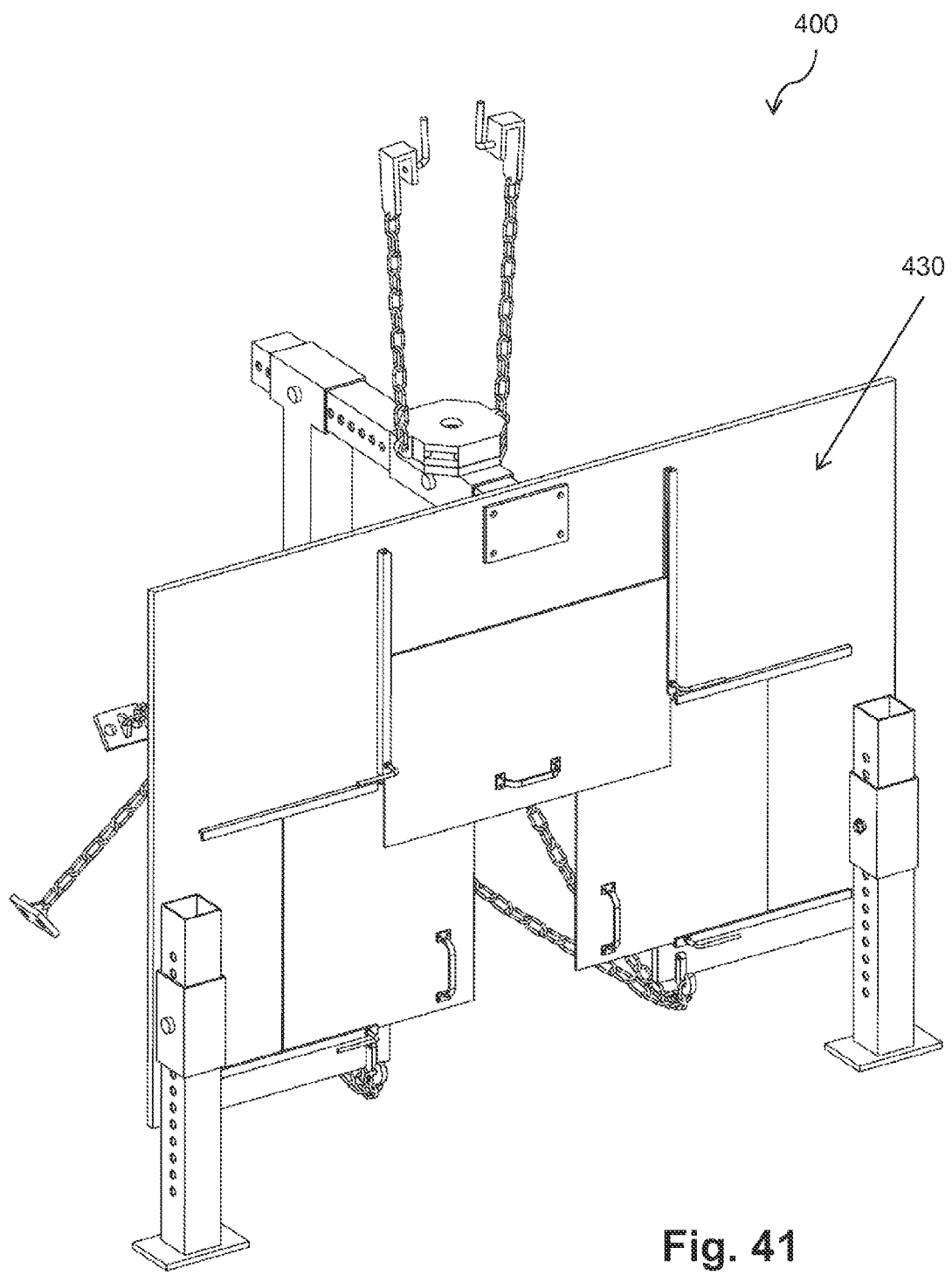
FIG. 41 illustrates the arrangement of FIG. 39 with the moveable members of the safety device positioned to reduce the aperture around the second fluid supply line.

Shield member 430 includes a plurality of moveable members which adjust the size of opening 432. A first movable member 434 is supported by shield member 430. First movable member 434 is received in an upper guide member 436 and a lower guide member 438. First movable member 434 is slidable in direction 444 and direction 446 relative to upper guide member 436 and lower guide member 438. An operator may grip a handle 440 to move second movable member 454. When first movable member 434 is moved in direction 444 the overall size of opening 432 is reduced (see FIG. 41). When first movable member 434 is moved in direction 446 the overall size of opening 432 is increased. The position of first movable member 434 relative to shield member 430 may be locked with a locking member 442. Locking member 442, in the illustrated embodiment, includes an end which is threadably received in an aperture in lower guide member 438 and which presses against a surface of first movable member 434 to press first movable member 434 against shield member 430 to generally lock the position of first movable member 434 relative to shield member 430. By backing the threaded end of locking member 442 out of the threaded aperture of lower guide member 438, first movable member 434 may once again move in direction 444 or direction 446 relative to shield member 430.

A second movable member 454 is supported by shield member 430. Second movable member 454 is received in an upper guide member 456 and a lower guide member 458. Second movable member 454 is slidable in direction 444 and direction 446 relative to upper guide member 456 and lower guide member 458. An operator may grip a handle 450 to move second movable member 454. When second movable member 454 is moved in direction 444 the overall size of opening 432 is increased. When first movable member 434 is moved in direction 446 the overall size of opening 432 is decreased (see FIG. 41). The position of second movable member 454 relative to shield member 430 may be locked with a locking member 442. Locking member 442, in the illustrated embodiment, includes an end which is threadably received in an aperture in lower guide member 458 and which presses against a surface of second movable member 454 to press second movable member 454 against shield member 430 to generally lock the position of second movable member 454 relative to shield member 430. By backing the threaded end of locking member 442 out of the threaded aperture of lower guide member 458, second movable member 454 may once again move in direction 444 or direction 446 relative to shield member 430.

A third movable member 464 is supported by shield member 430. Third movable member 464 is received in a right side guide member 466 and a left side guide member 468. Third movable member 464 is slidable in direction 445 and direction 447 relative to right side guide member 466 and left side guide member 468. An operator may grip a handle 460 to move third movable member 464. When third movable member 464 is moved in direction 445 the overall size of opening 432 is decreased (see FIG. 41). When first movable member 434 is moved in direction 447 the overall size of opening 432 is increased. The position of third movable member 464 relative to shield member 430 may be locked with one or more locking members 442. A first locking member 442, in the illustrated embodiment, includes an end which is threadably received in an aperture in right side guide member 466 and which presses against a surface of third movable member 464 to press third movable member 464 against shield member 430 to generally lock the position of third movable member 464 relative to shield member 430. By backing the threaded end of locking member 442 out of the threaded aperture of right side guide member 466, third movable member 464 may once again move in direction 444 or direction 446 relative to shield member 430. A second locking member 442 is also provided which interacts with a threaded opening in left side guide member 468.

Figure 40:
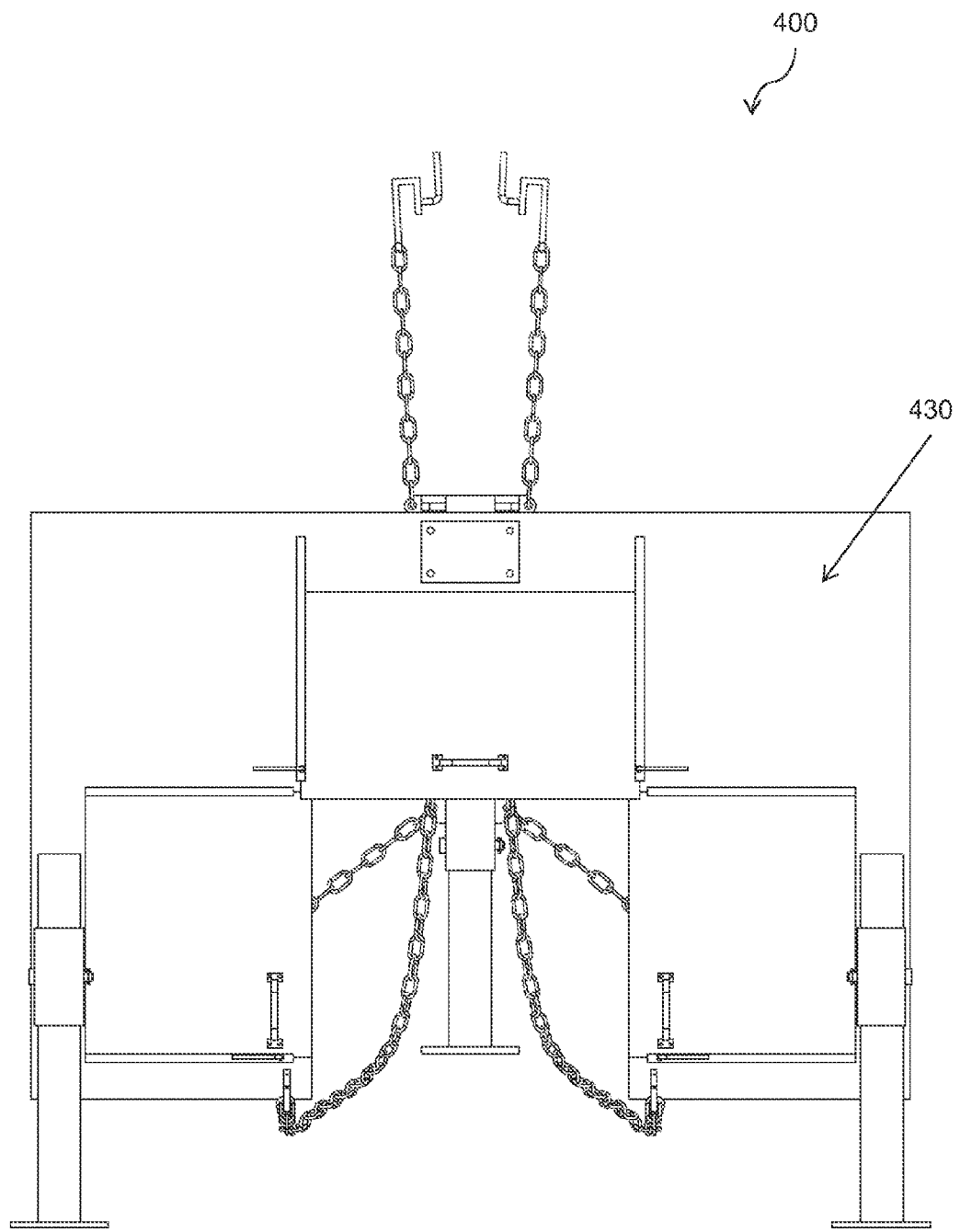
FIG. 40 illustrates a front view of the arrangement of FIG. 39.
Figure 42:
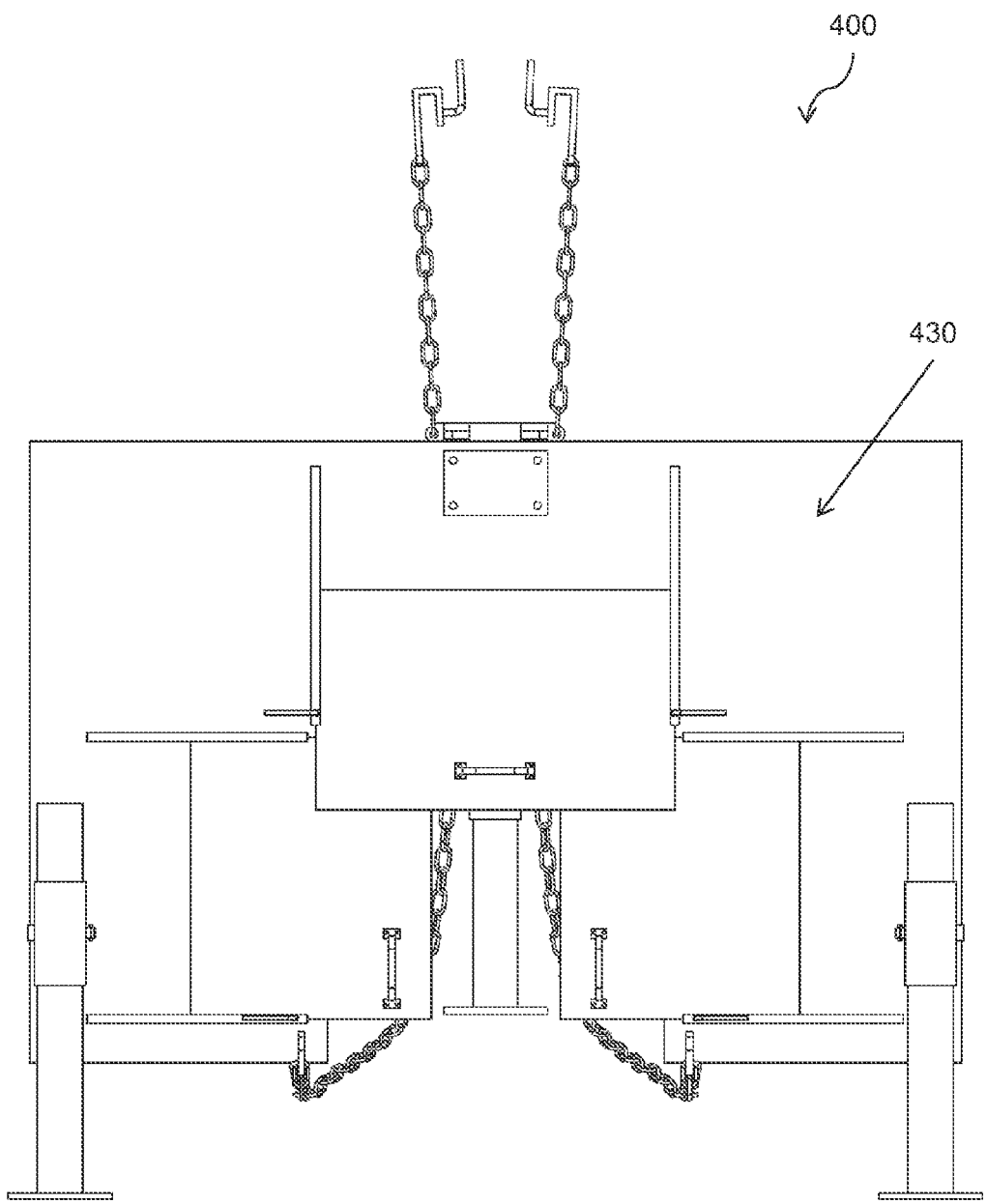
FIG. 42 illustrates a front view of the arrangement of FIG. 41.

As shown in FIGS. 40 and 42, first movable member 434 and second movable member 454 are positioned between shield member 430 and third movable member 464. In one embodiment, third movable member 464 is positioned between shield member 430 and first movable member 434 and second movable member 454.

Leg supports 470 are coupled to shield member 430. Each of leg supports 470 receives a respective leg 472. A respective leg is coupled to a respective leg support 470 through a fastener 474 which is received in apertures in both of leg support 470 and leg 472. Exemplary fasteners include bolts and nuts, pins, and other suitable devices. In the illustrated embodiment, leg 472 includes a plurality of apertures. A relative position of leg 472 relative to leg support 470 may be selected by aligning a selected one of the apertures in leg 472 up with an aperture provided in leg supports 470 and passing fastener 474 through each. A foot 476 is provided at a lower end of each of the legs 472.

Figure 43:
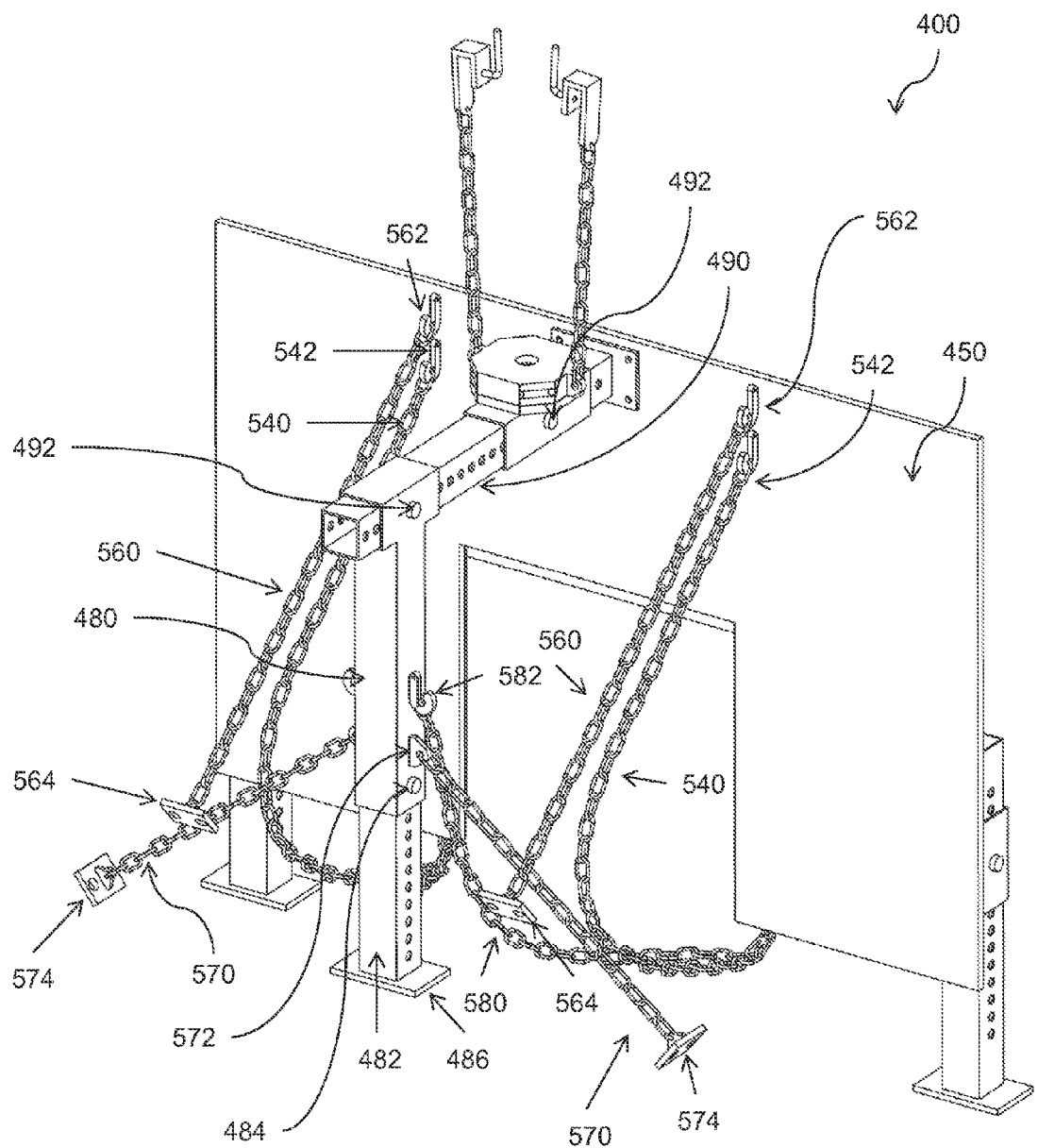
FIG. 43 illustrates a rear, perspective view of the arrangement of FIG. 39.
Figure 44:
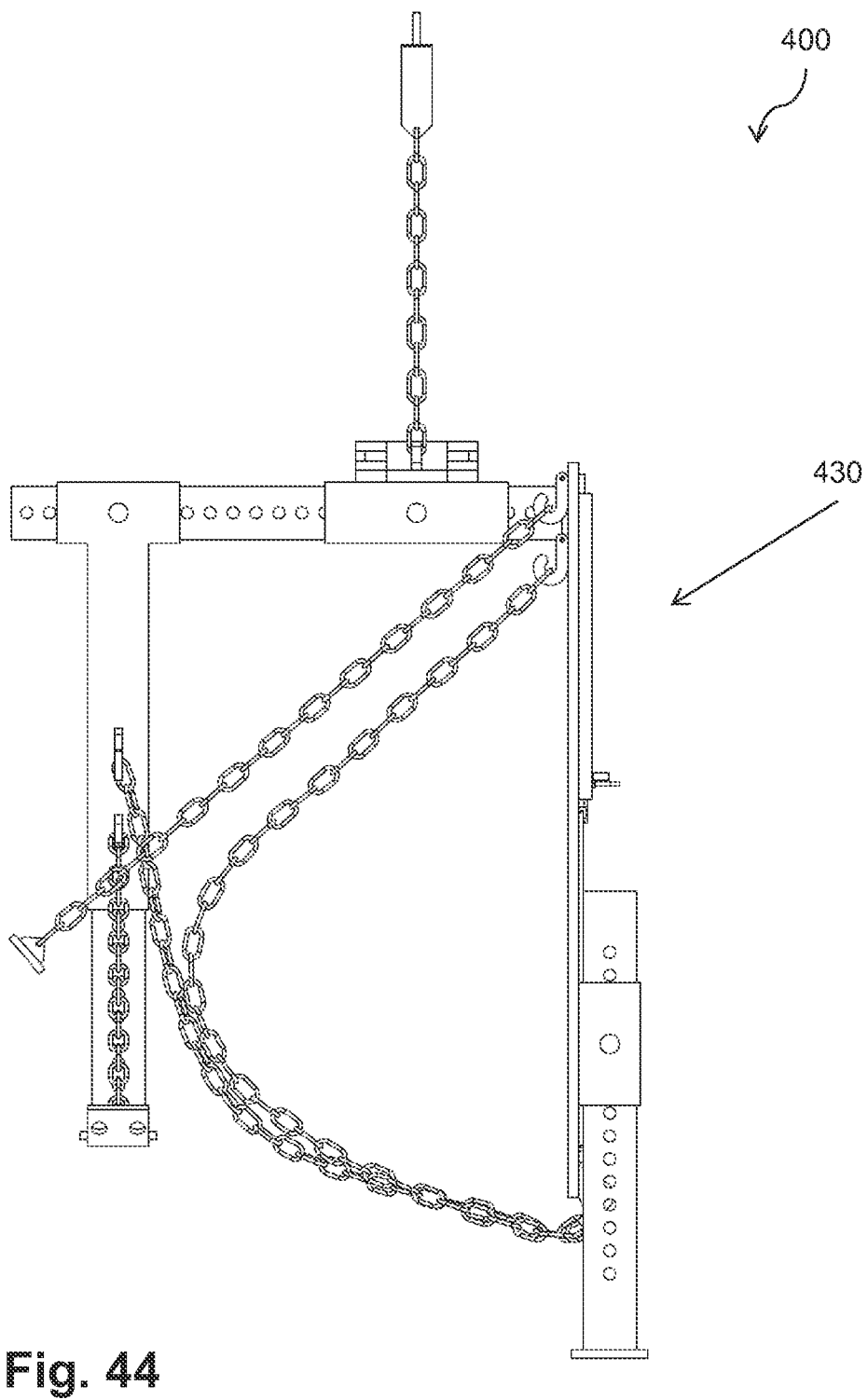
FIG. 44 illustrates a side view of the arrangement of FIG. 39.
Figure 45:
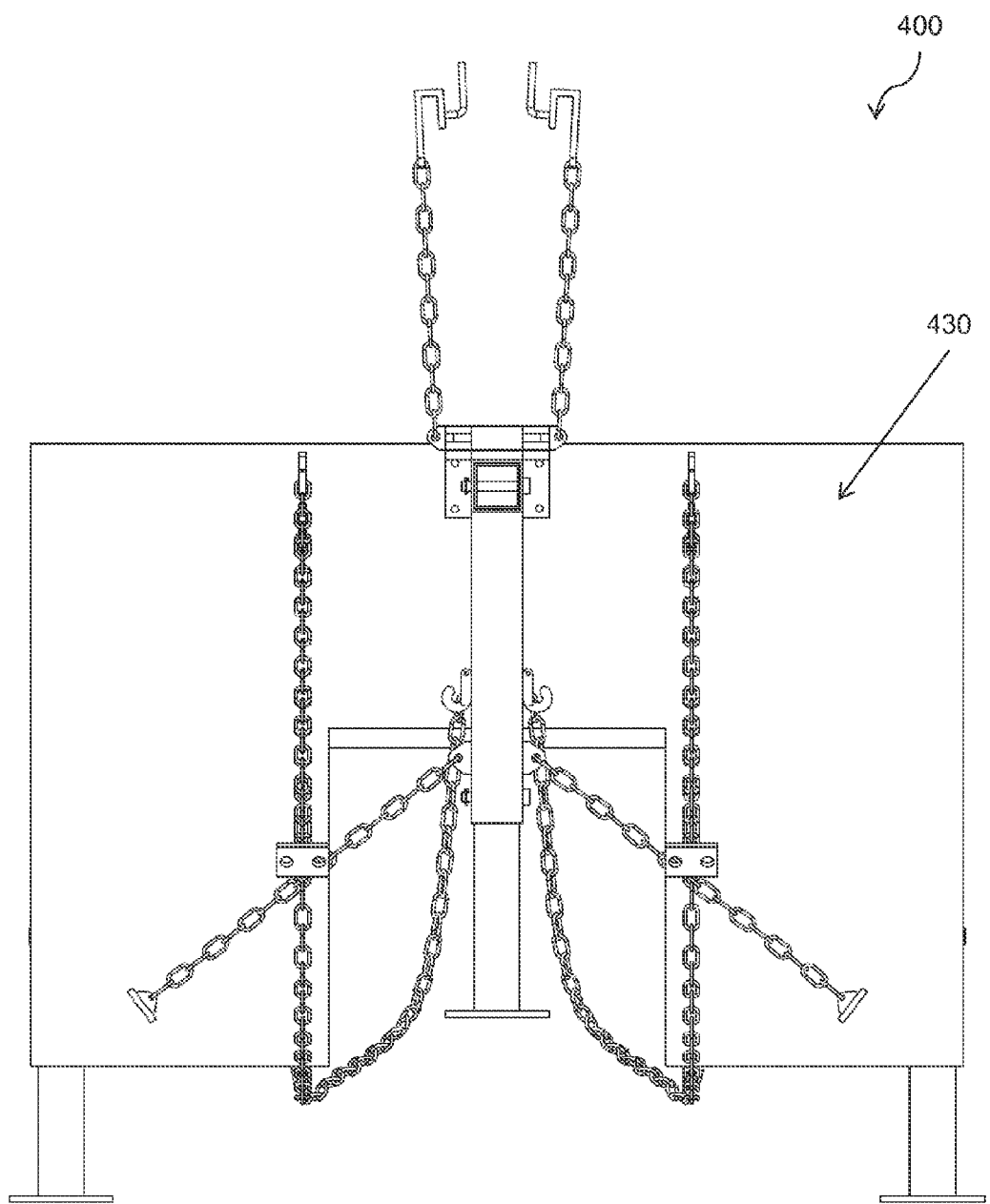
FIG. 45 illustrates a rear view of the arrangement of FIG. 39.
Figure 46:
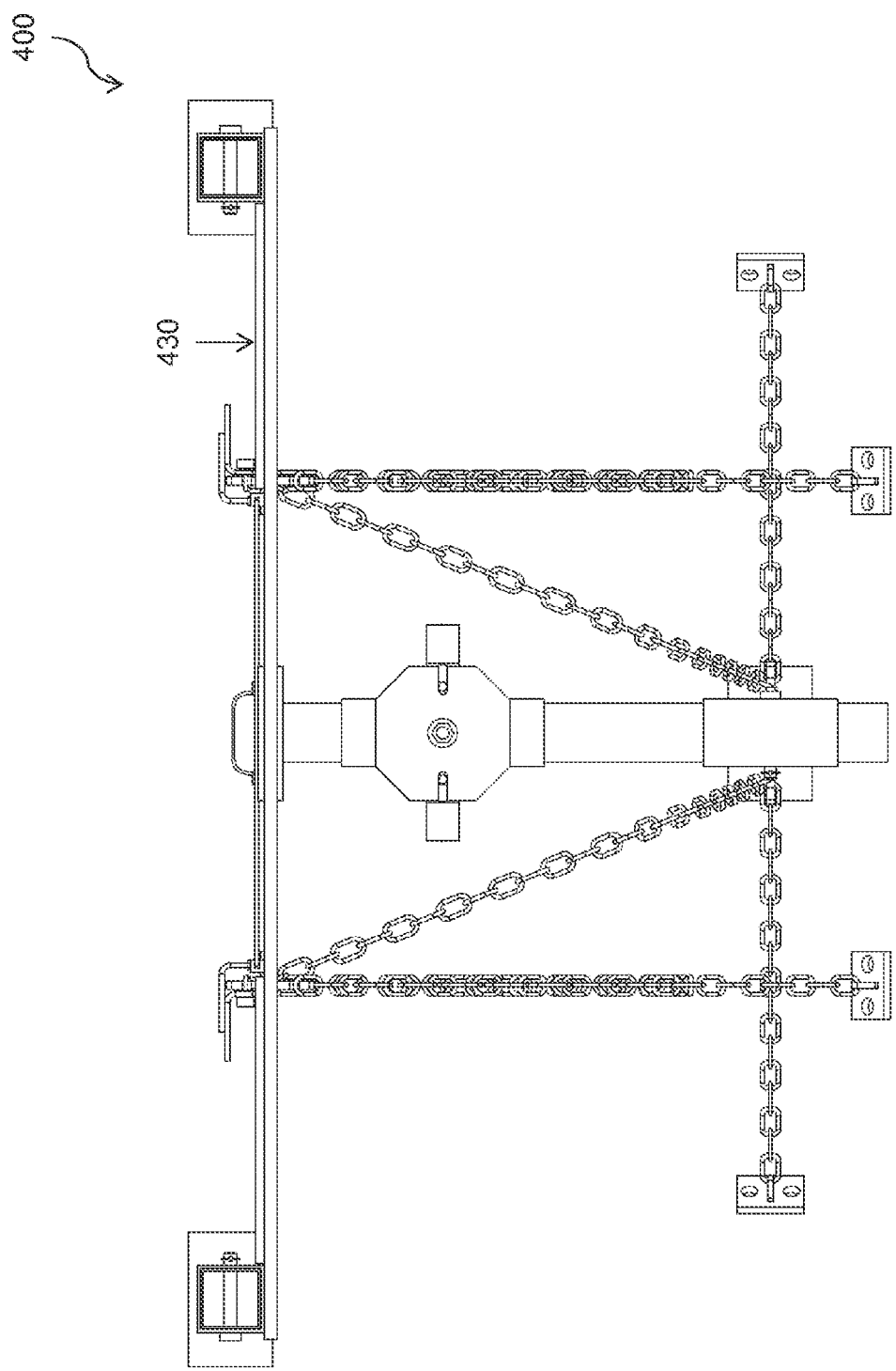
FIG. 46 illustrates a top view of the arrangement of FIG. 39.
Figure 47:
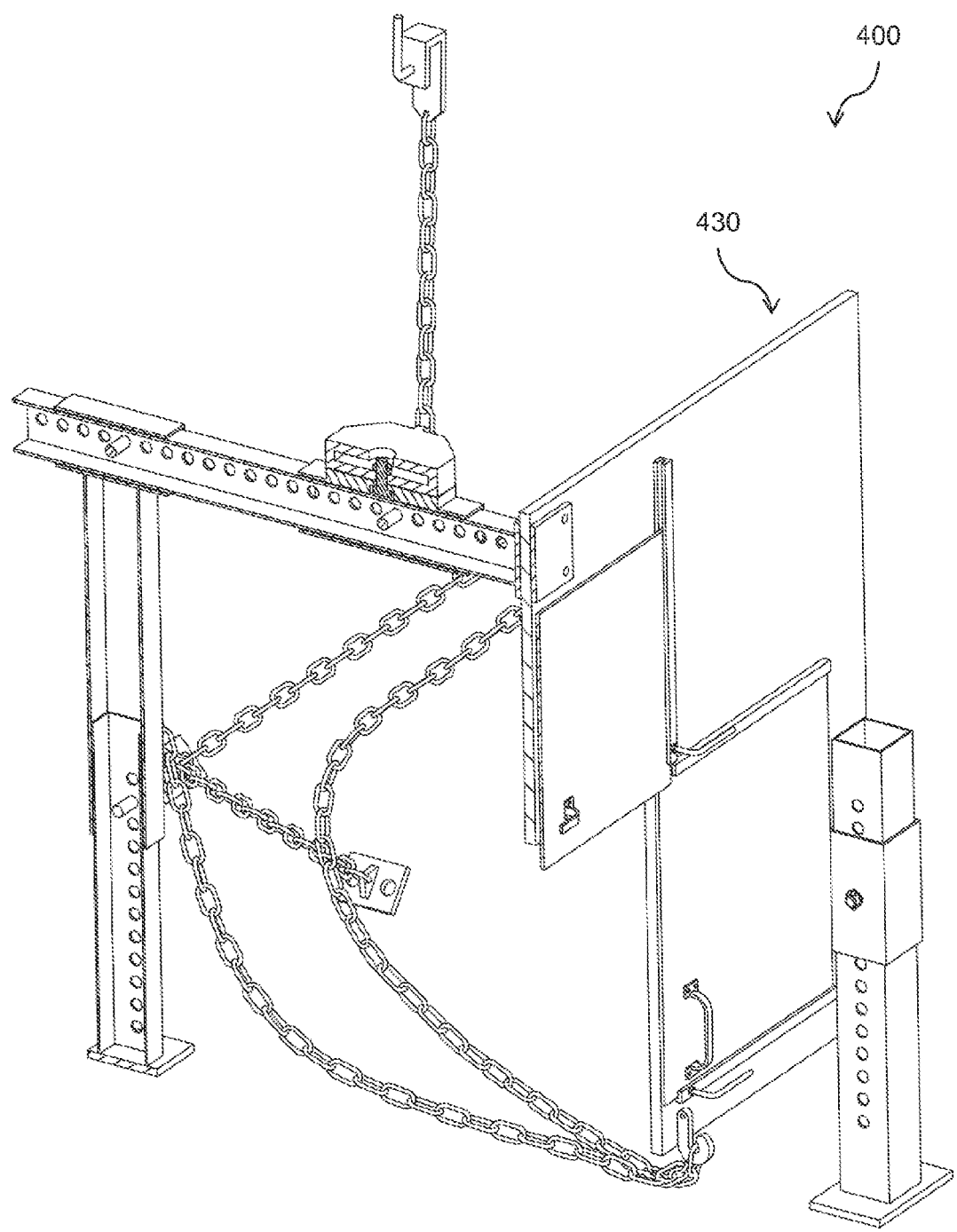
FIG. 47 illustrates a sectional view of the arrangement of FIG. 39.

Referring to FIG. 43, a rear leg support 480 is provided. Leg support 480 receives a leg 482. Leg 482 is coupled to leg support 480 through a fastener 484. Exemplary fasteners include bolts and nuts, pins, and other suitable devices. In the illustrated embodiment, leg 482 includes a plurality of apertures. A relative position of leg 482 relative to leg support 480 may be selected by aligning a selected one of the apertures in leg 482 up with an aperture provided in rear leg support 480 and passing fastener 484 through each. A foot 486 is provided at a lower end of leg 482.

Rear leg support 480 is coupled to shield member 430 through a support member 490. Rear leg support 480 is coupled to support member 490 through a fastener 492. Exemplary fasteners include bolts and nuts, pins, and other suitable devices. In the illustrated embodiment, support member 490 includes a plurality of apertures. A relative position of rear leg support 480 relative to support member 490 may be selected by aligning a selected one of the apertures in support member 490 up with an aperture provided in rear leg support 480 and passing fastener 492 through each. By sliding rear leg support 480 along support member 490 a spacing "S" (see FIG. 38) between shield member 430 and rear leg support 480 may be adjusted. This permits the accommodation of multiple sizes of fluid carrying line 14.

Safety device 400, in the illustrated embodiment, may be coupled to a lifting device to move safety device 400 into and out of pit 12. The illustrated lifting device is a bucket 500 of an excavating machine 502. Exemplary excavating machines include backhoes, excavators, and other vehicles used to excavate a fluid carry line 14. A portion of a boom arm 504 of excavating machine 502 is illustrated in FIG. 31. As is known, excavating machine 502 includes a hydraulic system which permits the movement of bucket 500 relative to boom arm 504 and the movement of boom arm 504 relative to the frame of the excavating machine 502.

In the illustrated embodiment, safety device 400 is coupled to bucket 500 through a pair of coupling members 510. Illustratively, the coupling members are chains. A hook member 512 is coupled to a first end of each coupling members 510 and coupled over an edge of bucket 500. An orientation member 514 is coupled to a second end of each coupling members 510.

Figure 36:
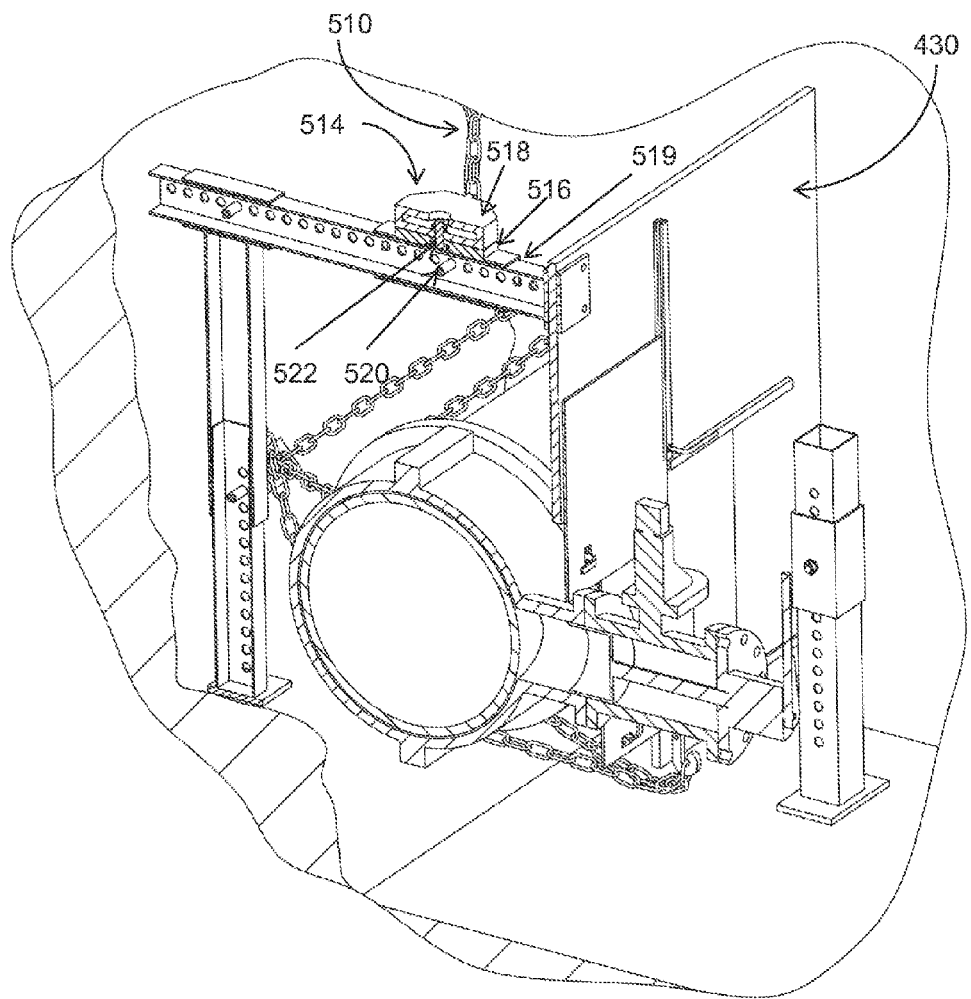
FIG. 36 illustrates a sectional view of the arrangement of FIG. 33.
Figure 37:
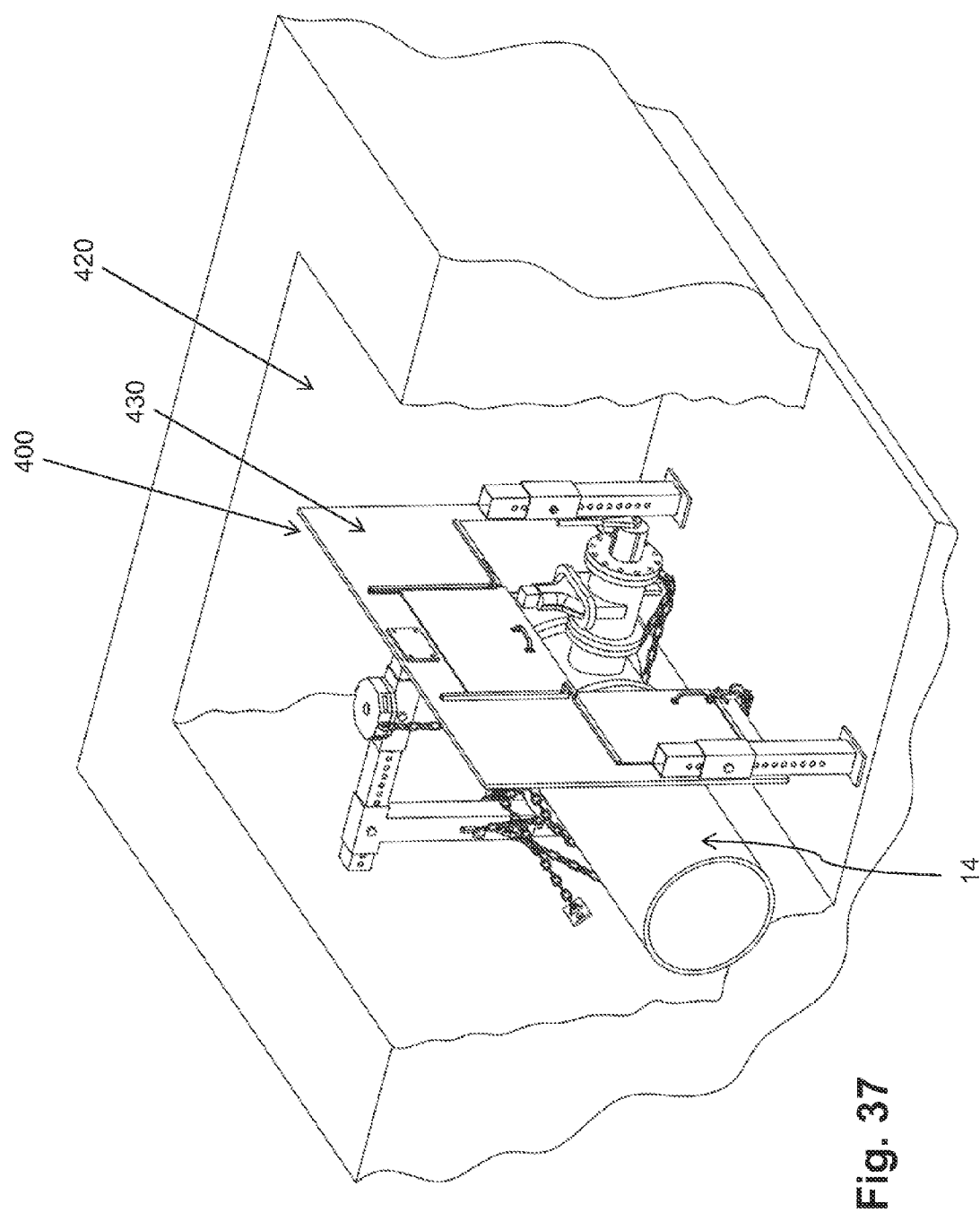
FIG. 37 illustrates the arrangement of FIG. 33 with the bucket of the excavating machine uncoupled from the safety device.

Referring to FIG. 36, orientation member 514 includes a base member 516 and a swivel member 518. Base member 516 includes a sleeve portion 519 (see FIG. 38) which receives support member 490 (see FIG. 38). A fastener 520 is received in an opening in sleeve member 519 and also in one of the plurality of apertures in support member 490 to couple sleeve member 519 to support member 490.

Prior to swivel member 518 receiving support member 490, a coupler 522 is positioned in an aperture of base member 516 and extends through an aperture of swivel member 518. Coupler 522 couples swivel member 518 to base member 516 while permitting the rotation of swivel member 518 relative to base member 516 about a vertical axis.

Figure 32:
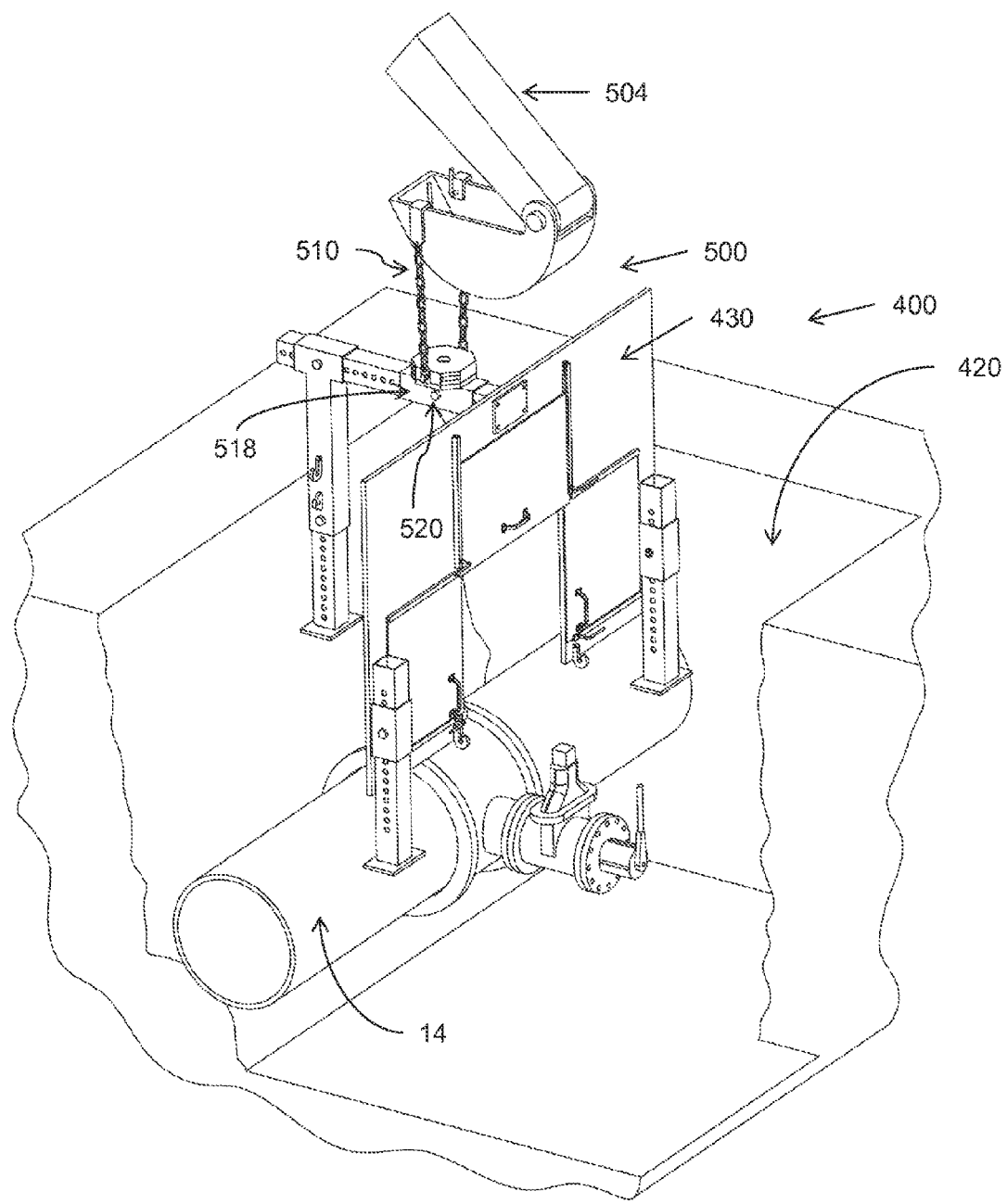
FIG. 32 illustrates the safety device of FIG. 31 being lowered into the excavated pit, the safety device being oriented to locate the shield member between the fluid supply line being tapped and the tapping machine.

By permitting swivel member 518 to rotate relative to base member 516, an operator may orient the safety device 400. Referring to FIG. 31, safety device 400 needs to be rotated about 90 degrees for safety device 400 to receive pipe section 406 in opening 432. An operator may rotate safety device 400 as safety device 400 is being lowered by excavating machine 502 into pit 12 to the orientation shown in FIG. 32. Excavating machine 502 continues to lower safety device 400 until feet 476 rest upon the ground.

Figure 38:
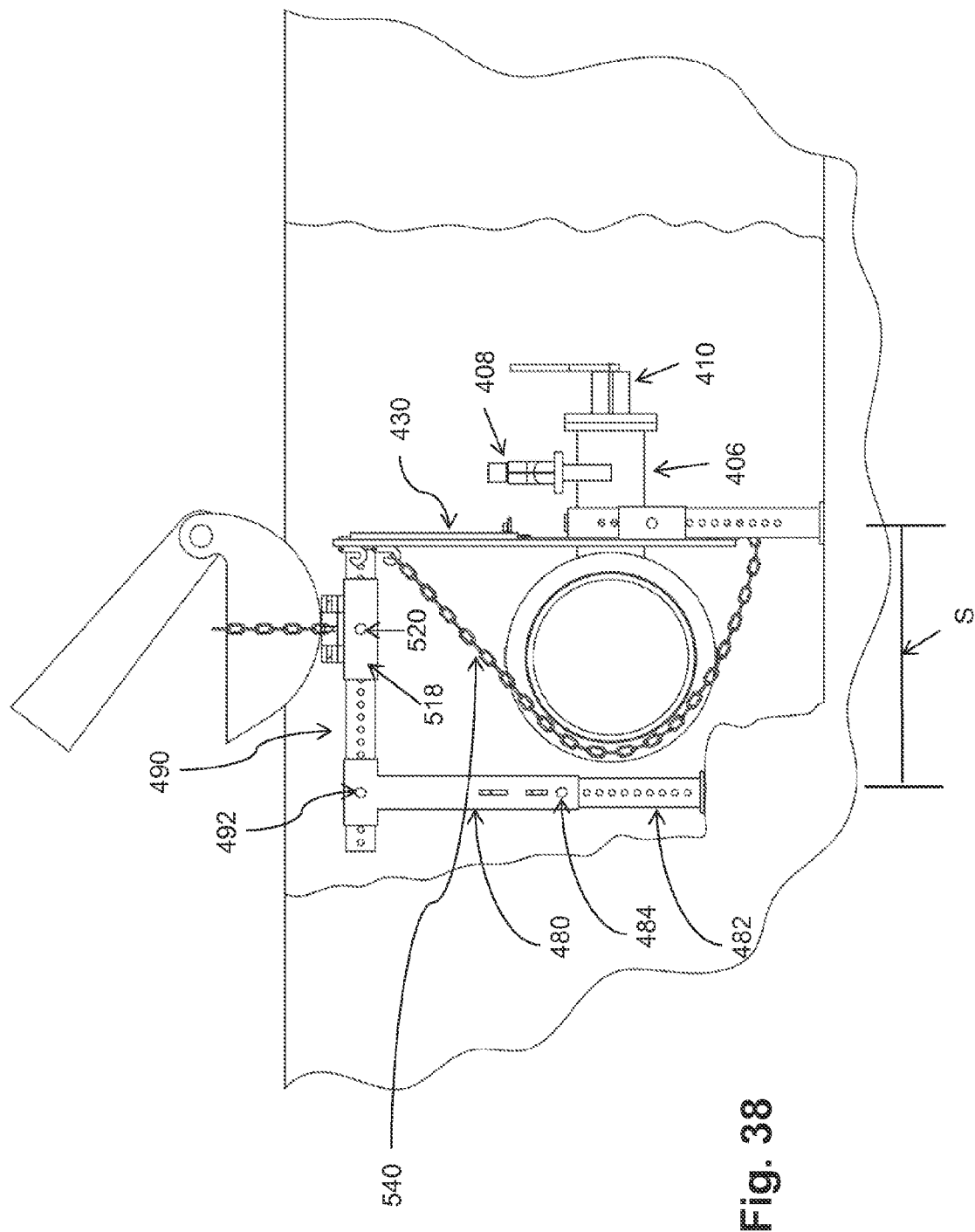
FIG. 38 illustrates the side view of FIG. 35 wherein the safety device is not anchored to the ground but the bucket of the excavating device is resting on the safety device.

Referring to FIG. 38, once safety device 400 is resting on the ground, coupling members 540 are extended around fluid carrying line 14 and are coupled to shield member 430 at an upper hook 542 and at a lower hook 544 (see FIG. 39). Coupling members 540 couples safety device 400 to fluid carrying line 14. Illustratively, the coupling members are chains. In the embodiment illustrated in FIG. 38, bucket 500 is further lowered and rested on orientation member 514. The weight of bucket 500 assists in maintaining safety device 400 in the orientation shown in FIG. 38.

In one embodiment, bucket 500 is not able to be left resting on top of safety device 400. In this embodiment, additional coupling members, such as chains, are used to anchor safety device 400 to the ground. Referring to FIG. 35, coupling members 560 are coupled to hooks 562 of shield member 430 and to an anchor plate 564. Anchor plate 564 receives spikes (not shown) or other members which are embedded in the ground to secure anchor plate 564 to the ground.

Further, coupling members 570 anchor rear leg support 480 to the ground. Referring to FIG. 43, coupling members 570 are coupled to brackets 572 of rear leg support 480 and to anchor plates 574. Anchor plate 574 receives spikes (not shown) or other members which are embedded in the ground to secure anchor plate 564 to the ground. Also, an additional set of coupling members 580 are coupled to lower hooks 544 of shield member 430 and extend around fluid carrying line 14 and are coupled to hooks 582 coupled to rear leg support 480.

Figure 33:
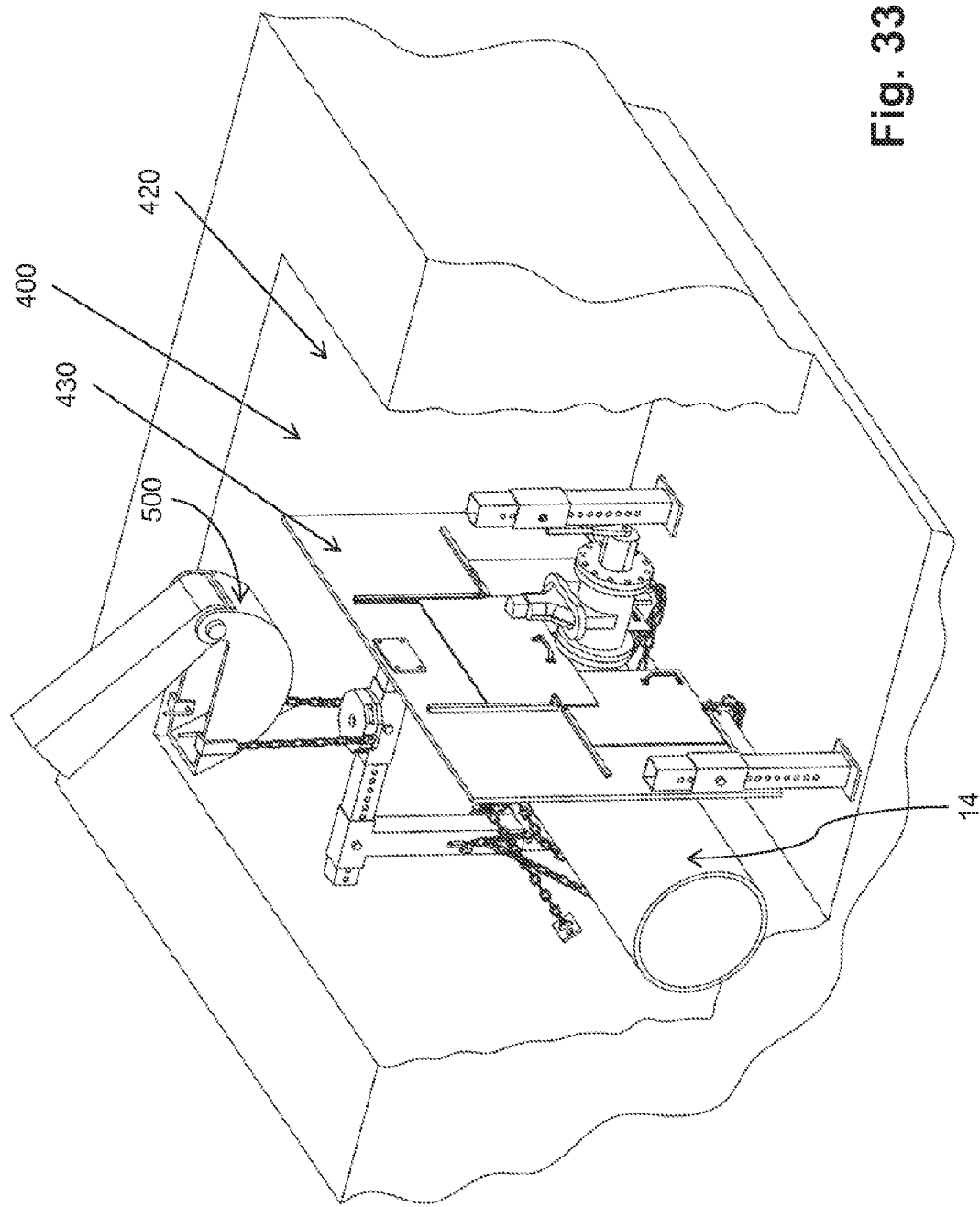
FIG. 33 illustrates a first perspective view of the safety device of FIG. 31 resting on the ground of the pit and being coupled to the ground and the fluid supply line.
Figure 34:
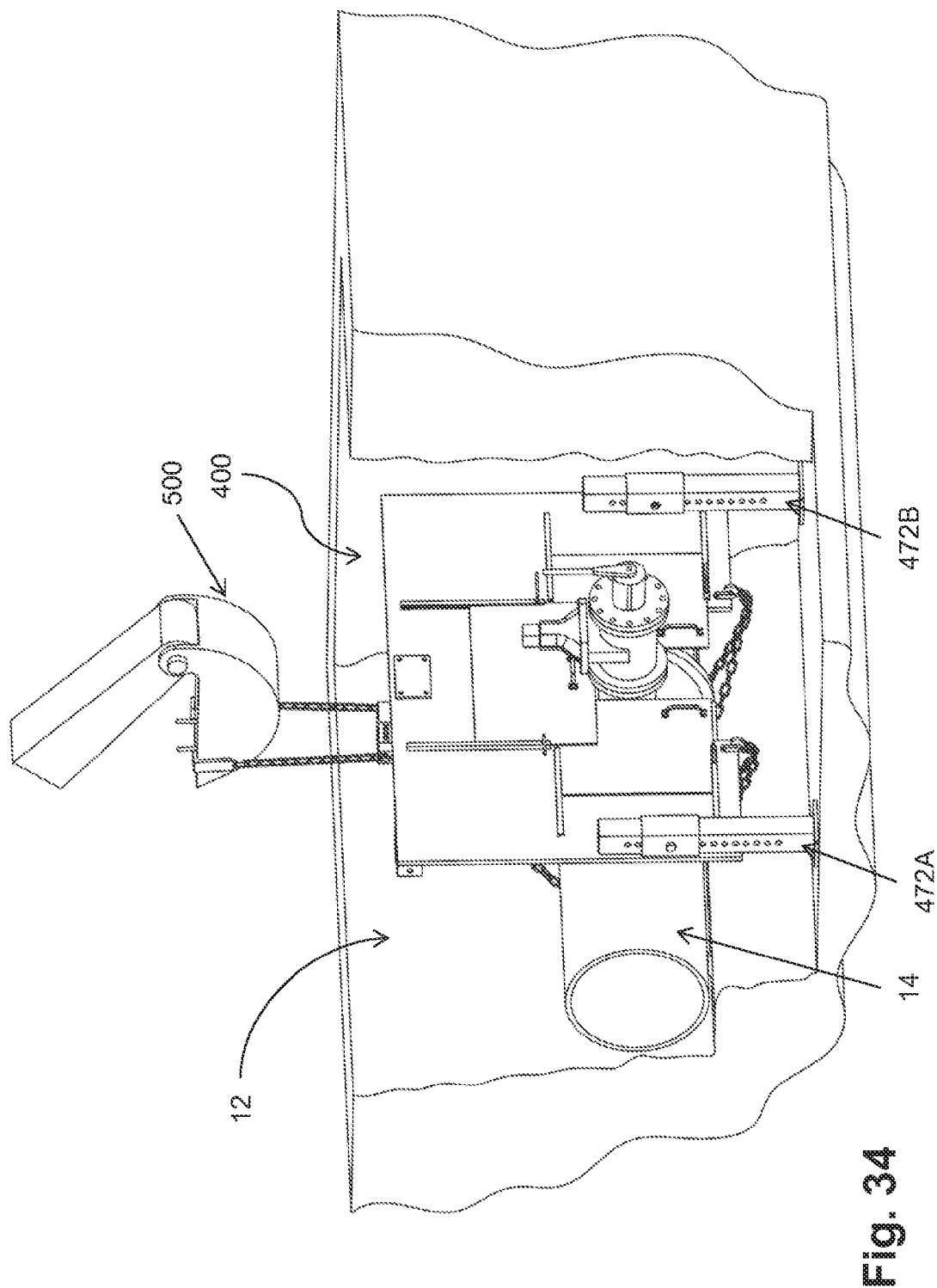
FIG. 34 illustrates a second perspective view of the arrangement of FIG. 33.

In an exemplary method, safety device 400 is lowered into pit 12 such that safety device 400 is oriented as shown in FIG. 33. Coupling members 540 are placed around fluid carrying line 14 and coupled to upper hook 542 and lower hook 544. In one embodiment, tensioning members are included to tighten chains 540 about fluid carrying line 14. Coupling members 510 are uncoupled from bucket 500. Coupling members 560 are anchored to the ground. Coupling members 570 are anchored to the ground. Coupling members 580 are placed around fluid carrying line 14 and coupled to hooks 582 and lower hook 544.

First movable member 434, second movable member 454, and third movable member 464 are moved to generally abut mating conduit 404 or pipe section 406 as shown in FIG. 36. Tapping machine 410 is actuated to tap an aperture in fluid carrying line 14. If a rupture occurs, shield member 430 deflects fluid away from operator space 420. If a rupture does not occur, coupling members 560 and coupling members 570 are unanchored from the ground and coupling members 540 and coupling members 580 are uncoupled. First movable member 434, second movable member 454, and third movable member 464 are moved to provide a larger opening 432. Coupling members 510 are coupled to bucket 500. Bucket 500 is moved to raise safety device 400 out of pit 12.

Figure 48:
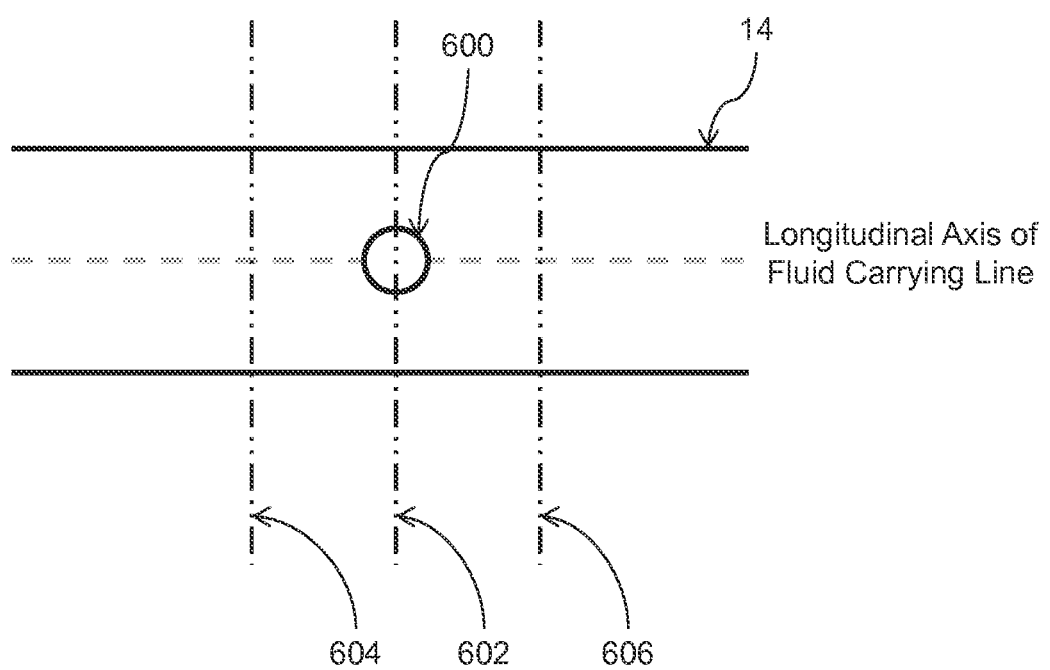
FIG. 48 illustrates a transverse plane of a fluid carrying line corresponding to a tapping location and a plurality of spaced apart transverse planes generally indicating locations of coupling devices to couple a safety device to the carrying line.

Referring to FIG. 48, fluid carrying line 14 is shown having an intended tap location 600. A transverse plane 602 is generally normal to the longitudinal axis of fluid carrying line 14. The coupling devices disclosed herein which couple the respective safety devices 100, 200, 300, and 400 to fluid carrying line 14 are generally coupled to fluid carrying line 14 at one or more of planes 602, 604, and 606. Planes 604 and 606 being generally parallel to plane 602 and offset relative to plane 602.

Each of safety devices 100, 200, 300, and 400, in one embodiment, remain coupled to fluid carrying line 14 when a rupture occurs.

In an exemplary embodiment of the present disclosure, a method of tapping a fluid supply line carrying a fluid under pressure is provided. The method comprising the steps of: excavating the earth to expose at least a portion of a fluid supply line and an operator space; placing a shield between the operator space and the fluid supply line; and tapping the supply line to provide a coupling location for a second fluid supply line, wherein in the occurrence of an unintended break in the fluid supply line in which a first portion of fluid exits the fluid supply line and travels towards the operator space, the shield substantially redirects the first portion of fluid away from the operator space. In one example the shield surrounds a tap machine used to tap the fluid supply line. In another example, the shield is coupled to the fluid supply line. In yet another example, the shield is supported by the tap machine.

In another exemplary embodiment of the present disclosure, a safety device for use with a tap machine to tap a fluid supply line from an operator space proximate the fluid supply line is provided. The safety device comprising a shield having a top portion and a bottom portion spaced apart from the fluid supply line; and at least one coupling device to secure the shield to one of the fluid supply line and the tap machine, wherein in the occurrence of a unintended break in the fluid supply line in which a first portion of fluid exits the fluid supply line and travels towards the operator space the shield substantially redirects the first portion of fluid away from the operator space. In one example, the shield surrounds the tap machine.

In yet another exemplary embodiment of the present disclosure, a safety device for use with a tap machine to tap a fluid supply line from an operator space proximate the fluid supply line is provided. The safety device comprising at least one coupling device; a frame coupled to the fluid supply line with the at least one coupling device, the frame receiving the tap machine; and a shield supported by the frame. In one example, the shield is not centered relative to the tap machine.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A safety device for use with a tapping apparatus to tap a fluid supply line from an operator space proximate the fluid supply line, the safety device comprising:
   a shield; and
   at least one coupling device which surrounds the fluid supply line and secures the shield relative to the fluid supply line, wherein in the occurrence of a unintended break in the fluid supply line in which a first portion of fluid exits the fluid supply line and travels towards the operator space the shield substantially redirects the first portion of fluid away from the operator space, wherein a first coupling device surrounds the fluid supply line generally at a first plane which is offset from a tapping plane that is normal to the longitudinal axis of the fluid supply line and passes through an intended tapping location on the fluid supply line.

2. The safety device of claim 1, wherein a first coupling device of the at least one coupling device follows a transverse contour of the fluid supply line.

3. The safety device of claim 1, wherein a perimeter of the shield is spaced apart from the fluid supply line.

4. The safety device of claim 3, wherein the entire shield is spaced apart from the fluid supply line.

5. The safety device of claim 4, wherein the shield includes an aperture to receive a tapping machine, the shield completely surrounding the tapping machine.

6. The safety device of claim 5, wherein the shield is symmetrical about the aperture.

7. The safety device of claim 5, wherein the shield is asymmetrical about the aperture, the shield being longer in a first direction extending from the tapping apparatus relative to a second direction extending from the tapping apparatus.

8. A safety device for use with a tapping apparatus to tap a fluid supply line from an operator space proximate the fluid supply line, the safety device comprising:
   a shield;
   at least one coupling device which surrounds the fluid supply line and secures the shield relative to the fluid supply line, wherein in the occurrence of a unintended break in the fluid supply line in which a first portion of fluid exits the fluid supply line and travels towards the operator space the shield substantially redirects the first portion of fluid away from the operator space; and
   at least one tensioning member to tighten the at least one coupling device about the fluid supply line.

9. The safety device of claim 1, further comprising a plurality of handles coupled to the shield.

10. A safety device for use with a tapping apparatus to tap a fluid supply line from an operator space proximate the fluid supply line, the safety device comprising:
    a shield;
    at least one coupling device which surrounds the fluid supply line and secures the shield relative to the fluid supply line, wherein in the occurrence of a unintended break in the fluid supply line in which a first portion of fluid exits the fluid supply line and travels towards the operator space the shield substantially redirects the first portion of fluid away from the operator space; and
    a frame, the shield being supported by the frame.

11. The safety device of claim 10, wherein the frame is supported by the fluid supply line.

12. The safety device of claim 10, wherein the frame is supported by the ground.

13. The safety device of claim 10, wherein the frame is coupled to the at least one coupling device and rests against the fluid supply line when the at least one coupling device is coupled to the fluid supply line.

14. The safety device of claim 10, wherein a portion of the frame extends through the shield in at least one opening in the shield.

15. The safety device of claim 14, further comprising a plurality of locking members configured to couple the extending portion of the frame to the shield.

16. The safety device of claim 10, further comprising an alignment member, the alignment member locating the frame to support the shield.

17. A safety device for use with a tapping apparatus to tap a fluid supply line from an operator space proximate the fluid supply line, the safety device comprising:
    a frame having a flat lower portion which rests against the fluid supply line and a plurality of upstanding wall portions extending from the lower portion;
    a shield supported by the frame, the shield including a plurality of apertures to receive at least a portion of each of the upstanding wall portions and a tap machine aperture;
    a plurality of locking members supported by the shield, the locking members engaging the portions of the upstanding wall portions to lock the shield onto the frame, wherein in the occurrence of a unintended break in the fluid supply line in which a first portion of fluid exits the fluid supply line and travels towards the operator space the shield substantially redirects the first portion of fluid away from the operator space.

18. The safety device of claim 17, further comprising at least one coupling device which surrounds the fluid supply line and secures the frame relative to the fluid supply line.

* * * * *